(12) United States Patent
Horne et al.

(10) Patent No.: US 7,306,845 B2
(45) Date of Patent: Dec. 11, 2007

(54) OPTICAL MATERIALS AND OPTICAL DEVICES

(75) Inventors: Craig R. Horne, Fremont, CA (US); Pierre J. DeMascarel, Sunnyvale, CA (US); Christian C. Honeker, Woodside, CA (US); Benjamin Chaloner-Gill, San Jose, CA (US); Herman A. Lopez, Sunnyvale, CA (US); Xiangxin Bi, San Ramon, CA (US); Ronald J. Mosso, Fremont, CA (US); William E. McGovern, LaFayette, CA (US); James T. Gardner, San Jose, CA (US); Sujeet Kumar, Newark, CA (US); James A. Gilliam, Newman, CA (US); Vince Pham, San Jose, CA (US); Eric Euvrard, Mountain View, CA (US); Shivkumar Chiruvolu, San Jose, CA (US); Jesse Jur, Mountain View, CA (US)

(73) Assignee: NeoPhotonics Corporation, San Jose, CA (US)

( * ) Notice: Subject to any disclaimer, the term of this patent is extended or adjusted under 35 U.S.C. 154(b) by 0 days.

(21) Appl. No.: 10/977,608

(22) Filed: Oct. 29, 2004

(65) Prior Publication Data

US 2005/0118411 A1 Jun. 2, 2005

Related U.S. Application Data

(62) Division of application No. 10/099,597, filed on Mar. 15, 2002, now Pat. No. 6,849,334.

(60) Provisional application No. 60/313,588, filed on Aug. 17, 2001.

(51) Int. Cl.
*B32B 5/16* (2006.01)

(52) U.S. Cl. .......................... 428/402; 428/403; 501/3; 501/4; 501/5; 501/6; 501/7; 501/8; 501/9; 501/10; 501/42; 501/46; 501/49; 501/50; 501/53; 501/55; 501/64

(58) Field of Classification Search ................ 428/402, 428/403; 501/3–10, 42, 46, 49, 50, 53, 55, 501/64
See application file for complete search history.

(56) References Cited

U.S. PATENT DOCUMENTS

| | | | |
|---|---|---|---|
| 2,898,191 A | 8/1959 | Conn et al. | |
| 3,406,228 A | 10/1968 | Hardy et al. | |
| 3,691,088 A | 9/1972 | Pelton | |
| 3,776,754 A | 12/1973 | Levinos | |
| 3,984,586 A | 10/1976 | Kawarada et al. | |
| 4,073,675 A * | 2/1978 | Ballman et al. | ................ 117/3 |
| 4,116,864 A | 9/1978 | Kagami et al. | |
| 4,119,509 A | 10/1978 | Szoke | |
| 4,172,920 A | 10/1979 | Kanda et al. | |
| 4,176,024 A | 11/1979 | Garbuny | |
| 4,272,397 A | 6/1981 | Fukuda et al. | |
| 4,275,333 A | 6/1981 | Kagami et al. | |
| 4,340,839 A | 7/1982 | Fujita et al. | |
| 4,468,474 A | 8/1984 | Gupta et al. | |
| 4,536,252 A | 8/1985 | McDonald et al. | |
| 4,548,798 A | 10/1985 | Rice | |
| 4,556,416 A | 12/1985 | Kamijo et al. | |
| 4,558,017 A | 12/1985 | Gupta et al. | |
| 4,659,681 A | 4/1987 | Rice et al. | |
| 4,668,647 A | 5/1987 | Rice et al. | |
| 4,680,231 A | 7/1987 | Yamaura et al. | |
| 4,687,753 A | 8/1987 | Fiato et al. | |
| 4,689,129 A | 8/1987 | Knudsen | |
| 4,738,798 A | 4/1988 | Mahler | |
| 4,788,222 A | 11/1988 | Rice et al. | |
| 4,808,398 A | 2/1989 | Heistand, II | |
| 4,842,832 A | 6/1989 | Inoue et al. | |
| 4,844,736 A | 7/1989 | Shimo et al. | |
| 4,881,722 A | 11/1989 | Koizumi et al. | |
| 4,895,628 A | 1/1990 | Knudsen et al. | |
| 4,921,767 A | 5/1990 | Datta et al. | |
| 4,957,884 A | 9/1990 | Knudsen et al. | |

(Continued)

FOREIGN PATENT DOCUMENTS

DE 43 27 081 A1 2/1995

(Continued)

OTHER PUBLICATIONS

Goldstein et al., Observation of Melting in 30A Diameter CdS NanoCrystals, Met. Res. Soc. Symp. Proc. vol. 206, pp. 271-274, 1991.

(Continued)

*Primary Examiner*—Leszek Kiliman
(74) *Attorney, Agent, or Firm*—Dardi & Associates, PLLC; Peter S. Dardi

(57) ABSTRACT

Nanoscale particles, particle coatings/particle arrays and corresponding consolidated materials are described based on an ability to vary the composition involving a wide range of metal and/or metalloid elements and corresponding compositions. In particular, metalloid oxides and metal-metalloid compositions are described in the form of improved nanoscale particles and coatings formed from the nanoscale particles. Compositions comprising rare earth metals and dopants/additives with rare earth metals are described. Complex compositions with a range of host compositions and dopants/additives can be formed using the approaches described herein. The particle coating can take the form of particle arrays that range from collections of disbursable primary particles to fused networks of primary particles forming channels that reflect the nanoscale of the primary particles. Suitable materials for optical applications are described along with some optical devices of interest.

37 Claims, 22 Drawing Sheets

U.S. PATENT DOCUMENTS

| | | |
|---|---|---|
| 4,960,654 A | 10/1990 | Yoshinaka et al. |
| 5,013,706 A | 5/1991 | Schramm et al. |
| 5,064,517 A | 11/1991 | Shimo |
| 5,106,828 A | 4/1992 | Bhargava et al. |
| 5,128,063 A | 7/1992 | Kamikubo |
| 5,152,973 A | 10/1992 | Spencer |
| 5,207,878 A | 5/1993 | Shimo et al. |
| 5,250,281 A | 10/1993 | Imai et al. |
| 5,264,031 A | 11/1993 | Palmer et al. |
| 5,358,695 A | 10/1994 | Helble et al. |
| 5,442,254 A | 8/1995 | Jaskie |
| 5,447,708 A | 9/1995 | Helble et al. |
| 5,455,489 A | 10/1995 | Bhargava |
| 5,460,701 A | 10/1995 | Parker et al. |
| 5,498,369 A | 3/1996 | Bredol et al. |
| 5,527,519 A | 6/1996 | Miksits et al. |
| 5,635,154 A | 6/1997 | Arai et al. |
| 5,637,258 A | 6/1997 | Goldburt et al. |
| 5,643,496 A | 7/1997 | Brese et al. |
| 5,644,193 A | 7/1997 | Matsuda et al. |
| 5,699,035 A | 12/1997 | Ito et al. |
| 5,770,113 A | 6/1998 | Iga et al. |
| 5,770,126 A | 6/1998 | Singh et al. |
| 5,874,684 A | 2/1999 | Parker et al. |
| 5,893,999 A | 4/1999 | Tamatani et al. |
| 5,952,125 A | 9/1999 | Bi et al. |
| 5,952,665 A | 9/1999 | Bhargava |
| 5,958,348 A | 9/1999 | Bi et al. |
| 5,985,049 A | 11/1999 | Pinkerton et al. |
| 5,989,514 A | 11/1999 | Bi et al. |
| 6,036,886 A | 3/2000 | Chhabra et al. |
| 6,039,894 A | 3/2000 | Sanjurjo et al. |
| 6,048,616 A | 4/2000 | Gallagher et al. |
| 6,099,798 A | 8/2000 | Kambe et al. |
| 6,136,287 A | 10/2000 | Horne et al. |
| 6,180,029 B1 | 1/2001 | Hampden-Smith et al. |
| 6,187,225 B1 | 2/2001 | Rao |
| 6,193,908 B1 | 2/2001 | Hampden-Smith et al. |
| 6,193,936 B1 | 2/2001 | Gardner et al. |
| 6,210,604 B1 | 4/2001 | Hampden-Smith et al. |
| 6,225,007 B1 | 5/2001 | Horne et al. |
| 6,268,303 B1 | 7/2001 | Aitken et al. |
| 6,391,273 B1 | 5/2002 | Konrad et al. |
| 6,391,494 B2 | 5/2002 | Reitz et al. |
| 6,413,489 B1 | 7/2002 | Ying et al. |
| 6,482,374 B1 * | 11/2002 | Kumar et al. ............ 423/179.5 |
| 6,506,493 B1 | 1/2003 | Kumar et al. |
| 6,537,613 B1 * | 3/2003 | Senzaki et al. ............. 427/250 |
| 6,749,648 B1 * | 6/2004 | Kumar et al. ............... 29/623.1 |
| 6,849,334 B2 * | 2/2005 | McGovern et al. ......... 428/402 |

FOREIGN PATENT DOCUMENTS

| | | |
|---|---|---|
| JP | 61-67836 | 5/1986 |
| JP | 02309592 | 12/1990 |
| JP | 6-144867 | 5/1994 |
| JP | 2000-53445 | 2/2000 |
| WO | WO 86/04524 | 8/1986 |
| WO | WO 98/37165 | 8/1998 |
| WO | WO 99/23191 | 5/1999 |
| WO | WO 99/46204 | 9/1999 |
| WO | WO 99/50880 | 10/1999 |
| WO | WO 99/61244 | 12/1999 |
| WO | WO 00/27523 | 5/2000 |
| WO | WO 01/07155 | 2/2001 |
| WO | WO 02/32588 | 4/2002 |
| WO | WO 02/44765 | 6/2002 |
| WO | WO 02/088019 | 7/2002 |
| WO | WO 02/089233 | 7/2002 |
| WO | PCT/US02/25814 | 2/2003 |

OTHER PUBLICATIONS

Tissue et al., Synthesis and Characterization of Metal-Oxide Nanocrystals Prepared by $CO_2$—Laser-Heated Vaporization/Condensation, Journal of the SID, vol. 4(3), pp. 213-217, Oct. 1996.

Siegel, Creating Nanophase Materials, Scientific American; 2 pages, Dec. 1996.

El-Shall et al., Synthesis of Nanoparticles by a Laser Vaporization-Controlled Condensation Technique, SPIE, vol. 3123, pp. 98-108, Jul. 1997.

Oshio et al., Firing Technique for Preparing a $BaMgAl_{10}O_{17}:Eu^{2+}$ Phosphor with Controlled Particle Shape and Size, Journal of the Electrochemical Society, 146(1), pp. 392-399, 1999.

Konrad et al., Chemical Vapor Synthesis and Luminescence Properties of Nanocrystalline Cubic $Y_2O_3$:Eu, J. Appl. Phys., vol. 86, No. 6, pp. 3129-3133, Sep. 15, 1999.

Jeon et al., Spherical $BaMgAl_{10}O_{17:Eu}^{2+}$ Phosphor Prepared by Aerosol Pyrolysis Technique for PDP Applications, Journal of the Electrochemical Society, 148(9) H128-H131, 2001.

Andres et al., "Research opportunities on clusters and cluster-assembled materials—A Department of Energy, Council on Materials Science Panel Report," J. Mater. Res., vol. 4, No. 3, pp. 704-736, May/Jun. 1989.

Bi et al., "Nanocrystalline α-Fe, $Fe_3C$, and $Fe_7C_3$ produced by $CO_2$ laser pyrolysis," J. Mater. Res., vol. 8, No. 7, pp. 1666-1674, Jul. 1993.

Bi et al., "Nanoscale carbon blacks produced by $CO_2$ laser pyrolysis," J. Mater Res., vol. 10, No. 11, pp. 2875-2884, Nov. 1995.

Buerki et al., "Synthesis of Ultrafine $Si_3N_4$ Particles by $CO_2$-Laser Inducted Gas Phase Reactions," High Temperature Science, vol. 27, pp. 323-335, 1990.

Cannon et al., "Sinterable Ceramic Powders from Laser-Driven Reactions: I, Process Description and Modeling," J. of the American Ceramic Society, vol. 65, No. 7, pp. 324-330, Jul. 1982.

Cannon et al., "Sinterable Ceramic Powders from Laser-Driven Reactions: II, Powder Characteristics and Process Variables," J. of the American Ceramic Society, vol. 65, No. 7, pp. 330-335, Jul. 1982.

Curcio et al., "Synthesis of ultrafine $TiO_2$ powders by a CW $CO_2$ laser," Applied Surface Science, 46:225-229, 1990.

Danen et al., "Infrared laser generation of heterogeneous catalysts and laser-induced reactions at catalytic surfaces," SPIE, vol. 458, Applications of Lasers to Industrial Chemistry, pp. 124-130, 1984.

Fantoni et al., "Synthesis of ultrafine ceramic powders by means of $CO_2$ laser in a flow reactor," SPIE, vol. 1279, Laser Assisted Processing, II, pp. 77-88, 1990.

Flint et al., "Ceramic powders from laser driven reactions," SPIE, vol. 458, Applications of Lasers to Industrial Chemistry, pp. 108-113, 1984.

Smith, "Laser pyrolysis techniques: Application to catalysis, combustion diagnostics and kinetics," SPIE., vol. 458, Applications of Lasers to Industrial Chemistry, pp. 11-16, 1984.

Gupta et al., "Production of light olefins from synthesis gas using catalysts prepared by laser pyrolysis," SPIE, vol. 458, Applications of Lasers to Industrial Chemistry, pp. 131-139, 1984.

Haggerty et al., "Sinterable Powders from Laser-Driven Reactions," in Laser-Induced Chemical Processes, edited by Jeffrey I. Steinfeld, pp. 165-241, 1981.

McMillen et al., "Laser-Powdered Homogeneous Pyrolysis. Thermal Studies under Homogeneous Conditions, Validation of the Technique, and Application to the Mechanism of Azo Compound Decomposition," J. Phys. Chem., 86:709-718, 1982.

Musci et al., "Laser synthesis of vanadium-titanium oxide catalysts," J. Mater. Res., vol. 7, No. 10, pp. 2846-2852, Oct. 1992.

Rice et al., "Laser-Driven Synthesis of Transition-Metal Carbides, Sulfides and Oxynitrides," in Laser Chemistry of Organometallics, pp. 273-278, 1993.

Rice et al., "Material Synthesis by Laser Heating of Gasses," Spectrochimica Acta., vol. 43A, No..2, pp. 229-300, 1987.

Rice et al., "Laser synthesis of powders from large molecules," SPIE, vol. 458, Applications of Lasers to Industrial Chemistry, pp. 98-107, 1984.

Siegel et al., "Synthesis, characterization, and properties of nanophase $TiO_2$," J. Materials Research, 3:1367-1372, 1988.

Woodin et al., "Analytical applications of laser powered pyrolysis," SPIE vol. 458, Applications of Lasers to Industrial Chemistry, pp. 28-34, 1984.

Zhou et al., Chemical Abstract citation 135:144231: "Mechanism of thermal degradation of blue BaMgAl10017:Eu (Bam) phosphor," Faguang Xuebao, 21(4), 345-348, 2000.

Tanaka et al., Chemical Abstract citation 132:327319: "Blue emitting CaAl204:eu2+ phosphors for PDP application," Journal of Luminescence, 87-89, 1250-1253, 2000.

Nishikawa et al., Chemical Abstract citation 131:150944: "Photoluminescence imaging of phosphor particles using near-field optical microscope with UV light excitation," Journal of Microscopy (Oxford), 194(2/3), 415-420, 1999.

Ramponi et al., "New Er-doped phosphate glass for ion-exchange active waveguides: accurate determination of the refraction index," Optical Materials, 14, pp. 292-296, 2000.

Bender et al., "Synthesis and Fluorescence of Neodymium-Doped Barium Fluoride Nanoparticles," Chem. Mater., vol. 12, No. 7, pp. 1969-1976, 2000.

Lee et al., "Controlled formation of nanoparticles utilizing laser irradiation in a flame and their characteristics," Applied Physics Letters, vol. 79, No. 15, pp. 2459-2461, Oct. 8, 2001.

Vermelho et al., "The influence of sodium ions on rare-earth solubility in silica-on-silicon $SiO_2$-$P_2O_5$ glass hosts fabricated by flame hydrolysis deposition," Proceedings of SPIE, vol. 4277, pp. 381-387, 2001.

Ballato et al., "Fabrication of fibers with high rare-earth concentrations for Faraday isolator applications," Applied Optics, vol. 34, No. 30, pp. 6848-6854, Oct. 20, 1995.

Bi et al., "Three Dimensional Engineering of Planar Optical Structures," U.S. Appl. No. 10/027,906, filed Dec. 21, 2002, 131 pages (application & drawings as filed).

Bryan, "Reactive Deposition for the Formation of Chip Capacitors," U.S. Appl. No. 10/219,019, filed Aug. 14, 2002, 43 pages (application & drawings as filed).

* cited by examiner

# US 7,306,845 B2

OPTICAL MATERIALS AND OPTICAL DEVICES

CROSS REFERENCE TO RELATED APPLICATIONS

This application is a divisional of U.S. patent application Ser. No. 10/099,597 filed Mar. 15, 2002, now U.S. Pat. No. 6,849,334 to Horne et al., entitled "Optical Materials And Optical Devices, which claims priority to copending U.S. Provisional Patent Application Ser. No. 60/313,588 filed Aug. 17, 2001 to Horne et al., entitled "Doped Glass Materials," both of which are incorporated herein by reference.

FIELD OF THE INVENTION

The invention relates to particles and densified compositions, especially those with desirable optical properties. More particularly, in some embodiments the invention relates to ultrafine rare earth metal oxides as well as particles and densified material, e.g., amorphous particles, crystalline particles and glasses, that are doped to modify the material properties thereof, especially rare earth doped glasses. Furthermore, the invention relates to methods for forming doped compositions involving the formation of a powder using a reaction with flowing reactants and subsequent consolidation into a consolidated optical material, e.g., a glass, polycrystalline material, crystalline material, or combination thereof.

BACKGROUND OF THE INVENTION

An explosion of communication and information technologies including internet based systems has motivated a world wide effort to implement optical communication networks to take advantage of a large bandwidth available with optical communication. The capacity of optical fiber technology can be expanded further with implementation of Dense Wavelength Division Multiplexing technology. With increasing demands, more channels are needed to fulfill the system functions. Integrated planar components can be used to replace discrete optical components to supply the desired capacity. To form these integrated structures, there is considerable interest in the formation of specific compositions applied to substrates. In order to form optical devices with high quality optical coatings from these materials, the coating properties need to be specified accordingly.

SUMMARY OF THE INVENTION

In one aspect, the invention pertains to a collection of particles comprising one or more of the following: amorphous particles comprising non-rare earth metal/metalloid host composition and a rare earth metal dopant/additive; particles comprising a metalloid oxide selected from the group consisting of $B_2O_3$ and $TeO_2$; amorphous particles comprising $GeO_2$ and a metal/metalloid dopant/additive; particles comprising a composition selected from the group consisting of $LiNbO_3$ and $LiTaO_3$; particles comprising a metal/metalloid composition selected from the group consisting of a metal/metalloid arsinide, a metal/metalloid calcinate, a metal/metalloid telluride, a metal/metalloid phosphide and a metal/metalloid selenide; particles comprising a first metal/metalloid, a transition metal different from the first metal/metalloid and a fluorine dopant/additive thereof; particles comprising a glass forming host composition, a first dopant/additive that introduces an absorption at a first wavelength of the electromagnetic spectrum and an emission at a second wavelength larger than the first wavelength and a second dopant/additive that creates a lasting change in index-of-refraction of the particles as a result of exposure to a third wavelength of electromagnetic radiation; particles comprising a glass forming host composition, a first dopant/additive that introduces an absorption at a first wavelength of the electromagnetic spectrum and an emission at a second wavelength larger than the first wavelength; and/or particles comprising an oxide composition, the oxide composition comprising silicon, an alkali metal or alkali earth metal and a third metal/metalloid element. The collection of particles typically has an average diameter no more than about 500 nm and/or, alternatively or in addition, no more than about 250 nm.

In a further aspect, the invention relates to a collection of amorphous particles comprising a metalloid oxide selected from the group consisting of $B_2O_3$ and $TeO_2$, and a metal/metalloid dopant/additive. The collection of particles generally has an average diameter no more than about 1000 nm. Moreover, the particles typically comprise at least about 51 mole percent metalloid oxide content relative to the total metalloid oxide and dopant/additive composition content of the particles.

In an additional aspect, the invention pertains to preforms comprising a powder array. The powder array generally comprises an average primary particle diameter of no more than about 500 nm. Further, the powder array comprises at least one composition selected from the group consisting of a non-rare earth metal/metalloid host composition and a rare earth metal dopant/additive; $B_2O_3$; $TeO_2$; $GeO_2$ and a metal/metalloid dopant/additive; $LiNbO_3$; $LiTaO_3$; a metal/metalloid arsinide; a metal/metalloid telluride; a metal/metalloid calcinate; a metal/metalloid phosphide; a metal/metalloid selenide; a first metal/metalloid, a transition metal different from the first metal/metalloid and a fluorine, chlorine, carbon or nitrogen dopant/additive; a host composition, a first dopant/additive that introduces an absorption at a first wavelength of the electromagnetic spectrum and an emission at a second wavelength higher than the first wavelength and a dopant/additive that creates a lasting change in index-of-refraction of the particles as a result of exposure to a third wavelength; an oxide composition comprising silicon, an alkali metal or alkali earth metal and a third metal/metalloid element; and a host composition, a first dopant/additive that introduces an absorption at a first wavelength of the electromagnetic spectrum and an emission at a second wavelength larger than the first wavelength and a second dopant/additive that introduces paramagnetism to the particles.

In another aspect, the invention relates to a method for producing product particles comprising a composition selected from the group consisting of an amorphous non-rare earth metal/metalloid host composition and a rare earth metal dopant/additive; $B_2O_3$; $TeO_2$; $GeO_2$ and a metal/metalloid dopant/additive; $LiNbO_3$; $LiTaO_3$; a metal/metalloid arsinide; a metal/metalloid telluride; a metal/metalloid calcinate; a metal/metalloid phosphide; a metal/metalloid selenide; a first metal/metalloid, a transition metal different from the first metal/metalloid and a fluorine, chlorine, carbon or nitrogen dopant/additive; a glass forming host composition, a first dopant/additive that introduces an absorption at a first wavelength of the electromagnetic spectrum and an emission at a second wavelength higher than the first wavelength and a dopant/additive that creates a lasting change in index-of-refraction of the particles as a result of exposure to a third wavelength; oxide composition comprising silicon, an alkali metal or alkali earth metal and a third metal/metalloid element; and a glass forming host composition, a first dopant/additive that introduces an absorption at a first wavelength of the electromagnetic spectrum and an emission at a second wavelength larger than the first wavelength and a second dopant/additive that introduces paramagnetism to the particles. The method can comprise reacting a reactant stream within a reaction chamber. Further, the reactant stream can comprise selected precursors to produce the desired composition. Moreover, the reaction can be driven by a radiation source and under conditions that result in formation of product particles comprising the composition.

In a further aspect, the invention pertains to a method for forming a preform comprising a powder array, the powder array formed from at least one collection of product particles, each of the collection(s) of product particles comprising a composition independently selected from the group consisting of a non-rare earth metal/metalloid host composition and a rare earth metal dopant/additive; $B_2O_3$; $TeO_2$; $GeO_2$ and a metal/metalloid dopant/additive; $LiNbO_3$; $LiTaO_3$; a metal/metalloid arsinide; a metal/metalloid telluride; a metal/metalloid calcinate; a metal/metalloid phosphide; a metal/metalloid selenide; a first metal/metalloid, a transition metal different from the first metal/metalloid and a fluorine, chlorine, carbon or nitrogen dopant/additive; a host composition, a first dopant/additive that introduces an absorption at a first wavelength of the electromagnetic spectrum and an emission at a second wavelength higher than the first wavelength and a dopant/additive that creates a lasting change in index-of-refraction of the particles as a result of exposure to a third wavelength; oxide composition comprising silicon, an alkali metal or alkali earth metal and a third metal/metalloid element; and a host composition, a first dopant/additive that introduces an absorption at a first wavelength of the electromagnetic spectrum and an emission at a second wavelength larger than the first wavelength and a second dopant/additive that introduces paramagnetism to the particles. The method can comprise reacting a reactant stream within a reaction chamber to form product particles, wherein the reactant stream comprises selected precursors to produce the desired composition(s), and wherein the reaction can be driven by a radiation source. Further, the method can comprise coating product particles onto at least a portion of a substrate surface from a product particle stream.

In an additional aspect, the invention relates to a method for producing product particles comprising a composition selected from the group consisting of an amorphous non-rare earth metal/metalloid host composition and a rare earth metal dopant/additive; $B_2O_3$; $TeO_2$; $GeO_2$ and a metal/metalloid dopant/additive; $LiNbO_3$; $LiTaO_3$; a metal/metalloid arsinide; a metal/metalloid telluride; a metal/metalloid calcinate; a metal/metalloid phosphide; a metal/metalloid selenide; a first metal/metalloid, a transition metal different from the first metal/metalloid and a fluorine, chlorine, carbon or nitrogen dopant/additive; a glass forming host composition, a first dopant/additive that introduces an absorption at a first wavelength of the electromagnetic spectrum and an emission at a second wavelength higher than the first wavelength and a dopant/additive that creates a lasting change in index-of-refraction of the particles as a result of exposure to third wavelength; oxide composition comprising silicon, an alkali metal or alkali earth metal and a third metal/metalloid element; and a glass forming host composition, a first dopant/additive that introduces an absorption at a first wavelength of the electromagnetic spectrum and an emission at a second wavelength larger than the first wavelength and a second dopant/additive that introduces paramagnetism to the particles. In one embodiment, the method comprises reacting reactants to produce product particles at a rate of at least about 25 grams per hour. In an alternative or additional embodiment, the method comprises reacting reactants to produce product particles at a rate of at least about 100 grams per hour.

In another aspect, the invention pertains to a method for forming a preform comprising a powder array, the powder array formed from at least one collection of particles, each of the collection(s) of particles comprising a composition independently selected from the group consisting of an amorphous non-rare earth metal/metalloid host composition and a rare earth metal dopant/additive; $B_2O_3$; $TeO_2$; $GeO_2$ and a metal/metalloid dopant/additive; $LiNbO_3$; $LiTaO_3$; a metal/metalloid arsinide; a metal/metalloid telluride; a metal/metalloid calcinate; a metal/metalloid phosphide; a metal/metalloid selenide; a first metal/metalloid, a transition metal different from the first metal/metalloid and a fluorine, chlorine, nitrogen, carbon dopant/additive; a glass forming host composition, a first dopant/additive that introduces an absorption at a first wavelength of the electromagnetic spectrum and an emission at a second wavelength higher than the first wavelength and a dopant/additive that creates a lasting change in index-of-refraction of the particles as a result of exposure to a third wavelength; oxide composition comprising silicon, an alkali metal or alkali earth metal and a third metal/metalloid element; and a glass forming host composition, a first dopant/additive that introduces an absorption at a first wavelength of the electromagnetic spectrum and an emission at a second wavelength larger than the first wavelength and a second dopant/additive that introduces paramagnetism to the particles. In one embodiment, the method comprises coating particles onto a substrate surface at a rate of at least about 10 grams per hour. In an alternative or additional embodiment, the method comprises reacting reactants to produce the particles. In a further alternative or additional embodiment, substantially the entire substrate surface is coated to a thickness of about 10 microns in no more than about 25 seconds.

In a further aspect, the invention relates to a method for producing a doped glass layer. The method can comprise applying a solution to a powder array. Generally, the solution comprises a first metal/metalloid composition comprising at least one metal/metalloid element and a solvent in which the first metal/metalloid composition is soluble. Typically, the powder array comprising a second metal/metalloid composition that is effectively insoluble in the solvent and the powder array having an average primary particle diameter of no more than about 500 nm. The method can further comprise heating the powder array with the applied solution above the flow temperature of the powder array to produce a substantially consolidated material comprising the second metal/metalloid composition combined with the at least one metal/metalloid element.

In an additional aspect, the invention pertains to a method for producing a product composition comprising a plurality of metal/metalloid elements. The method can comprise generating a flowing reactant stream with a nozzle. Typically, the nozzle is connected to an aerosol generator that is configured to deliver an aerosol comprising one or more metal/metalloid elements and to a vapor/gas source that is configured to deliver a vapor/gas comprising one or more metal/metalloid elements. The method can further comprise reacting the flowing reactant stream to produce the product composition.

In another aspect, the invention relates to a method for the production of product particles. The method can comprise generating an aerosol comprising a liquid within a reactant delivery system. The method can further comprise evaporating the liquid to form reactant particles that are delivered through a reactant delivery nozzle into a reaction chamber as at least a portion of a reactant stream. The method can also comprise reacting the reactant stream to form product particles.

In a further aspect, the invention pertains to a method for generating a coated substrate. The method can comprise generating an aerosol comprising a liquid within a reactant delivery system. The method can further comprise evaporating the liquid to form reactant particles that are delivered through a delivery nozzle. The method can also comprise reacting the reactant particles to form product particles. The method can additionally comprise depositing at least a portion of the product particles onto a substrate.

In an additional aspect, the invention relates to a method for producing a coating. The method can comprise forming a product flow by reacting a reactant stream within a reaction chamber, wherein at least a portion of the reactant stream is initiated through a reactant nozzle. The method can also comprise depositing a coating by directing the product flow at a substrate surface to produce a coated surface. The method can further comprise directing an unreacted stream onto the coated surface through the reactant nozzle.

In another aspect, the invention pertains to a method for producing a composition in a reactant flow. The method can comprise generating a flowing reactant stream with at least one reactant nozzle within a reaction chamber at a chamber pressure. Typically, the flow to the nozzle can comprise a reaction precursor and a pressurized fluid. Generally, the chamber pressure is sufficiently low to permit the pressurized fluid to evaporate upon entry into the reaction chamber and the pressurized fluid vaporizes upon entry into the reaction chamber. The method can further comprise reacting the flowing reactant stream to produce the composition.

In a further aspect, the invention relates to a method for doping a composition. The method can comprise contacting a solution comprising a metal/metalloid ion with a powder array comprising the composition. The method can further comprise applying an electric field across a dimension of the powder array to stimulate migration of the metal/metalloid ions into the composition.

In an additional aspect, the invention pertains to a method for forming a glass on a substrate surface with varying dopant/additive concentrations across the substrate surface. The method can comprise generating a reactant flow comprising a host precursor and a dopant/additive precursor in an aerosol that comprises a selectable composition. The method further can comprise reacting the reactant flow to form a product flow comprising a product composition. The method also can comprise coating the product compositions onto a surface by moving the substrate surface relative to the product flow. The method additionally can comprise selecting the composition of dopant/additive precursor in the reactant flow to deposit different product compositions at different locations along the substrate surface.

In another aspect, the invention relates to an optical device and a method of making the same. The optical device typically comprises at least one layer of glass and an over-cladding over the at least one layer of glass wherein the over-cladding comprises glass comprising a fluorine dopant/additive. The method generally comprises applying a glass comprising a fluorine dopant/additive over at least one layer of glass.

In a further aspect, the product primary particles pertaining to the invention optionally can have one or more additional properties. In one embodiment, the product primary particles have a size distribution such that effectively no primary particles have a diameter greater than about 5 times the average diameter. In an alternative or additional embodiment, the product primary particles comprise a distribution of particle diameters wherein at least about 95 percent of the primary particles have a diameter greater than about 45 percent of the average diameter and less than about 200 percent of the average diameter.

BRIEF DESCRIPTION OF THE DRAWINGS

FIG. 1 is a schematic, sectional view of an embodiment of a laser pyrolysis apparatus, where the cross section is taken through the middle of the radiation path. The upper insert is a bottom view of the collection nozzle, and the lower insert is a top view of the injection nozzle.

FIG. 2 is a schematic, side view of a reactant delivery apparatus for the delivery of vapor reactants to the laser pyrolysis apparatus of FIG. 1.

FIG. 3A is a schematic, sectional view of a reactant delivery apparatus for the delivery of an aerosol reactant to the laser pyrolysis apparatus of FIG. 1, the cross section being taken through the center of the apparatus.

FIG. 3B is a schematic, sectional view of a reactant delivery apparatus with two aerosol generators within a single reactant inlet nozzle.

FIG. 4 is a schematic sectional view of an inlet nozzle of a reactant delivery system for the delivery of both vapor and aerosol reactants in which the vapor and aerosol combine within the nozzle.

FIG. 5 is a schematic sectional view of an inlet nozzle of a reactant delivery system for the delivery of both vapor and aerosol reactants in which the vapor and aerosol combine within the reaction chamber prior to reaching a radiation beam.

FIG. 6 is a perspective view of an alternative embodiment of a laser pyrolysis apparatus.

FIG. 7 is a sectional view of the inlet nozzle of the alternative laser pyrolysis apparatus of FIG. 4, the cross section being taken along the length of the nozzle through its center.

FIG. 8 is a sectional view of the inlet nozzle of the alternative laser pyrolysis apparatus of FIG. 4, the cross section being taken along the width of the nozzle through its center.

FIG. 9 is a perspective view of an embodiment of an elongated reaction chamber for performing laser pyrolysis.

FIG. 10 is a perspective view of an embodiment of an elongated reaction chamber for performing laser pyrolysis.

FIG. 11 is a cut away, side view of the reaction chamber of FIG. 10.

FIG. 12 is a partially sectional, side view of the reaction chamber of FIG. 10, taken along line 12-12 of FIG. 10.

FIG. 13 is a fragmentary, perspective view of an embodiment of a reactant nozzle for use with the chamber of FIG. 10.

FIG. 14 is a schematic diagram of a light reactive deposition apparatus formed with a particle production apparatus connected to a separate coating chamber through a conduit.

FIG. 15 is a perspective view of a coating chamber where the walls of the chamber are transparent to permit viewing of the internal components.

FIG. 16 is perspective view of a particle nozzle directed at a substrate mounted on a rotating stage.

FIG. 17 is a schematic diagram of a light reactive deposition apparatus in which a particle coating is applied to a substrate within the particle production chamber.

DETAILED DESCRIPTION OF THE INVENTION

Figure 1:
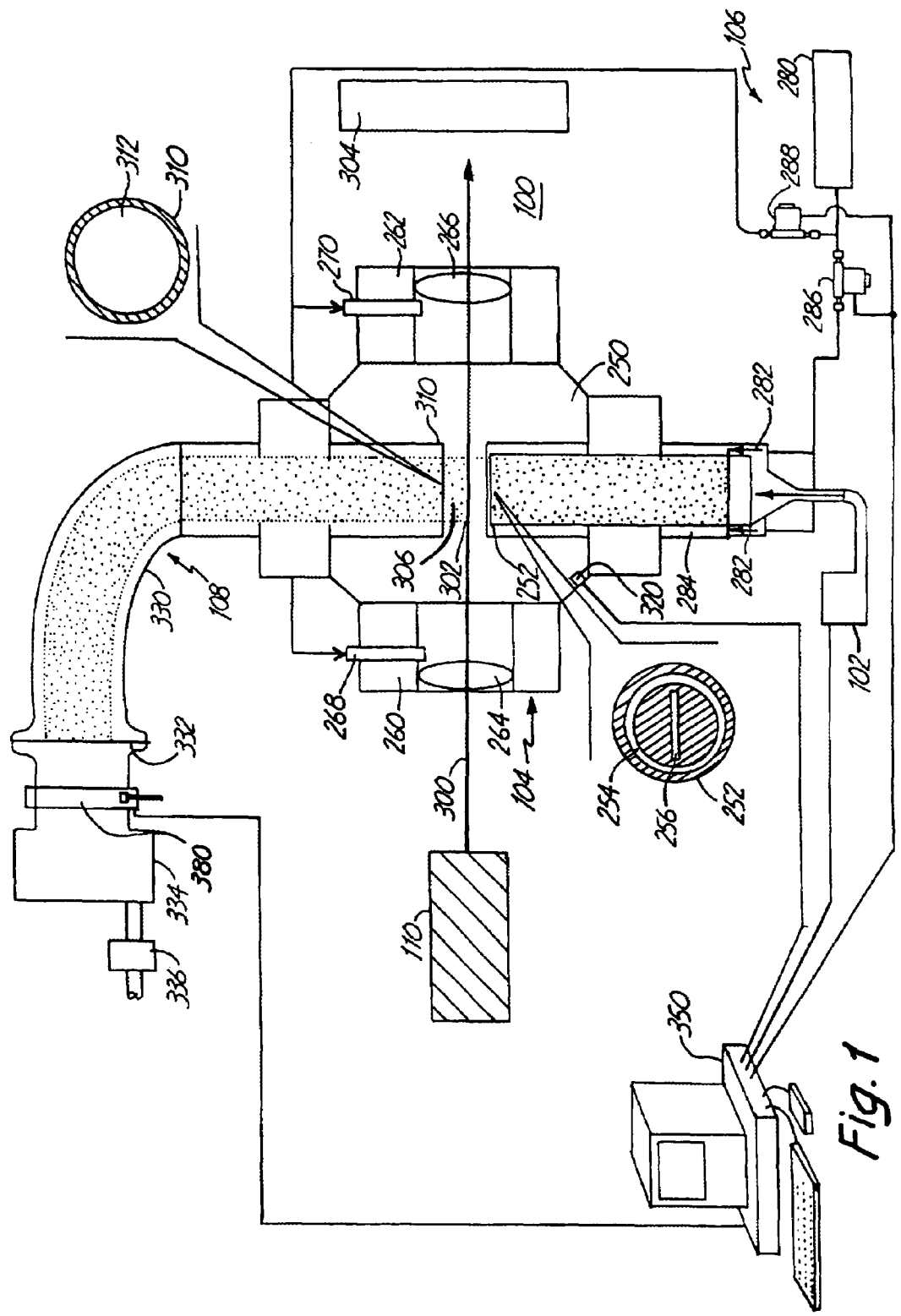

Powders, consolidated layers and intermediate densified materials can be produced with a wide range of selectable compositions, in particular with rare earth elements as well as other desirable optical materials. The approaches for producing these materials provide for the production of particles and coatings with high uniformity while operating at high production rates. In particular, a variety of optical materials with improved properties can be produced. With respect to some embodiments, amorphous powders and glasses can be formed with rare earth dopants/additives in an oxide host, and in particular, amorphous metalloid oxide materials can be formed, in some embodiments, with rare earth metal dopants/additives and/or with other metal dopants/additives. The amorphous powders generally have submicron or nanometer average diameters. Smooth thin layers of desired materials can be formed with selected compositions, which in some embodiments comprise one or more of various dopants/additives. Suitable dopants/additives comprise, for example, rare earth metals, which can impart desirable modifications of properties, such as index-of-refraction and selective optical absorption. Furthermore, powders and consolidated layers can be formed with complex compositions comprising one or a plurality of selected dopants/additives in a host material, which can be a simple or complex material involving three, four or more elements selected from all the elements of the periodic table. In appropriate embodiments, the powders can be useful as optical materials and the like, either with or without additional processing. The consolidated layers, e.g., glass layers, can be formed by directly depositing a particle coating using a reactive deposition process and subsequently consolidating the powder into a uniform, densified layer. The uniform glass layers can be formed into planar optical devices, which may be integrated on the plane to form integrated planar structures.

Generally, the flowing reaction approaches discussed herein incorporate a reactant flow that can comprise vapor(s), aerosol(s) or suitable combinations thereof to introduce desired elements into the flow stream. In addition, selection of the reaction conditions can correspondingly vary the nature of the resulting reaction product. Thus, a tremendous versatility has been achieved with respect to the production of desirable inorganic materials, especially amorphous particles, crystalline particles and glass coatings. In some embodiments, an intense radiation source is used to drive the reaction of the flowing reactant stream.

Specifically with respect to particles, submicron inorganic particles with various stoichiometries, sizes and crystal structures have been produced by chemical reaction with flowing reactants, especially by laser pyrolysis using an intense radiation beam, alone or with additional processing. Specifically, it has been discovered that submicron and nanoscale particles, e.g., amorphous particles, with a range of compositions can be produced, optionally, with selected dopants/additives, including rare earth metals, using laser pyrolysis and other flowing reactor systems. Using the approaches described herein, a variety of new materials can be produced. The dopants/additives generally can be introduced at desired amounts by varying the composition of the reactant stream. The dopants/additives can be introduced into an appropriate host material, e.g., a glass forming material. In addition, new materials involving stoichiometric compositions or doped variations thereof can be formed including, for example, desirable optical materials.

Collections of amorphous particles of particular interest have an average primary particle diameter less than a micron. Particles produced in a radiation driven reactor can have high uniformity with respect to composition and particle size, such as a lack of particles with sizes much larger than the average particle size. In some embodiments, the collection of particles also comprises a narrow distribution of particle diameters. To generate desired submicron/nanoscale particles, a flowing stream reactor, especially a radiation-driven pyrolysis reactor, e.g., laser pyrolysis reactor, can be used either alone or in combination with additional processing, such as heat processing and/or doping. Specifically, radiation-driven pyrolysis has been found to be a valuable process for efficiently producing submicron (less than about 1 micron average diameter) and nanoscale (in the range(s) of less than about 100 nm average diameter)

particles with high uniformity. For convenience, this application refers interchangeably to radiation-driven pyrolysis and laser pyrolysis. Laser pyrolysis can be adapted for directly forming a coating. The resulting coating process is a radiation-based reactive deposition. For convenience, this application refers interchangeably to radiation-based reactive deposition and light reactive deposition.

Because of the achievability of high uniformity of the product particles, laser pyrolysis is a desirable approach for producing submicron doped particles and particle with complex compositions. However, other approaches involving flowing reactant streams can be used to synthesize submicron doped particles based on the disclosure herein. Suitable alternative approaches include, for example, flame pyrolysis and thermal pyrolysis. The approaches for particle formation have the common characteristic that the reactants are generated in a flow, which reactants are then reacted within the flow to generate product particles in a continuous production process. The product particles within the flow are directed to a collector and/or substrate surface for coating, which results in the removal of the product particles from the flow. While the product particles are produced within a flow, the composition and other characteristics of the product particles can be modified prior to, during or following removal of the particles from the flow.

Flame pyrolysis can be performed with a hydrogen-oxygen flame, wherein the flame supplies the energy to drive the pyrolysis. Such a flame pyrolysis approach should produce some of the materials which can be produced by the laser pyrolysis techniques herein, except that flame pyrolysis approaches generally do not produce comparable high uniformity and a narrow particle size distribution that can be obtained by laser pyrolysis. In addition, flame pyrolysis generally does not have production rates comparable to high production rates obtainable with high rate laser pyrolysis systems. A suitable flame production apparatus used to produce oxides is described in U.S. Pat. No. 5,447,708 to Helble et al., entitled "Apparatus for Producing Nanoscale Ceramic Particles," incorporated herein by reference. Furthermore, submicron/nanoscale doped amorphous particles can be produced by adapting reactant delivery aspects of the laser pyrolysis methods with a thermal reaction chamber such as the apparatus described in U.S. Pat. No. 4,842,832 to Inoue et al., "Ultrafine Spherical Particles of Metal Oxide and a Method for the Production Thereof," incorporated herein by reference.

A basic feature of successful application of laser pyrolysis for the production of desired particles, e.g., doped particles and particles with complex compositions, is production of a reactant stream comprising suitable amounts of appropriate host precursors and dopant/additive precursors, if any. Similarly, an additional radiation absorber can further be comprised in the reactant stream, optionally, for example, when one or more of the precursor(s) is not an appropriate radiation absorber. Other additional reactants can be used to adjust the oxidizing/reducing environment in the reactant stream.

In laser pyrolysis, the reactant stream is pyrolyzed by an intense radiation beam, such as a laser beam. While a laser beam is a convenient energy source, other intense electromagnetic radiation (e.g., light) sources can be used in laser pyrolysis. Laser pyrolysis provides for formation of phases of materials that can be difficult to form under thermodynamic equilibrium conditions. As the reactant stream leaves the light beam, the product particles are rapidly quenched. For the production of doped amorphous or crystalline materials, the present approaches have the advantage that the composition of the materials can be adjusted over desirable ranges. In particular, the methods are suitable for the introduction of a variety of dopants/additives, including, for example and without limitation, rare earth metal dopants/additives.

To perform laser pyrolysis, one or more reactants can be supplied in vapor form. Alternatively or in addition, one or more reactants can be supplied as an aerosol. The use of an aerosol provides for the use of a wider range of precursors for laser pyrolysis than are suitable for vapor delivery only. In some cases, less expensive precursors can be used with aerosol delivery. Suitable control of the reaction conditions with the aerosol and/or vapor results in nanoscale particles with a narrow particle size distribution. In addition, particles produced by laser pyrolysis can be subjected to heating to alter the particle properties and/or to consolidate the amorphous particles into a uniform glass.

Particles, e.g., amorphous particles and crystalline particles, generally can be formed with metal/metalloid oxide particles produced under appropriate conditions in a laser pyrolysis apparatus, and some embodiments with other flow reactors adapted using reactant delivery as described herein. Some metal/metalloid oxides are particularly desirable for optical applications and/or for their ability to consolidate into uniform optical layers, e.g., glass layers. Suitable glass forming host oxides for doping include, for example, metal/metalloid calcinates, $TiO_2$, $SiO_2$, $GeO_2$, $Al_2O_3$, $P_2O_5$, $B_2O_3$, $TeO_2$, and combinations and mixtures thereof. Also, some crystalline particles and uniform layers have desirable properties, e.g., optical properties. Crystalline oxide materials with desirable optical properties include, for example, lithium niobate ($LiNbO_3$) and lithium tantalate ($LiTaO_3$). These materials can be consolidated in a dry oxygen, dry argon or dry nitrogen at elevated temperatures to from an aligned film. Control of the temperature during densification can be used to control alignment, although selection of a suitable substrate surface can further promote alignment if the substrate surface is crystalline with appropriate lattice parameters. An external magnetic field can also be used to promote alignment of the crystal. Some non-oxide materials are also of interest due to their properties, e.g., optical properties. Some materials of interest include, for example, metal/metalloid arsinides, metal/metalloid phosphides, e.g., InP, metal/metalloid selenides, metal/metalloid sulfides, and metal/metalloid tellurides.

Silica ($SiO_2$) based glasses can be of particular interest since these glasses can be used in a variety of optical applications. Silica can be combined with other materials to form amorphous particles and consolidated glasses of interest. For example, silica-based glasses of interest for optical applications include, for example, aluminosilicates (combinations of $Al_2O_3$ and $SiO_2$), lime-silicates (combinations of CaO and $SiO_2$), sodium aluminosilicates (combinations of $Na_2O$, $Al_2O_3$ and $SiO_2$) and soda-lime silicates (combinations of $Na_2O$, CaO and $SiO_2$).

Dopants/additives can be introduced to vary properties of the particles, a corresponding uniform layer and/or a powder array, i.e. a network of fused or partly fused particles in which at least some characteristics of the initial primary particles are reflected within the array. For example, dopants/additives can be introduced to change the index-of-refraction or processing properties, e.g., flow temperature, of a material. For optical applications, the index-of-refraction can be varied to form specific optical devices that operate with light of a selected frequency range. Dopants/additives can also interact within the materials. For example, some dopants/additives can be introduced to increase the solubility of other dopants/additives.

Some dopants/additives are of particular interest in the formation of optical materials, especially for silica-based glasses. Rare earth dopants/additives can be optionally introduced into metal/metalloid oxides. Rare earth dopants/additives can be used for their modification of optical properties, e.g., fluorescence, of the resulting doped material. Rare earth doped glasses are useful in the production of optical amplifiers. Metal/metalloid oxides can also be doped with fluorine, chlorine, nitrogen and/or carbon, which substitute for oxygen. Other dopants/additives can be added to change the absorption properties, emission properties, magnetic properties and/or photosensitivity, e.g., the change of index-of-refraction in response to irradiation with appropriate light. Some particular doped materials of interest include, for example, an amorphous non-rare earth metal/metalloid host composition and a rare earth metal dopant/additive; a metal/metalloid oxide and a metal dopant/additive that introduces paramagnetism; a metalloid oxide and a metal/metalloid dopant/additive; a first metal/metalloid, a transition metal different from the first metal/metalloid and a fluorine, chlorine, carbon and/or nitrogen dopant/additive; a glass forming host composition, a first dopant/additive that introduces an absorption at a first wavelength of the electromagnetic spectrum and an emission at a higher wavelength and a dopant/additive that introduces a lasting change in index-of-refraction of the particles as a result of exposure to ultraviolet or visible light.

A process has been developed, termed light reactive deposition, to form highly uniform coatings and structures. Light reactive deposition involves a radiation driven, e.g., laser driven, flowing reactor configured for the immediate deposition of particles onto a surface. As with laser pyrolysis, the reactants are directed from a reactant source into a flow. The reactants can be reacted in the flow to form product particles within the flow, which can be subsequently deposited on a substrate surface. The deposition can be performed within the reaction chambers or in a coating chamber connected to the reaction chamber. Reactant delivery approaches developed for laser pyrolysis can be adapted for light reactive deposition. In particular, a wide range of reaction precursors can be used in either gaseous/vapor and/or aerosol form, and a wide range of highly uniform product particles can be efficiently produced in the form of a coating. Specifically, light reactive deposition can be used to form highly uniform coatings of glasses, optionally comprising dopants/additives, such as rare earth dopants/additives and/or complex blends of dopant/additive compositions.

To form a substantially uniform layer, a layer of particles can be consolidated. The substantially uniform layer can be an amorphous layer, a polycrystalline layer, a crystalline layer or any suitable combination thereof. To consolidate the materials, a powder or a corresponding powder array is heated to a temperature above the flow temperature of the material. At these temperatures, the powder or powder array densifies to form a uniform layer of material. Incorporation of the dopants/additives into the particles results in a distribution of the dopants/additives through the densified material directly as a result of the powder deposition. Alternatively or additionally, a dopant/additive can be contacted with the powder or powder array following deposition but before consolidation. The dopant/additive is then combined with the powder/powder array composition during the consolidation process to form a doped material. The coated substrate can be contacted with the dopant/additive or a solution comprising the dopant/additive element, among other means, by dipping the coated substrate in the solution, by spraying the dopant/additive element, as a solution or a powder of a composition comprising the dopant/additive element, onto the coated substrate, e.g., within the reaction chamber, or by the like, or by any suitable combination thereof.

Common approaches for the introduction of dopants, especially rare earth dopants, into glass materials involve formation of the glass and introduction of the dopants into the glass from a vapor or liquid state. The glass can be made porous to facilitate the introduction of the dopant. These approaches involve multiple steps to produce the porous glass. In addition, it may be difficult to obtain desired dopant concentrations and uniform distribution of the dopants. In contrast, the flowing reaction approaches described herein directly incorporate the dopants/additives into the glass materials. Alternatively or in addition, dopant(s)/additive(s) can be contacted with the powder/powder array which has a high surface area that facilitates efficient and uniform incorporation of the dopant(s)/additive(s) into the resulting densified material following consolidation. In summary, the composition of a powder/powder array can be adjusted, among other means, by selection of the chemical composition of the flowing reactant stream and the reaction conditions within the reaction chamber. Any dopant(s) can be introduced by introducing the desired elements into the reactant flow for formation of the powder/powder array and/or by introducing the dopant/additive elements to the powder/powder array prior to consolidation such that the resulting consolidated material incorporates the desired composition, including dopant(s)/additive(s), following consolidation.

Optical communication approaches are growing in use due to the availability of wide bandwidth in optical transmission channels. Optical communication systems are generally built around fiber optic systems. It is desirable, however, to place optical devices onto substrate surfaces to increase the integration of the devices. Integrated planar optical components can be formed in analogy with integrated electrical circuits. Integrated optical-electronic circuits can also be formed.

The approaches herein for generating particles, e.g., amorphous particles, and uniform materials, e.g., glasses, are desirable for the formation of optical materials. For example, powders themselves can be suitable optical materials and can be incorporated by further processing into additional optical materials. For example, powders can be incorporated into composites with polymers such that the resulting composite has desirable optical properties. Polymer-inorganic particle composites are described further in copending and commonly assigned U.S. patent application Ser. No. 09/818,141, now U.S. Pat. No. 6,599,631 to Kambe et al., entitled "Polymer-Inorganic Particle Composites," incorporated herein by reference, and copending and commonly assigned U.S. patent application Ser. No. 10/083,967 filed on Feb. 25, 2002 to Kambe et al., entitled "Structures Incorporating Polymer-Inorganic Particle Blends," incorporated herein by reference.

Presently used optical communication light wavelengths are in the range(s) from about 1.3 to about 1.6 microns. Optical waveguides generally have dimensions many times the wavelength. Thus, corresponding optical structures can have dimensions many times the wavelength. Thus, corresponding optical structures can have dimensions from a few microns to about 100 microns depending on optical mode considerations and other factors.

Optical components can be integrated onto a planar chip-type base similar to an electronic integrated circuit. By placing the optical components onto a substrate surface such as a silicon wafer, many optical components can be squeezed into a small footprint. For the mass production of these integrated optical circuits, existing semiconductor technology, such as lithography and etching, can be involved advantageously in appropriate steps of the production process.

The production of integrated optical components can involve the deposition of high quality optical materials onto the substrate surface. Furthermore, the optical materials can be fashioned into specific devices. In particular, a promising technology for the integration of optical components centers around the production of planar waveguides. Semiconductor processing approaches have been adapted to form the waveguides following the deposition of optical materials.

Basic characteristics of optical film coatings include surface quality, film uniformity and optical purity. Optical quality refers to small enough absorption and scattering loss to achieve desired levels of transmission. Optical quality also includes the uniformity of optical properties, such as index of refraction. In addition, optical quality is affected by interface quality, such as the interface between the core layers and cladding layers. For silica ($SiO_2$) and several other materials suitable forms for optical transmission are a glass, while for some other materials single crystal forms may have the highest quality optical transmission.

Several approaches have been used and/or suggested for the deposition of the optical materials. These approaches include, for example, flame hydrolysis deposition, chemical vapor deposition, physical vapor deposition, sol-gel chemical deposition and ion implantation. Flame hydrolysis deposition has become the leader for commercial implementation of planar waveguides. Flame hydrolysis and forms of chemical vapor deposition have also been successful in the production of glass fibers for use as fiber optic elements. Flame hydrolysis deposition involves the use of a hydrogen-oxygen flame to react gaseous precursors to form particles of the optical material as a coating on the surface of the substrate. Subsequent heat treatment of the coating can result in the formation of a uniform optical material, which generally is a glass material.

Substantially uniform coatings, e.g., glass coatings, can be incorporated into optical structures, such as planar optical structures. Planar optical structures can comprise integrated optical devices. Material processing remains a significant consideration in the design of desired optical devices. For example, the composition and properties, such as density, of a material can be adjusted to obtain materials with a desired index-of-refraction. Similarly, the thermal expansion and flow temperatures of a material can be consistent with a reasonable processing approach for forming the materials into a monolithic, integrated structure. The consolidated optical materials can have good optical properties such that light transmission through the materials does not result in undesirable amount of loss. In addition, the materials generally should have properties that allow processing under reasonable conditions to form the integrated devices of the integrated optical circuit or electro-optical circuit. The formation of integrated optical devices using light reactive deposition is described further in copending and commonly assigned U.S. patent application Ser. No. 10/027,906 to Bi et al., entitled "Three Dimensional Engineering of Optical Structures," incorporated herein by reference.

The materials described herein, e.g., doped glasses, can be useful in the production of optical devices. Using the techniques described herein, the materials can be formulated into planar optical devices. The composition of the material, including any dopant/additive, can change the optical properties of the materials to be suitable for particular optical applications. Materials of particular interest herein include, for example, amplifying materials, paramagnetic materials and photosensitive materials.

Rare earth doped glasses are particularly suitable for use in the formation of optical amplifiers. The amplifier material can be excited by a pump light signal coupled to the optical material. The pump light excites the rare earth doped materials. A optical input passing through the optical material at a lower frequency than the pump signal is then amplified by stimulated emission. Thus, energy from the pump light is used to amplify the input light signal.

Particle Synthesis within a Reactant Flow

Laser pyrolysis has been demonstrated to be a valuable tool for the production of submicron and nanoscale particles with a wide range of particle compositions and structures alone or with additional processing. Some compositions of interest, including some improved materials, are described further below. Using light reactive deposition, the particles can be deposited onto a substrate as a coating. The reactant delivery approaches described in detail below can be adapted for producing doped amorphous particles and/or crystalline particles in flowing reactant systems, with or without a radiation, e.g., a light source. In some embodiments, other chemical reaction synthesis methods, as discussed above, using a flowing reactant stream can be adapted for producing desired particles and/or coatings. Laser pyrolysis is a particularly appropriate approach in some applications for producing a doped particles and/or complex particle compositions because laser pyrolysis can produce highly uniform product particles at high production/deposition rates.

Flowing reactant systems generally comprise a reactant delivery apparatus that initiates a flow through a reaction chamber. The reaction of the reactant flow takes place in the reaction chamber. The reaction zone may or may not be localized in a narrow region within the reaction chamber. The use of a radiation, e.g., light, beam to drive the reaction can result in a localized reaction zone that leads to high uniformity of the particles. Beyond the reaction zone, the flow comprises product particles, unreacted reactants, reaction by-products and inert gases. The flow can continue to a collector and/or a deposition surface at which at least a portion of the product particles are harvested from the flow. Continuous supply of reactants to the flow and removal of product particles from the flow during the course of the reaction characterizes the reaction process within the flowing reactant system.

Light reactive deposition can incorporate some of the particle production features of laser pyrolysis for the production of coatings. In particular, the versatility of forming particles with a range of particle compositions and structures can be adapted for the formation of particle coatings by light reactive deposition with a comparable range in particle compositions. In general, product particles within a flowing reactant system can be deposited onto a substrate as a coating within the reaction chamber, or directed to a separate coating chamber for deposition onto a substrate, or directed to a collector for collection as a powder.

Laser pyrolysis has become the standard terminology for flowing chemical reactions driven by an intense radiation, e.g., light, with rapid quenching of product after leaving a narrow reaction region defined by the radiation. The name, however, is a misnomer in the sense that radiation from non-laser sources, such as a strong, incoherent light beam, can replace the laser. Also, the reaction is not a pyrolysis in the sense of a thermal pyrolysis. The laser pyrolysis reaction is not solely thermally driven by the exothermic combustion of the reactants. In fact, some laser pyrolysis reactions can be conducted, in some embodiments, under conditions where no visible flame is observed from the reaction. Thus, as used herein, laser pyrolysis refers generally to a radiation-driven flowing reaction. Light reactive deposition involves comparable processes as laser pyrolysis for the particle production although some characteristics of the flow may be altered to accommodate the coating process.

The reaction conditions can determine the qualities of the particles produced by laser pyrolysis. The reaction conditions for laser pyrolysis can be controlled relatively precisely in order to produce particles with desired properties. The appropriate reaction conditions to produce a certain type of particles generally depend on the design of the particular apparatus. Specific conditions used to produce doped amorphous $SiO_2$ particles in a particular apparatus are described below in the Examples. Furthermore, some general observations on the relationship between reaction conditions and the resulting particles can be made.

Increasing the light power results in increased reaction temperatures in the reaction region as well as a faster quenching rate. A rapid quenching rate tends to favor production of high energy phases, which may not be obtained with processes near thermal equilibrium. Similarly, increasing the chamber pressure also tends to favor the production of higher energy structures. Also, increasing the concentration of the reactant serving as the oxygen source or other secondary reactant source in the reactant stream favors the production of particles with increased amounts of oxygen or other secondary reactant.

Reactant velocity of the reactant gas stream is inversely related to particle size so that increasing the reactant velocity tends to result in smaller particle sizes. A significant factor in determining particle size is the concentration of product composition condensing into product particles. Reducing the concentration of condensing product compositions generally reduces the particle size. The concentration of condensing product can be controlled by dilution with non-condensing, e.g., inert, compositions or by changing the pressure with a fixed ratio of condensing product to non-condensing compositions, with a reduction in pressure generally leading to reduced concentration and a corresponding reduction in particle size, or by combinations thereof, or by any other suitable means.

Light power also influences particle size with increased light power favoring larger particle formation for lower melting materials and smaller particle formation for higher melting materials. Also, the growth dynamics of the particles have a significant influence on the size of the resulting particles. In other words, different forms of a product composition have a tendency to form different size particles from other phases under relatively similar conditions. Similarly, under conditions at which populations of particles with different compositions are formed, each population of particles generally has its own characteristic narrow distribution of particle sizes.

Materials of interest include amorphous materials, crystalline materials and combinations thereof. Specifically, amorphous particles can be consolidated/densified under appropriate conditions to form amorphous layers, such as optical glasses. Amorphous particles are more easily processed into a glass layer since amorphous particles do not have a crystal structure that can be disrupted to form a glass layer. In laser pyrolysis, a wide range of oxide materials can be formed in the reactive process as amorphous particles. Based on kinetic principles, higher quench rates favor amorphous particle formation while slower quench rates favor crystalline particle formation. Faster quenches can be accomplished with a faster reactant stream velocity through the reaction zone. In addition, some precursors may favor the production of amorphous particles while other precursors favor the production of crystalline particles of similar or equivalent stoichiometry. Low laser power can also favor formation of amorphous particles. The formation of amorphous oxides is described further in U.S. Pat. No. 6,106,798 to Kambe et al., entitled "Vanadium Oxide Nanoparticles," incorporated herein by reference. However, some crystalline materials are of interest for both optical and other applications. Crystalline particles can be consolidated into single crystalline or polycrystalline materials. While it may be easier to consolidate amorphous particles into glasses and crystalline particles into crystalline layers, crystalline particles can be consolidated into amorphous layers, and amorphous particles can be consolidated into crystalline layers under appropriate consolidation conditions including the quench conditions.

While laser pyrolysis is versatile with respect to the production of particles with a wide range of compositions, certain host materials are desirable because of their particular ability to be processed into glass layers and/or their desirability for optical materials that are processable into optical devices. Glass host materials of particular interest comprise $TiO_2$, $SiO_2$, $GeO_2$, $Al_2O_3$, $P_2O_5$, $B_2O_3$, $TeO_2$ and combinations and mixtures thereof. Crystalline materials can be correspondingly suitable for forming doped materials.

To produce doped particles in some embodiments, appropriate precursors are directed into the flowing reactor. One or more precursors supply the one or more metal/metalloid elements that form the host composition, and additional appropriate precursors supply any dopant/additive elements. The reactant stream generally would include the desired metal and, additionally or alternatively, metalloid elements to form the host material and dopant(s)/additive(s) in desired proportions. The composition of the reactant stream can be adjusted along with the reaction conditions to generate desired product particles. Based on the particular reactants and reaction conditions, the product particles may not have the same proportions of metal/metalloid elements as the reactant stream since the elements may have different efficiencies of incorporation into the particles, i.e., yields with respect to unreacted materials. The designs of the reactant nozzles for radiation driven reactions described herein are designed for high yields with high reactant flows since the flow passed through the radiation beam.

Metalloids are elements that exhibit chemical properties intermediate between or inclusive of metals and nonmetals. Metalloid elements comprise silicon, boron, arsenic, antimony, and tellurium. While phosphorous and tellurium are located in the periodic table near the metal elements, they are not generally considered a metalloid elements. However, phosphorous in the form of $P_2O_5$ and tellurium in the form of $TeO_2$ are good glass formers similar to some metalloid oxides, and doped forms of $P_2O_5$ and $TeO_2$ can have desirable optical properties. For convenience, as used herein including in the claims, phosphorous and tellurium are also considered metalloid elements.

Laser pyrolysis has been performed generally with gas/vapor phase reactants. Many precursor compositions, such as metal/metalloid precursor compositions, can be delivered into the reaction chamber as a gas. Appropriate precursor compositions for gaseous delivery generally include compositions with reasonable vapor pressures, i.e., vapor pressures sufficient to get desired amounts of precursor gas/vapor into the reactant stream. The vessel holding liquid or solid precursor compositions can be heated to increase the vapor pressure of the precursor, if desired. Solid precursors generally are heated to produce a sufficient vapor pressure. A carrier gas can be bubbled through a liquid precursor to facilitate delivery of a desired amount of precursor vapor. Similarly, a carrier gas can be passed over the solid precursor to facilitate delivery of the precursor vapor. Alternatively or additionally, a liquid precursor can be directed to a flash evaporator to supply a composition at a selected vapor pressure.

The use of exclusively gas phase reactants is somewhat limiting with respect to the types of precursor compositions that can be used conveniently. Thus, techniques have been developed to introduce aerosols containing precursors, such as metal/metalloid precursors, into laser pyrolysis chambers. Improved aerosol delivery apparatuses for flowing reaction systems are described further in U.S. Pat. No. 6,193,936 to Gardner et al., entitled "Reactant Delivery Apparatuses," incorporated herein by reference.

Using aerosol delivery apparatuses, solid precursor compositions can be delivered by dissolving the compositions in a solvent. Alternatively, powdered precursor compositions can be dispersed in a liquid/solvent for aerosol delivery. Liquid precursor compositions can be delivered as an aerosol from a neat liquid, a multiple liquid dispersion or a liquid solution. Aerosol reactants can be used to obtain a significant reactant throughput. A solvent/dispersant can be selected to achieve desired properties of the resulting solution/dispersion. Suitable solvents/dispersants include water, methanol, ethanol, isopropyl alcohol, other organic solvents and mixtures thereof. The solvent should have a desired level of purity such that the resulting particles have a desired purity level. Some solvents, such as isopropyl alcohol, are significant absorbers of infrared light from a $CO_2$ laser such that no additional laser absorbing composition may be needed within the reactant stream if a $CO_2$ laser is used as a light source.

If precursors are delivered as an aerosol with a solvent present, the solvent generally can be rapidly evaporated by the radiation (e.g., light) beam in the reaction chamber such that a gas phase reaction can take place. The resulting particles are not highly porous, in contrast to other approaches based on aerosols in which the solvent cannot be driven off rapidly. Thus, the fundamental features of the laser pyrolysis reaction are unchanged by the presence of an aerosol. Nevertheless, the reaction conditions are affected by the presence of the aerosol. Below in the Examples, conditions are described for the production of nanoscale rare earth doped amorphous particles using aerosol precursors in a particular laser pyrolysis reaction chamber. Thus, the parameters associated with aerosol reactant delivery can be explored further based on the description below.

The precursor compositions for aerosol delivery are dissolved in a solution generally with a concentration in the range(s) greater than about 0.2 molar. Generally, increasing the concentration of precursor in the solution increases the throughput of reactant through the reaction chamber. As the concentration increases, however, the solution can become more viscous such that the aerosol may have droplets with larger sizes than desired. Thus, selection of solution concentration can involve a balance of factors in the selection of a suitable solution concentration.

For embodiments involving a plurality of metal/metalloid elements, the metal/metalloid elements can be delivered all as vapor, all as aerosol or as any suitable combination thereof. If a plurality of metal/metalloid elements is delivered as an aerosol, the precursors can be dissolved/dispersed within a single solvent/dispersant for delivery into the reactant flow as a single aerosol. Alternatively, the plurality of metal/metalloid elements can be delivered within a plurality of solutions/dispersions that are separately formed into an aerosol. The generation of a plurality of aerosols can be helpful if convenient precursors are not readily soluble/dispersible in a common solvent/dispersant. The plurality of aerosols can be introduced into a common gas flow for delivery into the reaction chamber through a common nozzle. Alternatively, a plurality of nozzles can be used for the separate delivery of aerosol and/or vapor reactants into the reaction chamber such that the reactants mix within the reaction chamber prior to entry into the reaction zone. Separate delivery into the reaction chamber can be particularly convenient for reactants that are chemically incompatible, for example, spontaneously reactive. Reactant delivery apparatuses are described further below.

In addition, for the production of highly pure materials, it may be desirable to use a combination of vapor and aerosol reactants. Vapor/gas reactants generally can be supplied at higher purity than is generally available at reasonable cost for aerosol delivered compositions. This can be particular convenient for the formation of doped optical glasses. For example, very pure silicon can be delivered in an easily vaporizable form, such as silicon tetrachloride. Other glass forming elements, such as boron, can similarly be delivered for reactions in vapor form. At the same time, some dopant(s)/additive(s), especially rare earth dopant(s)/additive(s), cannot be conveniently delivered in vapor form. Thus, in some embodiments, a majority of the material is delivered in vapor/gas form while other dopants/additives are delivered in the form of an aerosol. The vapor and aerosol are combined for reaction, as described further below.

The particles generally further include one or more non-(metal/metalloid) elements. For example, several host materials of interest are oxides. Thus, an oxygen source should also be present in the reactant stream. The conditions in the reactor should be sufficiently oxidizing to produce the oxide materials.

In particular, secondary reactants can be used in some embodiments to alter the oxidizing/reducing conditions within the reaction chamber and/or to contribute non-metal/metalloid elements or a portion thereof to the reaction products. Suitable secondary reactants serving as an oxygen source include, for example, $O_2$, CO, $H_2O$, $CO_2$, $O_3$ and mixtures thereof. Molecular oxygen can be supplied as air. In some embodiments, the metal/metalloid precursor compositions comprise oxygen such that all or a portion of the oxygen in product particles is contributed by the metal/metalloid precursors. Similarly, liquids used as a solvent/dispersant for aerosol delivery can similarly contribute secondary reactants, e.g., oxygen, to the reaction. In other words, if one or more metal/metalloid precursors comprise oxygen and/or if a solvent/dispersant comprises oxygen, a separate secondary reactant, e.g., a vapor reactant, may not be needed to supply oxygen for product particles. Other secondary reactants of interest are described below.

Any secondary reactant composition should not react significantly with the metal/metalloid precursor(s) prior to entering the radiation reaction zone since this generally would result in the formation of larger particles and/or damage the inlet nozzle. Similarly, if a plurality of metal/metalloid precursors is used, these precursors should not significantly react prior to entering the radiation reaction zone. If the reactants are spontaneously reactive, a metal/metalloid precursor and the secondary reactant and/or different metal/metalloid precursors can be delivered in separate nozzles into the reaction chamber such that they are combined just prior to reaching the light beam.

Laser pyrolysis can be performed with a variety of optical frequencies, using either a laser or other strong focused light source. Convenient light sources operate in the infrared portion of the electromagnetic spectrum. $CO_2$ lasers are particularly useful sources of light. Infrared absorbers for inclusion in the reactant stream include, for example, $C_2H_4$, isopropyl alcohol $NH_3$, $SF_6$, $SiH_4$ and $O_3$. $O_3$ can act as both an infrared absorber and as an oxygen source. The radiation absorber, such as the infrared absorber, absorbs energy from the radiation beam and distributes the energy to the other reactants to drive the pyrolysis.

Generally, the energy absorbed from the radiation beam, e.g., light beam, increases the temperature at a tremendous rate, many times the rate that heat generally would be produced by exothermic reactions under controlled condition. While the process generally involves nonequilibrium conditions, the temperature can be described approximately based on the energy in the absorbing region. The laser pyrolysis process is qualitatively different from the process in a combustion reactor where an energy source initiates a reaction, but the reaction is driven by energy given off by an exothermic reaction. Thus, while the light driven process is referred to as laser pyrolysis, it is not a traditional pyrolysis since the reaction is not driven by energy given off by the reaction but by energy absorbed from a radiation beam. In particular, spontaneous reaction of the reactants generally does not proceed significantly, if at all, back down the reactant flow toward the nozzle from the intersection of the radiation beam with the reactant stream. If necessary, the flow can be modified such that the reaction zone remains confined as desired.

An inert shielding gas can be used to reduce the amount of reactant and product molecules contacting the reactant chamber components. Inert gases can also be introduced into the reactant stream as a carrier gas and/or as a reaction moderator. Appropriate inert gases generally include, for example, Ar, He and $N_2$.

Compositions of Particles and Coatings

A variety of particles can be produced by laser pyrolysis. Adaptation of laser pyrolysis for the performance of light reactive deposition can be used to produce coatings of comparable compositions as the particles with selected compositions that can be produced by laser pyrolysis. Specifically, the host materials can include one or more metal/metalloid elements in a composition forming a crystalline or amorphous material. In addition, the particles can be doped to alter the optical chemical and/or physical properties of the particles. Generally, the powders comprise fine or ultrafine particles with particle sizes in the submicron or nanometer range. The particles may or may not partly fuse or sinter during the deposition while forming a powder array. To form a uniform layer, a powder array can be consolidated/densified. Incorporation of the dopants/additives into the powder array, during its formation or following its formation, results in a distribution of the dopants/additives through the densified material.

In general, the nanoscale particles, as a particle collection or a powder array, can generally be characterized as comprising a composition including a number of different elements and present in varying relative proportions, where the number and the relative proportions can be selected as a function of the application for the nanoscale particles. Typical numbers of different elements include, for example, numbers in the range(s) from about 2 elements to about 15 elements, with numbers of 1, 2, 3, 4, 5, 6, 7, 8, 9, 10, 11, 12, 13, 14, and 15 being contemplated. General numbers of relative proportions include, for example, values in the range(s) from about 1 to about 1,000,000, with numbers of about 1, 10, 100, 1000, 10000, 100000, 1000000, and suitable sums thereof being contemplated. In addition, elemental materials are contemplated in which the element is in its elemental, un-ionized form, such as a host metal/metalloid element, i.e., $M^0$.

Alternatively or additionally, such nanoscale particles can be characterized as having the following formula:

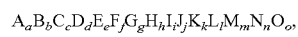

$$A_aB_bC_cD_dE_eF_fG_gH_hI_iJ_jK_kL_lM_mN_nO_o,$$

where each A, B, C, D, E, F, G, H, I, J, K, L, M, N, and O is independently present or absent and at least one of A, B, C, D, E, F, G, H, I, J, K, L, M, N, and O is present and is independently selected from the group consisting of elements of the periodic table of elements comprising Group 1A elements, Group 2A elements, Group 3B elements (including the lanthanide family of elements and the actinide family of elements), Group 4B elements, Group 5B elements, Group 6B elements, Group 7B elements, Group 8B elements, Group 1B elements, Group 2B elements, Group 3A elements, Group 4A elements, Group 5A elements, Group 6A elements, and Group 7A elements; and each a, b, c, d, e, f, g, h, i, j, k, l, m, n, and o is independently selected from a value in the range(s) from about 1 to about 1,000,000, with numbers of about 1, 10, 100, 1000, 10000, 100000, 1000000, and suitable sums thereof being contemplated. In other words, the elements can be any element from the period table other than the noble gases.

While some compositions are described with respect to particular stoichiometries, stoichiometries generally are only approximate quantities. In particular, materials can have contaminants, defects and the like. In particular, for amorphous and crystalline materials in which metal/metalloid compounds have a plurality of oxidation states, the materials can comprise a plurality of oxidation states. Thus, when stoichiometries are described herein, the actual materials may comprises other stoichiometries of the same elements also, such as $SiO_2$ also include some SiO and the like.

Powders of particular interest, such as for optical materials, comprise as a host material, for example, silicon particles, metal particles, and metal/metalloid compositions, such as, metal/metalloid oxides, metal/metalloid carbides, metal/metalloid nitrides, metal/metalloid phosphides, metal/metalloid sulfides, metal/metalloid tellurides, metal/metalloid selenides, metal/metalloid arsenides and mixtures and combinations thereof. Especially in amorphous materials, great varieties of elemental compositions are possible within a particular material. For optical materials, some materials of particular interest comprise, for example, silicon oxide (silica), phosphate glasses, germanium oxide, indium phosphide, lithium niobate, telluride glasses, aluminum oxide, titanium oxide, combinations thereof and doped versions thereof. Some metal/metalloid oxides are particularly desirable for optical applications and/or for their ability to consolidate into uniform glass layers. Suitable glass forming host oxides for doping include, for example, $TiO_2$, $SiO_2$, $GeO_2$, $Al_2O_3$, $P_2O_5$, $B_2O_3$, $TeO_2$, $CaO-Al_2O_3$, $V_2O_5$, $BiO_2$, $Sb_2O_5$ and combinations and mixtures thereof. Other metal/metalloid oxides have desirable optical properties in crystalline form, such as $LiNbO_3$, $LiTaO_3$, $Y_3Al_5O_{12}$ (YAG) and rare earth, especially Nd, doped YAG. The approaches described herein for particle formation and coating are particularly suitable for formation of metal/metalloid oxide particles with or without dopants/additives. Similarly, laser pyrolysis and light reactive deposition are suitable approaches for producing particle collections and powder arrays for the non-oxide materials, as described further below.

In addition, particles and powder arrays can include one or more dopants/additives within an amorphous material or a crystalline material. Dopants/additives, which can be complex blends of dopant/additive compositions, generally are included in non-stoichiometric amounts. A dopant/additive is generally metal or metalloid element, although other dopants/additives of interest include fluorine, chlorine, nitrogen and/or carbon, which substitute for oxygen in oxides or other anions relative to metal/metalloid components. Since these anion dopants/additives tend to disrupt the oxygen bonded network of oxides, these tend to lower the flow temperature of oxide glasses, and these dopants/additives tend to lower the index-of-refraction and the dielectric constant. The dopants/additives generally can replace other constituents within the material in order to maintain overall electrical neutrality. Dopants/additives can impart desirable properties to the resulting materials. The amount of dopants/additives can be selected to yield desired properties while maintaining appropriate chemical stability to the material. In crystalline materials, dopants/additives elements can replace host elements at lattice sites, dopant elements can reside at previously unoccupied lattice sites and/or dopant elements can be located at interstitial sites. Unlike dopants/additives within crystalline materials in which the crystal structure influences incorporation of the dopants/additives, dopants/additives within amorphous materials can behave more as a dopants composition dissolved within the host material to form a solid mixture. Thus, the overall composition of the material influences the chemical properties, including the processing parameters and stability, of the resulting combined materials. Solubility of dopants/additives within a host amorphous material can influence the amount of dopant/additive that can be homogeneously integrated into a consolidated glass.

A dopant, such as a rare earth dopant, generally comprises less than about 15 mole percent of the metal/metalloid in the composition, in further embodiments less than about 10 mole percent, in some embodiments less than about 5 mole percent, in other embodiments from about 0.025 to about 1 mole percent of the metal/metalloid in the composition. A person of ordinary skill in the art will recognize that the present disclosure similarly covers ranges within these specific ranges. Additive compositions are similar to dopant compositions except that they generally are includes at higher amounts while still being a minority component of the composition, i.e., less than about 50 mole percent of the composition. For amorphous materials, additives can be modifiers or intermediate compositions between glass formers and modifiers. Modifiers can disrupt the oxygen network within an oxide glass to modify the glass properties, generally lowering the flow temperature and the index-of-refraction. Thus, additives can be useful for many of the same purposes as dopants. Doped and doping, for convenience, can refer to materials with dopants and/or additives and the process of incorporating dopants and/or additives, respectively.

Materials of interest comprise, for example, amorphous nanoscale powders and glass layers with dopant(s)/additive(s). Suitable dopants/additives comprise, for example, rare earth metals, which can impart desirable modifications of properties, such as index-of-refraction, photosensitivity, fluorescence and paramagnetism. Powders and glass layers can be formed with complex compositions including, for example, one or more metal/metalloid elements in a host material and, optionally, one or more selected dopants/additives in the amorphous host material. The powders can be used to form optical materials and the like. Similarly, crystalline materials can be formed with dopant(s)/additive(s) within a crystalline host material. The doped materials can be formed by directly depositing particles to form a powder array using light reactive deposition and subsequently consolidating the powder array into a uniform layer of a glass, polycrystalline or crystalline material. Alternatively, any dopants/additives can be introduced to a powder array following its formation for incorporation into a consolidated uniform material, as described further below.

Submicron and nanoscale particles can be produced with complex compositions using laser pyrolysis and light reactive deposition. Using these approaches a variety of new materials can be produced. Host materials can be formed with desired compositions by appropriately introducing a reactant composition to form the desired host material. The dopant(s)/additive(s) can be introduced into an appropriate host material, either during the formation of the host material or subsequent to formation of a powder array. Specifically, any dopants/additives can be introduced at desired amounts by varying the composition of the reactant stream. The conditions in the reactor can be selected to produce the desired materials. In alternative embodiments, a dopant/additive element is applied to an already formed powder array in proportion to the desired doping levels. Upon consolidation, the desired doped material is formed as a uniform material.

While a variety of materials are of interest, silica ($SiO_2$)-based glasses are of interest due to their existing commercial applications. Amorphous silica can be combined with other glass forming materials that are miscible with the silica. Other glass forming materials that are suitable for combining with silica to form amorphous host materials include $Al_2O_3$, $Na_2O$, $B2O3$, $P_2O_3$ and $GeO_2$. Thus, a plurality of miscible glass forming compositions can be combined to form a blended glass host composition with desired properties, such as index-of-refraction and glass transition temperature. The blended glass host materials can be doped with further materials to further adjust the properties of the material.

A wide range of silica glass compositions have significant optical applications or potential optical applications. Generally, these silica glasses can be formed by light reactive deposition based on the description herein. The silica glass generally is combined with other glass forming compositions to alter the optical properties, such as index-of-refraction, and or alter the processing properties, such as lowering the flow temperature. Some representative compositions with suitable optical properties are summarized below.

Aluminosilicate glasses form a group of compositions with useful optical applications. This group comprises compositions in mole percents of interest about 70% $SiO_2$, about 30% $Al_2O_3$ and about 0.025% $Er_2O_3$; about 93.5% $SiO_2$, about 5.6% $Al_2O_3$ and about 0.9% $Er_2O_3$; and about 58% $SiO_2$, about 23% $Al_2O_3$, about 19% $Tb_2O_3$ and about 0.4% $Sb_2O_3$. Sodium aluminosilicates are described further in the example, and can comprise a composition in mole percent about 59% $SiO_2$, about 20% $Al_2O_3$, about 20% $Na_2O$ and about 1% $Er_2O_3$. A representative soda-lime silicate has a composition in mole percent of about 70% $SiO_2$, about 15% CaO, about 15% $Na_2O$ and about 0.03% $CrO_2$. Control of oxygen partial pressure during consolidation can be used to oxidize $Cr^{+2}$ ($CrCl_2$) and/or $Cr^{+3}$ ($Cr(NO_3)_3$) to $Cr^{+4}$. A representative silica can be doped with chromium, about 0.05% $CrO_2$. Another example is phosphosilicate glasses, exemplified by a composition comprising about 88% $SiO_2$, about 11% $P_2O_3$ and about 0.8% $Er_2O_3$, in mole percent.

Some non-silica glasses are also very suitable for optical applications, such as germinates, phosphates, aluminocalcinates and tellurides. Representative germanate glasses in mole percent comprise a first composition of about 80% $GeO_2$, about 20% $SiO_2$ and about 0.5% $Er_2O_3$; a second composition of about 72% $GeO_2$, about 18% $SiO_2$, about 10% $Al_2O_3$, about 0.5% $Er_2O_3$ and about 0.5 $Yb_2O_3$; a third composition of about 72% $GeO_2$, about 18% $SiO_2$, about 10% $P_2O_5$, about 0.5% $Er_2O_3$ and about 0.5 $Yb_2O_3$; a fourth composition of about 60% $GeO_2$, about 24% $K_2O$, about 16% $Ga_2O_3$ and about 0.1% $Tm_2O_3$. Two representative phosphate glasses comprise compositions in mole percents of about 58% $P_2O_5$, about 23% $Na_2O$, about 13% $Al_2O_3$ and about 6% $Er_2O_3$; and about 50% $P_2O_5$, about 17% $Na_2O$, about 30% $SiO_2$ and about 3% $Er_2O_3$. Some representative aluminocalcinates comprise compositions in mole percent in the range(s) of about 57.75% to about 59.55% CaO, about 23% to about 28% $Al_2O_3$, about 4% to about 8% MgO, about 7% to about 8.5% $SiO_2$, about 0 to about 1% $Er_2O_3$ and about 0 to about 1% $Yb_2O_3$. Two representative telluride glasses comprise a composition in mole percent of about 75% $TeO_2$, about 20% ZnO, about 5% $Na_2O$, and about 0.15% $Er_2O_3$; and about 80% $TeO_2$, about 10% ZnO, about 10% $Na_2O$, about 1% ($Er_2O_3$, $Tm_2O_3$ or $Nd_2O_3$).

Some crystalline materials also have desirable optical properties. Some representative crystalline optical materials comprise compositions in mole percent of about 97% $Al_2O_3$ and about 3% $Er_2O_3$; about 90% $Al_2O_3$, about 10% ($Er_2O_3$, $Nd_2O_3$ or $Tb_2O_3$); about 99.3% $TiO_2$ and about 0.75% $Er_2O_3$; and about 96.7% $YVO_4$, about 3% $Yb_2O_3$ and about 0.3% $Er_2O_3$.

Dopants/additives can be introduced to vary properties, such as optical properties and physical properties, of the particles and/or a resulting uniform layer. For example, dopants/additives can be introduced to change the index-of-refraction of the material. For optical applications, the index-of-refraction can be varied to form specific optical devices that operate with light of a selected frequency range. Dopants/additives can also be introduced to alter the processing properties of the material. In particular, some dopants/additives change the flow temperature, i.e., the glass transition temperature, such that the glass can be processed at lower temperatures. Dopants/additives can also interact within the materials. For example, some dopants/additives, such as $P_2O_5$ and $Al_2O_3$, are introduced to increase the solubility of other dopants/additives. Doped materials are useful in the production of optical devices. Using the techniques described herein, the doped materials can be formulated into planar optical devices.

In one aspect, particles of interest comprise amorphous compositions that form optical glasses with a plurality of dopants/additives. In some embodiments, the one or plurality of dopants/additives comprise rare earth metals. Rare earth metals are particularly desirable because of their modification of optical properties of the materials. If the particles are consolidated into a uniform layer, the resulting material can have an index-of-refraction influenced by the rare earth dopants/additives as well as other dopants/additives. In addition, the rare earth dopants/additives influence the optical emission properties that can alter the application of the materials for the production of optical amplifiers and other optical devices. Rare earth metals comprise the transition metals of the group IIIb of the periodic table. Specifically, the rare earth elements comprise Sc, Y and the Lanthanide series. Other suitable dopants/additives include elements of the actinide series. For optical glasses, the rare earth metals of interest as dopants/additives comprise Er, Yb, Nd, La, Ce, Th, Dy, Pr and Tm. Suitable non-rare earth metal dopants/additives include, for example, Al, Ga, Mg, Sr, Zn, Bi, Sb, Zr, Pb, Li Na, K, Ba, W, Si, Ge, P, B, Te and Ca.

Material processing remains a significant consideration in the design of desired optical devices. For example, the composition and properties, such as density, of a material are adjusted to obtain materials with a desired index-of-refraction. Similarly, the thermal expansion and flow temperatures of a material have to be consistent with a reasonable processing approach for forming the materials into a monolithic, integrated structure without excessive stress that can introduce undesirable optical properties such as unintentional birefringence. The consolidated optical materials can provide high transparency and homogeneity at the operating wavelength such that light transmission through the materials does not result in undesirable amount of loss. In addition, the materials have to be processable under reasonable conditions to form the integrated devices of the integrated optical circuit or electro-optical circuit. Similar material constraints can be problematic for the formation of state-of-the-art integrated electronic devices.

Various materials have been formed as submicron/nanoscale particles using laser pyrolysis. Some of these materials are described in the following description. Using light reactive deposition, these materials can be formed directly as coatings in the form of powder arrays. Based on the description and examples herein, a range of additional materials can be produced by laser pyrolysis and light reactive deposition. Specifically, suitable approaches for the formation of some improved materials are outlined below.

For example, the production of silicon oxide nanoparticles is described in copending and commonly assigned U.S. patent application Ser. No. 09/085,514, now U.S. Pat. No. 6,726,990 to Kumar et al., entitled "Silicon Oxide Particles," incorporated herein by reference. This patent application describes the production of amorphous $SiO_2$. The production of titanium oxide nanoparticles and crystalline silicon dioxide nanoparticles is described in copending and commonly assigned, U.S. patent application Ser. No. 09/123,255, now U.S. Pat. No. 6,387,531 to Bi et al., entitled "Metal (Silicon) Oxide/Carbon Composites," incorporated herein by reference. In particular, this application describes the production of anatase and rutile $TiO_2$.

In addition, nanoscale manganese oxide particles have been formed. The production of these particles is described in copending and commonly assigned U.S. patent application Ser. No. 09/188,770, now U.S. Pat. No. 6,506,493 to Kumar et al., entitled "Metal Oxide Particles," incorporated herein by reference. This application describes the production of MnO, $Mn_2O_3$, $Mn_3O_4$ and $Mn_5O_8$.

Also, the production of vanadium oxide nanoparticles is described in U.S. Pat. No. 6,106,798 to Bi et al., entitled "Vanadium Oxide Nanoparticles," incorporated herein by reference. Similarly, silver vanadium oxide nanoparticles have been produced, as described in U.S. Pat. No. 6,225,007 to Horne et al., and copending and commonly assigned U.S. patent application Ser. No. 09/311,506, now U.S. Pat. No. 6,391,494 to Reitz et al., both entitled "Metal Vanadium Oxide Particles," both of which are incorporated herein by reference.

Furthermore, lithium manganese oxide nanoparticles have been produced by laser pyrolysis along with or without subsequent heat processing, as described in copending and commonly assigned U.S. patent application Ser. No. 09/188,768, now U.S. Pat. No. 6,607,706 to Kumar et al., entitled "Composite Metal Oxide Particles," and Ser. No. 09/334,203, now U.S. Pat. No. 6,482,374 to Kumar et al., entitled "Reaction Methods for Producing Ternary Particles," and U.S. Pat. No. 6,136,287 to Horne et al., entitled "Lithium Manganese Oxides and Batteries," all three of which are incorporated herein by reference.

The production of aluminum oxide nanoparticles is described in copending and commonly assigned, U.S. patent application Ser. No. 09/136,483 to Kumar et al., entitled "Aluminum Oxide Particles," incorporated herein by reference. In particular, this application disclosed the production of $\gamma$-$Al_2O_3$. The formation of delta-$Al_2O_3$ and theta-$Al_2O_3$ by laser pyrolysis/light reactive deposition along with doped-crystalline and amorphous alumina is described in copending and commonly assigned U.S. patent application Ser. No. 09/969,025 to Chiruvolu et al., entitled "Aluminum Oxide Powders," incorporated herein by reference.

Amorphous aluminum oxide materials can be combined with other glass formers, such as $SiO_2$ and/or $P_2O_5$. For example, suitable metal oxide dopants/additives for aluminum oxide for optical glass formation comprise cesium oxide ($Cs_2O$), rubidium oxide ($Rb_2O$), thallium oxide ($Tl_2O$), lithium oxide ($Li_2O$), sodium oxide ($Na_2O$), potassium oxide ($K_2O$), beryllium oxide (BeO), magnesium oxide (MgO), calcium oxide (CaO), strontium oxide (SrO), barium oxide (BaO), and the like and suitable combinations of any two or more thereof. Glass dopants/additives can affect, for example, the index-of-refraction, consolidation temperature and/or the porosity of the glass. Suitable metal oxide dopants/additives for infrared emitters comprise, for example, cobalt oxide ($Co_3O_4$), $Er_2O_3$, $CrO_2$, $Tm_2O_3$, $Nd_2O_3$, $Yb_2O_3$, $Pr_2O_3$, $Dy_2O_3$, $Ho_2O_3$, and the like, and suitable combinations of any two or more thereof.

In addition, tin oxide nanoparticles have been produced by laser pyrolysis, as described in U.S. Pat. No. 6,200,674 to Kumar et al., entitled "Tin Oxide Particles," incorporated herein by reference. The production of zinc oxide nanoparticles is described in copending and commonly assigned U.S. patent application Ser. No. 09/266,202 to Reitz, entitled "Zinc Oxide Particles," incorporated herein by reference. In particular, the production of ZnO nanoparticles is described.

Submicron and nanoscale particles and corresponding coatings of rare earth metal oxide particles, rare earth doped metal/metalloid oxide particles, rare earth metal/metalloid sulfides and rare earth doped metal/metalloid sulfides are described in copending and commonly assigned U.S. patent application Ser. No. 09/843,195, now U.S. Pat. No. 6,692,660 to Kumar et al, entitled "High Luminescence Phosphor Particles," incorporated herein by reference. Suitable host materials for the formation of phosphors comprise ZnO, ZnS, $Zn_2SiO_4$, SrS, $YBO_3$, $Y_2O_3$, $Al_2O_3$, $Y_3Al_5O_{12}$ and $BaMgAl_{14}O_{23}$, and suitable combinations of any two or more thereof. Exemplary non-rare earth metals for activating phosphor particles as dopants/additives include, for example, manganese, silver and lead. Exemplary rare earth metals for forming metal oxide phosphors include, for example, europium, cerium, terbium and erbium. Generally, heavy metal ions or rare earth ions are used as activators in phosphors. For phosphor applications, the particles are generally crystalline.

The production of iron, iron oxide and iron carbide is described in a publication by Bi et al., entitled "Nanocrystalline $\alpha$-Fe, $Fe_3C$, and $Fe_7C_3$ produced by $CO_2$ laser pyrolysis," J. Mater. Res. Vol. 8, No. 7 1666-1674 (July 1993), incorporated herein by reference. The production of nanoparticles of silver metal is described in copending and commonly assigned U.S. patent application Ser. No. 09/311,506, now U.S. Pat. No. 6,391,494 to Reitz et al., entitled "Metal Vanadium Oxide Particles," incorporated herein by reference. Nanoscale carbon particles produced by laser pyrolysis is described in a reference by Bi et al., entitled "Nanoscale carbon blacks produced by $CO_2$ laser pyrolysis," J. Mater. Res. Vol. 10, No. 11, 2875-2884 (November 1995), incorporated herein by reference.

The production of iron sulfide ($Fe_{1-x}S$) nanoparticles by laser pyrolysis is described in Bi et al., Material Research Society Symposium Proceedings, vol. 286, p. 161-166 (1993), incorporated herein by reference. Precursors for laser pyrolysis production of iron sulfide were iron pentacarbonyl ($Fe(CO)_5$) and hydrogen sulfide ($H_2S$). Other suitable gaseous sulfur precursors for vapor delivery comprise, for example, pyrosulfuryl chloride ($S_2O_5Cl_2$), sulfur chloride ($S_2Cl_2$), sulfuryl chloride ($SO_2Cl_2$), thionyl chloride ($SOCl_2$), and the like, and suitable combinations of any two or more thereof. Suitable sulfur precursors for aerosol delivery comprise, for example, ammonium sulfate (($NH_4)_2S$), sulfuric acid ($H_2SO_4$), and the like, and any suitable combinations thereof, which are soluble in water. Other metal/metalloid sulfide materials can be similarly produced.

Cerium oxide can be produced using the laser pyrolysis apparatuses described above. Suitable precursors for aerosol delivery comprise, for example, cerous nitrate ($Ce(NO_3)_3$), cerous chloride ($CeCl_3$), cerous oxalate ($Ce_2(C_2O_4)_3$), and the like, and suitable combinations of any two or more thereof. Similarly, zirconium oxide can be produced using the laser pyrolysis apparatuses described above. Suitable zirconium precursors for aerosol delivery comprise, for example, zirconyl chloride ($ZrOCl_2$), zirconyl nitrate ($ZrO(NO_3)_2$), and the like, and suitable combinations of any two or more thereof.

The deposition of coatings of dielectric materials for chip capacitors is described in copending and commonly assigned U.S. Provisional Patent Application Ser. No. 60/312,234 to Bryan, entitled "Reactive Deposition For The Formation Of Chip Capacitors," incorporated herein by reference. Suitable dielectric materials include a majority of barium titanate ($BaTiO_3$), optionally mixed with other metal oxides. Other dielectric oxides suitable for incorporation into ceramic chip capacitors with appropriate dopants/additives comprise, for example, $SrTiO_3$, $CaTiO_3$, $SrZrO_3$, $CaZrO_3$, $Nd_2O_3$—$2TiO_3$, $La_2O_3$—$2TiO_2$, and the like, and any two or more thereof.

The production of ternary nanoparticles of aluminum silicate and aluminum titanate can be performed by laser pyrolysis following procedures similar to the production of silver vanadium oxide nanoparticles described in copending and commonly assigned U.S. patent application Ser. No. 09/311,506, now U.S. Pat. No. 6,391,494 to Reitz et al., entitled "Metal Vanadium Oxide Particles," incorporated herein by reference. Suitable precursors for the production of aluminum silicate comprise, for vapor delivery, a mixture of aluminum chloride ($AlCl_3$), silicon tetrachloride ($SiCl_4$), and the like, and suitable combinations of any two or more thereof, and, for aerosol delivery, a mixture of tetra(N-butoxy) silane and aluminum isopropoxide ($Al(OCH(CH_3)_2)_3$), a mixture of tetraethoxysilane and aluminum nitrate, or tetraethoxysilane and aluminum chloride, and the like, and suitable combinations of any two or more thereof. Similarly, suitable precursors for the production of aluminum titanate comprise, for aerosol delivery, a mixture of aluminum nitrate ($Al(NO_3)_3$) and titanium dioxide ($TiO_2$) powder dissolved in sulfuric acid, a mixture of aluminum isopropoxide and titanium isopropoxide ($Ti(OCH(CH_3)_2)_4$), and the like, and suitable combinations of any two or more thereof.

The formation of submicron and nanoscale particles along with coatings of metal/metalloid compositions with complex anions is described in copending and commonly assigned U.S. patent application Ser. No. 09/845,985 to Chaloner-Gill et al., entitled "Phosphate Powder Compositions And Methods For Forming Particles With Complex Anions," incorporated herein by reference. Suitable polyatomic anions comprise, for example, phosphate ($PO_4^{-3}$), sulfate ($SO_4^{-2}$), silicate ($SiO_4^{-4}$), and the like, and suitable combinations of any two or more thereof. Suitable phosphorous precursors for forming the phosphate anion, sulfur precursors for forming the sulfate anion and silicon precursors for forming the silicate anion are discussed above. Suitable cations comprise, for example, metal and metalloid cations. Phosphate glasses can be used in a variety of contexts. Phosphate compositions for glasses comprise, for example, aluminum phosphate ($AlPO_4$), calcium phosphate ($Ca_3(PO_4)_2$), and the like, and suitable combinations of any two or more thereof. Suitable gaseous phosphate precursor compositions for vapor delivery comprise, for example, phosphine ($PH_3$), phosphorus trichloride ($PCl_3$), phosphorous pentachloride ($PCl_5$), phosphorus oxychloride ($POCl_3$), $P(OCH_3)_3$, and the like, and suitable combinations of any two or more thereof. Suitable phosphorous precursors for aerosol delivery comprise, for example, $(C_2H_5O)_3P$, $(C_2H_5O)_3PO$, ammonium phosphate ($(NH_4)_3PO_4$), ammonium phosphate—dibasic ($(NH_4)_2HPO_4$), ammonium phosphate—monobasic ($(NH_4)H_2PO_4$), phosphoric acid ($H_3PO_4$), and the like, and suitable combinations of any two or more thereof, which are all moderately soluble in water.

The synthesis by laser pyrolysis of silicon carbide and silicon nitride is described in copending and commonly assigned U.S. patent application Ser. No. 09/433,202 to Reitz et al., entitled "Particle Dispersions," incorporated herein by reference. Other metal/metalloid carbides and meta/metalloid nitrides can be similarly produced.

For some host glass forming materials and/or dopants/additives of particular interest for optical applications, suitable precursors can be described as a representative listing of precursor materials. Such a representative list follows.

Suitable silicon precursors for vapor delivery comprise, for example, silicon tetrachloride ($SiCl_4$), trichlorosilane ($Cl_3HSi$), trichloromethyl silane $CH_3SiCl_3$, tetraethoxysilane ($Si(OC_2H_5)_4$, also known as ethyl silane and tetraethyl silane), and the like, and suitable combinations of any two or more thereof. Suitable boron precursors comprise, for example, boron trichloride ($BCl_3$), diborane ($B_2H_6$), $BH_3$, and the like, and suitable combinations of any two or more thereof, Suitable phosphate precursor compositions for vapor delivery comprise, for example, phosphine ($PH_3$), phosphorus trichloride ($PCl_3$), phosphorous pentachloride ($PCl_5$), phosphorus oxychloride ($POCl_3$), $P(OCH_3)_3$, and the like, and suitable combinations of any two or more thereof.

Suitable germanium precursors comprise, for example, $GeCl_4$, and the like, and suitable combinations of any two or more thereof. Suitable titanium precursors comprise, for example, titanium tetrachloride ($TiCl_4$), titanium isopropoxide ($Ti[OCH(CH_3)_2]_4$), and the like, and suitable combinations of any two or more thereof. Suitable liquid, aluminum precursors comprise, for example, aluminum s-butoxide ($Al(OC_4H_9)_3$), trimethyl aluminum ($Al(CH_3)_3$, trimethyl ammonia aluminum $Al(CH_3)_3NH_3$, and the like, and suitable combinations of any two or more thereof. A number of suitable solid, aluminum precursor compositions are available, such compositions comprising, for example, aluminum chloride ($AlCl_3$), aluminum ethoxide ($Al(OC_2H_5)_3$), aluminum isopropoxide ($Al[OCH(CH_3)_2]_3$), and the like, and suitable combinations of any two or more thereof. Suitable tellurium precursors comprise, for example, $Te(C_2H_5)_2$, $Te(CH_3)_2$, $Te(C_3H_7)_2$, $Te(C_4H_9)_2$, $Te(C_3H_4)_2$, $Te(CH_3C_3H_4)_2$, and the like, and suitable combinations of any two or more thereof.

With respect to rare earth metal precursors, suitable precursors for vapor delivery include, for example, erbium heptafluorodimethyloctanedionate, $Er(C_{11}H_{19}O_2)_3$, $Yb(C_{11}H_{19}O_2)_3$, $Pr(C_{11}H_{19}O_2)_3$, $Nb(C_{11}H_{19}O_2)_3$, $Tm(C_{11}H_{19}O_2)_3$, and the like, and suitable combinations of any two or more thereof. Some representative precursors for other desirable metal dopants/additives comprise, for example, liquid zinc precursor compositions, such as diethyl zinc ($Zn(C_2H_5)_2$), dimethyl zinc ($Zn(CH_3)_2$), and the like, and suitable combinations of any two or more thereof. Suitable solid, zinc precursors with sufficient vapor pressure of gaseous delivery comprise, for example, zinc chloride ($ZnCl_2$), and the like, and suitable combinations of any two or more thereof. Suitable lithium precursors for vapor delivery comprise, for example, solids, such as lithium acetate ($Li_2O_2CCH_3$), liquids, such as lithium amide ($LiNH_2$) dissolved in hexane, and the like, and suitable combinations of any two or more thereof.

Suitable silicon precursors for aerosol production comprise, for example, silicon tetrachloride $Si(Cl_4)$, which is soluble in ether, trichlorosilane ($Cl_3HSi$), which is soluble in carbon tetrachloride, coilloidal silica, $Si(OC_2H_5)_4$, which is soluble in alcohol, $Si(OCH_3)_4$, $(CH_3)_3SiOSi(CH_3)_3$, and the like, and suitable combinations of any two or more thereof. Similarly, suitable boron precursors for aerosol delivery include, for example, ammonium borate ($(NH_4)_2B_4O_7$), which is soluble in water and various organic solvents, $B(OC_2H_5)_2$, $B(C_2H_5)_3$, and the like, and suitable combinations of any two or more thereof. Suitable phosphorous precursors for aerosol delivery comprise, for example, ammonium phosphate ($(NH_4)_3PO_4$), ammonium phosphate—dibasic ($(NH_4)_2HPO_4$), ammonium phosphate—monobasic ($(NH_4)H_2PO_4$) and phosphoric acid ($H_3PO_4$), which are all moderately soluble in water, as well as $OP(OC_2H_5)_3$, which is soluble in alcohol and ether, $P(OC_2H_5)_3$, $OP(OCH_3)_3$, and the like, and suitable combinations of any two or more thereof. Suitable aluminum precursors for aerosol delivery comprise, for example, aluminum chloride ($AlCl_3.6H_2O$), which is soluble in many organic solvents, and aluminum nitrate ($Al(NO_3)_3.9H_2O$) and aluminum hydroxychloride ($Al_2(OH)_5Cl.2H_2O$), which are soluble in water, as well as $Al(C_2H_5)_3$, $Al(OC_4H_9)_3$, $Al(C_5H_7O_2)_3$, $Al(C_{18}H_{35}O_2)_3$, and the like, and suitable combinations of any two or more thereof. Suitable titanium precursors for aerosol delivery comprise, for example, $Ti(N(CH_3)_2)_4$), $TiO_2OH$, and the like, and suitable combinations of any two or more thereof. Suitable germanium precursors for aerosol delivery comprise, for example, $Ge(OC_2H_5)_3$, $Ge(OCH_3)_4$, and the like, and suitable combinations of any two or more thereof. Suitable tellurium precursors for aerosol delivery comprise, for example $TeCl_4$, which is soluble in alcohol, and the like, and suitable combinations of any two or more thereof.

Similarly, rare earth dopant/additive precursors can be supplied as an aerosol. Some representative rare earth precursors suitable for aerosol delivery are presented below with suitable solvents. Yttrium chloride ($YCl_3$) and yttrium nitrate ($Y(NO_3)_3$) are soluble in water. Lanthanum chloride ($LaCl_3$ and $LaCl_3.7H_2O$) and lanthanum nitrate hexahydrate ($La(NO_3)_3.6H_2O$) are soluble in water. Thulium chloride ($TmCl_3$ and $TmCl_3.7H_2O$) is soluble in water. Ytterbium chloride ($YbCl_3$ and $YbCl_3.6H_2O$) is soluble in water. Praseodymium chloride ($PrCl_3$ and $PrCl_3.7H_2O$) and praseodymium nitrate hexahydrate ($Pr(NO_3)_3.6H_2O$) are soluble in water. Neodymium chloride ($NdCl_3$ and $NdCl_3.6H_2O$) and neodymium nitrate hexahydrate ($Nd(NO_3)_3.6H_2O$) are soluble in water. Erbium chloride ($ErCl_3$ and $ErCl_3.6H_2O$) is soluble in water. Other suitable rare earth dopants/additives include, for example, $Er(NO_3)_3$, $CeCl_3$ and $Ce(NO_3)_3$.

Other non-rare earth metal dopants/additives also can be delivered by aerosol. For example, zinc chloride ($ZnCl_2$) and zinc nitrate ($Zn(NO_3)_2$) are soluble in water and some organic solvents, such as isopropyl alcohol. Suitable lithium precursors for aerosol delivery from solution comprise, for example, lithium acetate ($LiCH_3CO_2$) and lithium nitrate ($LiNO_3$), which are soluble in water and alcohol lithium chloride (LiCl), which is somewhat soluble in water, alcohol and some other organic solvents, lithium hydroxide (LiOH), which is somewhat soluble in water and alcohol and the like, and suitable combinations of any two or more thereof. Suitable bismuth precursors for aerosol delivery comprise, for example, bismuth nitrate ($Bi(NO_3)_3$), which is soluble in dilute aqueous acid solutions, and the like, and suitable combinations of any two or more thereof. Antimony trichloride ($SbCl_3$) is soluble in alcohol. Barium azide ($Ba(N_3)_2$) and barium chloride ($BaCl_2$) are soluble in water.

As noted above, fluorine dopants/additives are of interest for some applications. For phosphate coating silica glasses, a fluoride precursor of particular interest comprises for example, phosphorus trifluoride ($PF_3$), which is a gas such that it is suitable for vapor delivery into a laser pyrolysis/light reactive deposition chamber. Other fluoride precursors for vapor and/or aerosol delivery comprises, for example, $(C_2H_5O)_3SiF$, $(C_2H_5O)_2SiF_2$, $(C_2H_5O)SiF_3$, $(C_2H_5)_2SiF_2$, $C_2H_5SiF_3$, $C_6H_5SiF_3$, $H_2SiF_6.xH_2O$, $SiF_4$, $Si_4F_3Cl$, $SiF_2Cl_2$, $SiFCl_3$, $HPO_2F_2$, $HPF_6.6H_2O$, $(i-C_3H_7O)_2POF$, $H_2PO_3F$, $CF_4$, $CF_3COCF_3.H_2O$, $AlF_3$, $SnF_2$, $SnF_4$, $GeF_2$, $GeF_4$, $GeF_3Cl$, $GeF_2Cl_2$, $GeFCl_3$, $TiF_4$, $FCH_2CO_2H$, $C_2F_6$, $CCl_2F_2$, $BF_3.2H_2O$, $[(CH_3)2N]2BF$, $C_6H_5BF_2$, $(4-CH_3C_6H_4)BF_2$, $(4-CH_3C_6H_4)BF_2$, $HBF_4$, and the like, and suitable combinations of any two or more thereof. Chlorine dopants/additives can be introduced as the chloride of a metal/metalloid element or in similar compounds as fluorine. Carbon and nitrogen dopants/additives can be introduced as elements associated with other precursors, and carbon can be supplied as ethylene or other hydrocarbon.

Laser Pyrolysis Apparatus

An appropriate laser pyrolysis apparatus generally comprises a reaction chamber isolated from the ambient environment. A reactant inlet connected to a reactant delivery apparatus generates a reactant stream as a flow through the reaction chamber. A radiation beam path, e.g., a light beam path, intersects the reactant stream at a reaction zone. The reactant/product stream continues after the reaction zone to an outlet, where the reactant/product stream exits the reaction chamber and passes into a collection apparatus. For light reactive deposition, the coating can be performed in the reaction chamber or in a separate coating chamber connected to the reaction chamber, as described further below. Generally, the radiation source, such as a laser, is located external to the reaction chamber, and the light beam enters the reaction chamber through an appropriate window.

Referring to FIG. 1, a particular embodiment 100 of a laser pyrolysis system involves a reactant delivery apparatus 102, reaction chamber 104, shielding gas delivery apparatus 106, collection apparatus 108 and light source 110. A first reaction delivery apparatus described below can be used to deliver one or more exclusively gaseous reactants. An alternative reactant delivery apparatus is described for delivery of one or more reactants as an aerosol. A further reactant delivery apparatus permits delivery of one or more reactants as an aerosol and one or more reactant as a vapor/gas.

Figure 2:
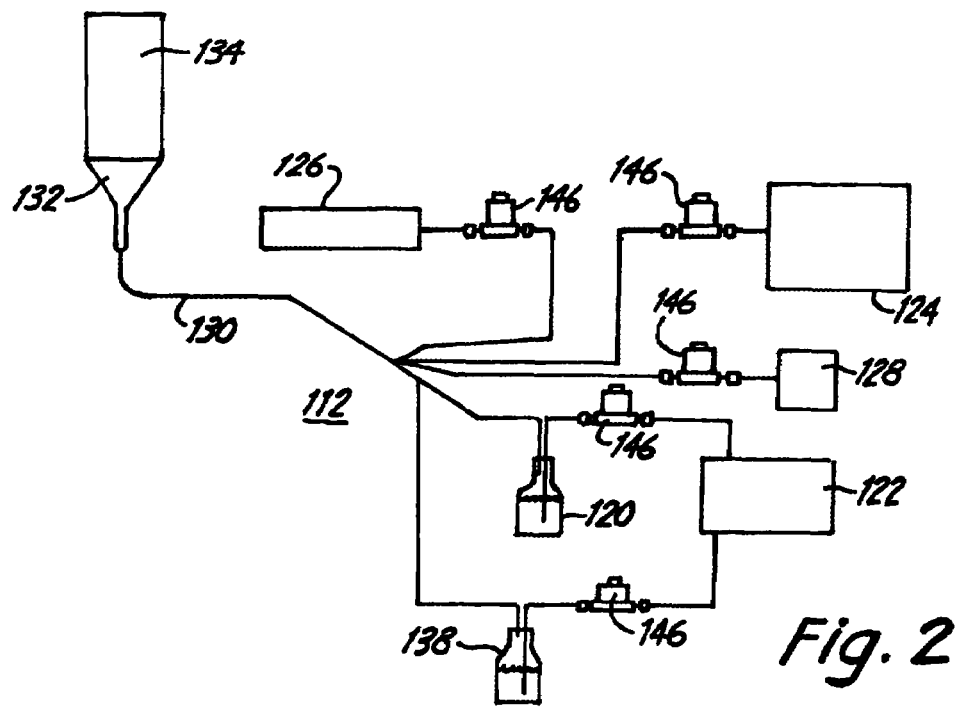

Referring to FIG. 2, a first embodiment 112 of reactant delivery apparatus 102 includes a source 120 of a precursor composition. For liquid or solid reactants, a carrier gas from one or more carrier gas sources 122 can be introduced into precursor source 120 to facilitate delivery of the reactant. Precursor source 120 can be a liquid holding container, a solid precursor delivery apparatus or other suitable container. The carrier gas from carrier gas source 122 can be either an infrared absorber and/or an inert gas. In some embodiments, the precursor source is a flash evaporator that supplies a vapor of the precursor at a selected vapor pressure, generally without a carrier gas. The flash evaporator can be connected to a liquid reservoir to supply liquid precursor. Suitable flash evaporators are available from, for example, MKS Equipment or can be produced from readily available components.

The gas/vapor from precursor source 120 are mixed with gases from infrared absorber source 124, inert gas source 126 and/or secondary reactant source 128 by combining the gases in a single portion of tubing 130. Tubing 130 can be heated to prevent condensation of precursors within the tube. The gases/vapors are combined a sufficient distance from reaction chamber 104 such that the gases/vapors become well mixed prior to their entrance into reaction chamber 104. The combined gas/vapor in tube 130 passes through a duct 132 into channel 134, which is in fluid communication with reactant inlet 256 (FIG. 1).

A second precursor/reactant can be supplied from second precursor source 138, which can be a liquid reactant delivery apparatus, a solid reactant delivery apparatus, a gas cylinder, a flash evaporator or other suitable container or containers. As shown in FIG. 2, second precursor source 138 delivers a second reactant to duct 132 by way of tube 130. Alternatively, mass flow controllers 146 can be used to regulate the flow of gases within the reactant delivery system of FIG. 2. In alternative embodiments, the second precursor can be delivered through a second duct for delivery into the reactant chamber through a second channel such that the reactants do not mix until they are in the reaction chamber. A laser pyrolysis apparatus with a plurality of reactant delivery nozzles is described further in copending and commonly assigned U.S. patent application Ser. No. 09/970,279 to Reitz et al., entitled "Multiple Reactant Nozzles For A Flowing Reactor," incorporated herein by reference. One or more additional precursors, e.g., a third precursor, fourth precursor, etc., can be similarly delivered based on a generalization of the description for two precursors.

As noted above, the reactant stream can comprise one or more aerosols. The aerosols can be formed within reaction chamber 104 or outside of reaction chamber 104 prior to injection into reaction chamber 104. If the aerosols are produced prior to injection into reaction chamber 104, the aerosols can be introduced through reactant inlets comparable to those used for gaseous reactants, such as reactant inlet 134 in FIG. 2.

Figure 3A:
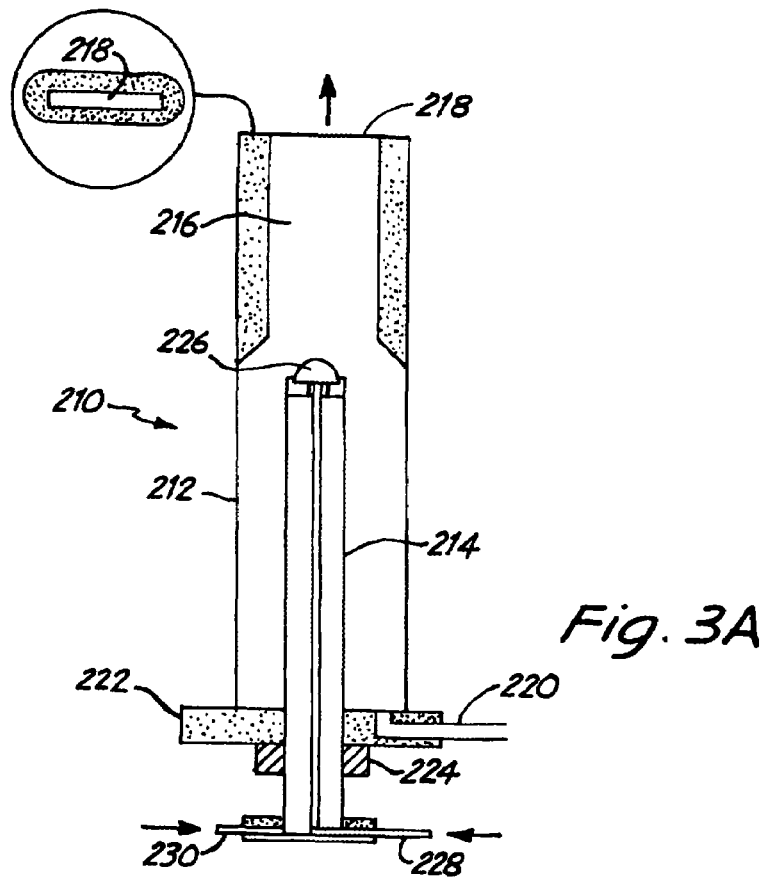

Referring to FIG. 3A, embodiment 210 of the reactant supply system 102 can be used to supply an aerosol to duct 132. Reactant supply system 210 comprises an outer nozzle 212 and an inner nozzle 214. Outer nozzle 212 has an upper channel 216 that leads to a rectangular outlet 218 at the top of outer nozzle 212, as shown in the insert in FIG. 3A. Rectangular outlet 218 has selected dimensions to produce a reactant stream of desired expanse within the reaction chamber. Outer nozzle 212 comprises a drain tube 220 in base plate 222. Drain tube 220 is used to remove condensed aerosol from outer nozzle 212. Inner nozzle 214 is secured to outer nozzle 212 at fitting 224.

The top of inner nozzle 214 can be a twin orifice internal mix atomizer 226. Liquid is fed to the atomizer through tube 228, and gases for introduction into the reaction chamber are fed to the atomizer through tube 230. Interaction of the gas with the liquid assists with droplet formation.

Figure 3B:
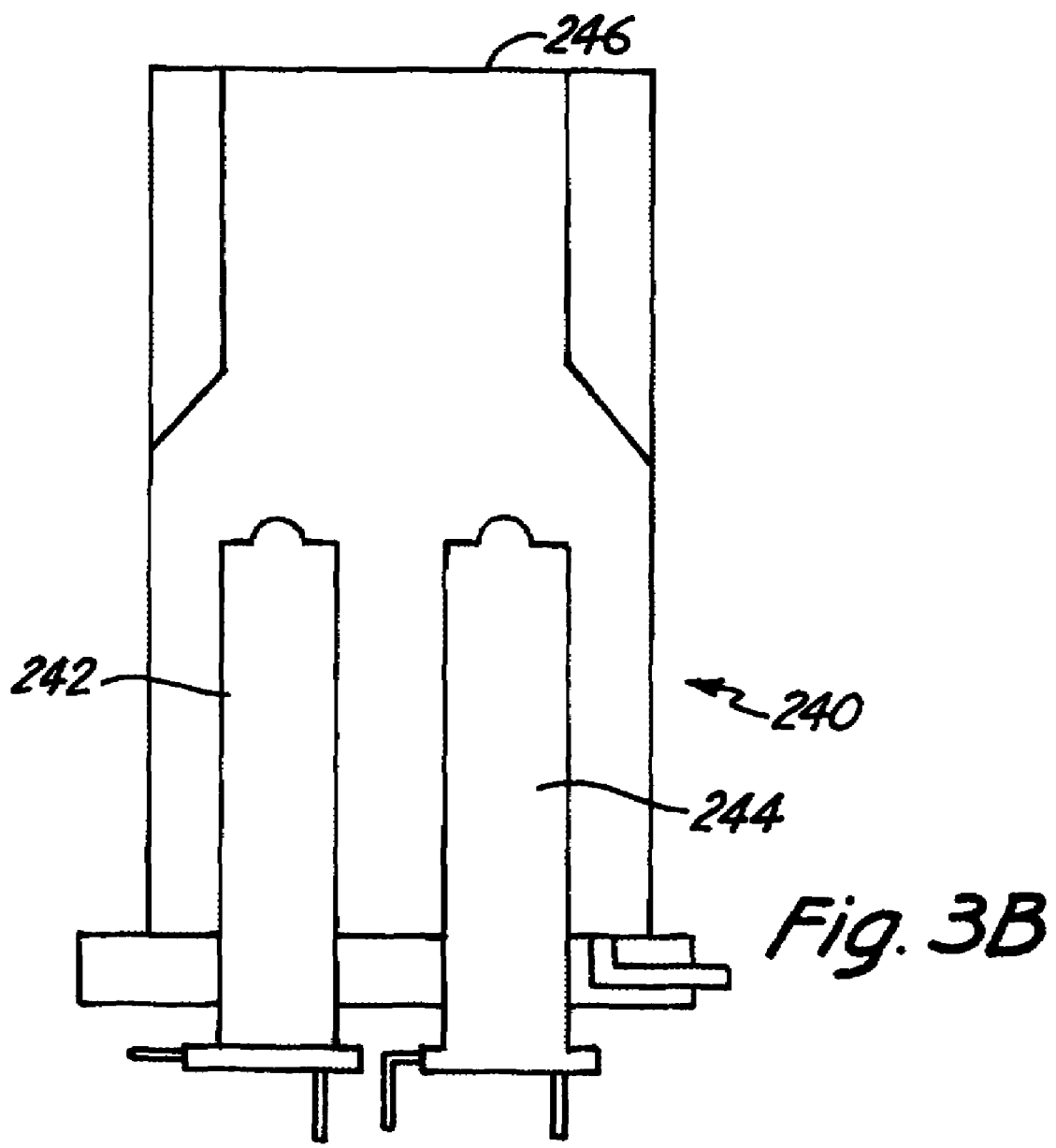

A plurality of aerosol generators can be used to produce aerosol within the reaction chamber or within one or more inlets leading to the reaction chamber. The aerosol generators can be used to generate the same or different aerosol composition from each other. For embodiments in which the aerosol generators product aerosols of different compositions, the aerosols can be used to introduce reactants/precursors that are not easily or conveniently dissolved/dispersed into the same solvent/dispersant. Thus, if a plurality of aerosol generators is used to form an aerosol directly within the reaction chamber, the aerosol generators can be oriented to mix the reactants or to deliver separate streams, possibly overlapping, along the reaction zone. If two or more aerosols are generated within a single inlet nozzle the aerosols can be mixed and flowed within a common gas flow. An inlet nozzle with two aerosol generators is shown in FIG. 3B. Inlet nozzle 240 includes aerosol generators 242, 244. Which generate aerosols directed to outlet 246.

Alternatively, aerosol generators can generate aerosols within separate inlets such that the aerosols are combined within the reaction chamber. The use of a plurality of aerosol generators within a single inlet nozzle or a plurality of inlet nozzles can be useful for embodiments in which it is difficult to introduce desired compositions within a single solution/dispersion. Multiple aerosol generators producing aerosols within different inlets is described further in copending and commonly assigned U.S. patent application Ser. No. 09/362,631 to Mosso et al., entitled "Particle Production Apparatus," incorporated herein by reference.

In any of these aerosol embodiments, one or more vapor/gas reactants/precursors can also be introduced. For example, the vapor/gas precursors can be introduced within the aerosol generator itself to help form the aerosol. In alternative embodiments, the vapor can be delivered through a separate inlet into the delivery channel into which the aerosol is generated such that the vapor and aerosol mix and are delivered into the reaction chamber through the same reactant inlet. In further embodiments, the vapor precursors are delivered into the reaction chamber through separate reactant inlets to combine with the flow comprising the aerosol. In addition, these approaches can be combined for the delivery of a single vapor precursor, different vapor precursors through different delivery channels or a combination thereof.

Figure 4:
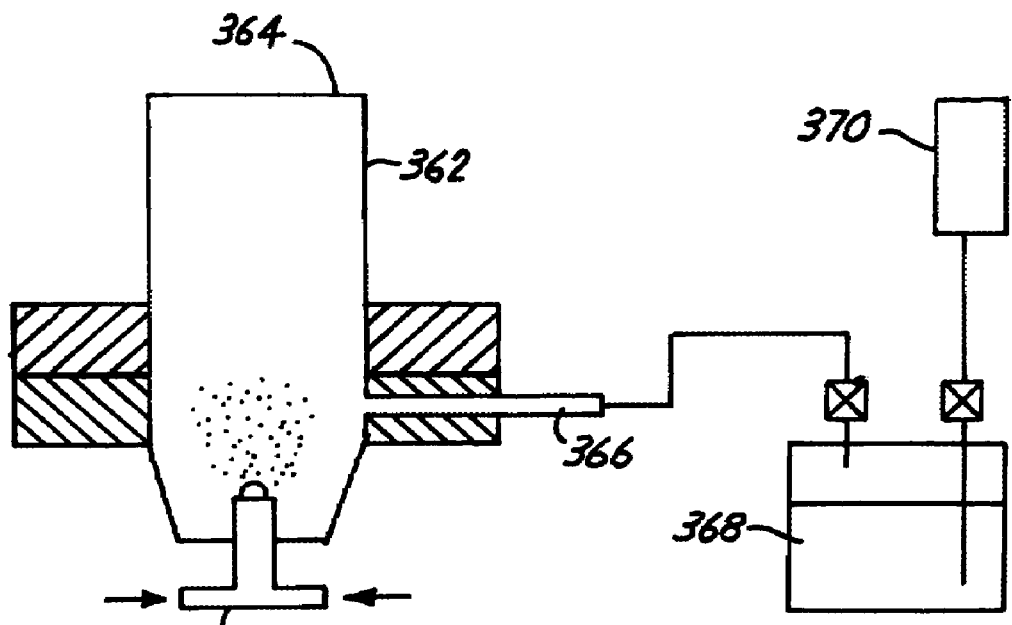

An embodiment of an inlet nozzle that is configured for delivery of a vapor precursor into a channel with an aerosol for delivery together into a reaction chamber is depicted in FIG. 4. Referring to FIG. 4, aerosol generator 360 delivers an aerosol into channel 362. Channel 362 leads to reactant inlet 364 that generally leads into a reaction chamber. Reactant inlet 364 can be positioned, as desired, to deliver the reactant stream/flow a suitable distance from a radiation path within the reaction chamber. Vapor channel 366 leads into channel 362 such that vapor precursors can mix with aerosols from aerosol generator 360 for delivery through reactant inlet 364. Vapor channel 366 connects to a flash evaporator 368, although other vapor sources, such as a bubbler or solid vapor source, can be used. Flash evaporator heats a liquid precursor to a temperature to deliver a selected vapor pressure to vapor channel 366. Vapor channel 366 and/or channel 362 can be heated to reduce or eliminate condensation of vapor reactants. Flash evaporator 368 connects to a liquid source 370.

Figure 5:
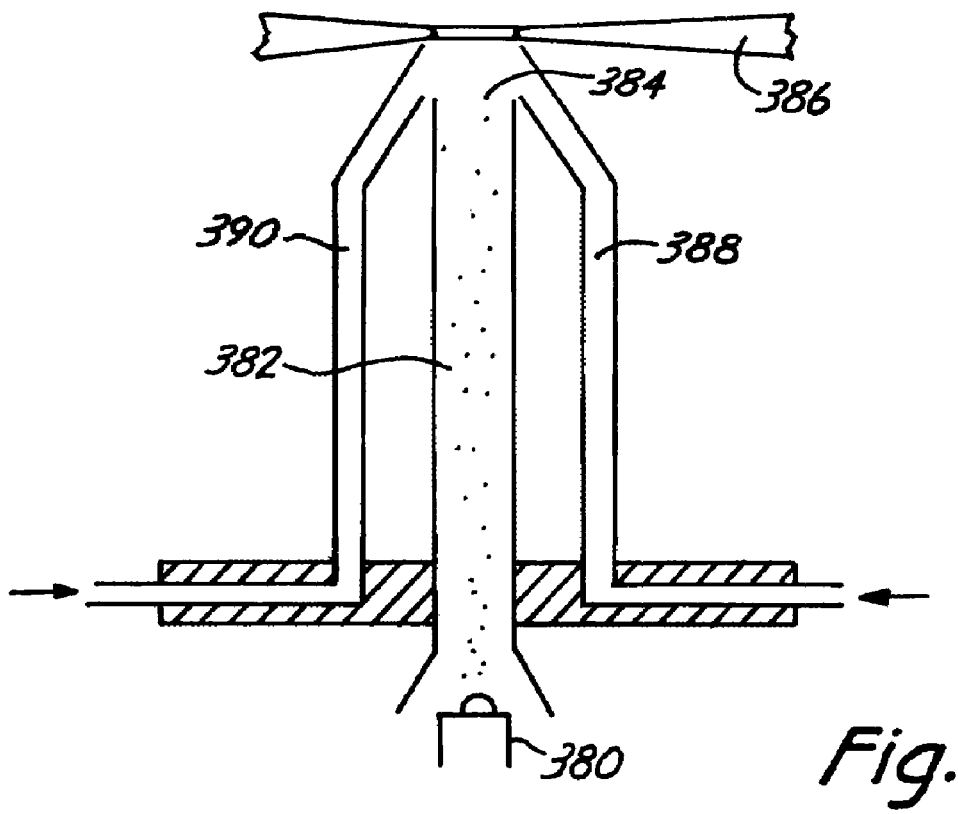

An embodiment of a reactant delivery system is depicted in FIG. 5 for the delivery of a vapor precursor into the reaction chamber independently from a reactant flow comprising an aerosol. Referring to FIG. 5, aerosol generator 380 generates an aerosol within channel 382 that leads to reactant inlet 384. The aerosol from reactant inlet 382 leads to radiation beam 386. Vapor channels 388, 390 deliver vapor reactants into the reaction chamber to mix with the aerosol just before reaching radiation beam 386.

In alternative embodiments, aerosol precursors can be delivered through channels 388, 390 of FIG. 5 while a vapor/gaseous reactant(s) are delivered through channel 382. For example, a vapor silicon precursor and/or other glass forming host elements can be delivered through central channel 382 while aerosol dopants/additives can be delivered through channels 388, 390. In further embodiments, precursors, e.g., dopant/additive precursors, can be delivered to intersect another reactant flow at a radiation beam and/or just beyond a radiation beam. If dopant/additive precursors intersect a reactant/product flow just beyond a radiation beam, the particles may still be forming such that the dopants/additives are introduced into the matrix of the particles, or the dopants/additives can be associated with hot particles such that they are incorporated into the final uniform material upon consolidation.

Referring to FIG. 1, the reaction chamber 104 comprises a main chamber 250. Reactant supply system 102 connects to the main chamber 250 at injection nozzle 252. Reaction chamber 104 can be heated to a surface temperature above the dew point of the mixture of reactants and inert components at the pressure in the apparatus.

The end of injection nozzle 252 has an annular opening 254 for the passage of inert shielding gas, and a reactant inlet 256 (left lower insert) for the passage of reactants to form a reactant stream in the reaction chamber. Reactant inlet 256 can be a slit, as shown in the lower inserts of FIG. 1. Annular opening 254 has, for example, a diameter of about 1.5 inches and a width along the radial direction from about 1/8 in to about 1/16 in. The flow of shielding gas through annular opening 254 helps to prevent the spread of the reactant gases and product particles throughout reaction chamber 104.

Tubular sections 260, 262 are located on either side of injection nozzle 252. Tubular sections 260, 262 include, for example, ZnSe windows 264, 266, respectively. Windows 264, 266 are about 1 inch in diameter. Windows 264, 266 can be cylindrical lenses with a focal length equal to the distance between the center of the chamber to the surface of the lens to focus the light beam to a point just below the center of the nozzle opening. Windows 264, 266 can have an antireflective coating. Appropriate ZnSe lenses are available from Laser Power Optics, San Diego, Calif. Tubular sections 260, 262 provide for the displacement of windows 264, 266 away from main chamber 250 such that windows 264, 266 are less likely to be contaminated by reactants and/or products. Window 264, 266 are displaced, for example, about 3 cm from the edge of the main chamber 250.

Windows 264, 266 are sealed with a rubber o-ring to tubular sections 260, 262 to prevent the flow of ambient air into reaction chamber 104. Tubular inlets 268, 270 provide for the flow of shielding gas into tubular sections 260, 262 to reduce the contamination of windows 264, 266. Tubular inlets 268, 270 are connected to shielding gas delivery apparatus 106.

Referring to FIG. 1, shielding gas delivery system 106 includes inert gas source 280 connected to an inert gas duct 282. Inert gas duct 282 flows into annular channel 284 leading to annular opening 254. A mass flow controller 286 regulates the flow of inert gas into inert gas duct 282. If reactant delivery system 112 of FIG. 2 is used, inert gas source 126 can also function as the inert gas source for duct 282, if desired. Referring to FIG. 1, inert gas source 280 or a separate inert gas source can be used to supply inert gas to tubes 268, 270. Flow to tubes 268, 270 can be controlled by a mass flow controller 288.

Light source 110 is aligned to generate a light beam 300 that enters window 264 and exits window 266. Windows 264, 266 define a light path through main chamber 250 intersecting the flow of reactants at reaction zone 302. After exiting window 266, light beam 300 strikes power meter 304, which also acts as a beam dump. An appropriate power meter is available from Coherent Inc., Santa Clara, Calif. Light source 110 can be a laser or an intense conventional light source such as an arc lamp. In one embodiment, light source 110 is an infrared laser, especially a CW $CO_2$ laser such as an 1800 watt maximum power output laser available from PRC Corp., Landing, N.J.

Reactants passing through reactant inlet 256 in injection nozzle 252 initiate a reactant stream. The reactant stream passes through reaction zone 302, where reaction involving the metal/metalloid precursor compositions and dopant/additive precursor compositions takes place. Heating of the gases in reaction zone 302 is extremely rapid, roughly on the order of about $10^5$ degree C./sec depending on the specific conditions. The reaction is rapidly quenched upon leaving reaction zone 302, and particles 306 are formed in the reactant/product stream. The nonequilibrium nature of the process allows for the production of nanoparticles with a highly uniform size distribution and structural homogeneity.

The path of the reactant stream continues to collection nozzle 310. Collection nozzle 310 has a circular opening 312, as shown in the upper insert of FIG. 1. Circular opening 312 feeds into collection system 108.

The chamber pressure is monitored with a pressure gauge 320 attached to the main chamber. A suitable chamber pressure for the production of the desired oxides generally ranges from about 80 Torr to about 650 Torr.

Collection system 108 can include a curved channel 330 leading from collection nozzle 310. Because of the small size of the particles, the product particles follow the flow of the gas around curves. Collection system 108 includes a filter 332 within the gas flow to collect the product particles. Due to curved section 330, the filter is not supported directly above the chamber. A variety of materials such as Teflon® (polytetrafluoroethylene), stainless steel, glass fibers and the like can be used for the filter as long as the material is inert and has a fine enough mesh to trap the particles. Suitable materials for the filter include, for example, a glass fiber filter from ACE Glass Inc., Vineland, N.J., cylindrical Nomex® filters from AF Equipment Co., Sunnyvale, Calif. and stainless steel filters from All Con World Systems, Seaford, Del.

Pump 334 is used to maintain collection system 108 at a selected pressure. It may be desirable to flow the exhaust of the pump through a scrubber 336 to remove any remaining reactive chemicals before venting into the atmosphere.

The pumping rate is controlled by either a manual needle valve or an automatic throttle valve 338 inserted between pump 334 and filter 332. As the chamber pressure increases due to the accumulation of particles on filter 332, the manual valve or the throttle valve can be adjusted to maintain the pumping rate and the corresponding chamber pressure.

The apparatus can be controlled by a computer 350. Generally, the computer controls the radiation (e.g., light) source and monitors the pressure in the reaction chamber. The computer can be used to control the flow of reactants and/or the shielding gas.

The reaction can be continued until sufficient particles are collected on filter 332 such that pump 334 can no longer maintain the desired pressure in the reaction chamber 104 against the resistance through filter 332. When the pressure in reaction chamber 104 can no longer be maintained at the desired value, the reaction is stopped, and filter 332 is removed. With this embodiment, about 1-300 grams of particles can be collected in a single run before the chamber pressure can no longer be maintained. A single run generally can last up to about 10 hours depending on the reactant delivery system, the type of particle being produced and the type of filter being used.

Figure 6:
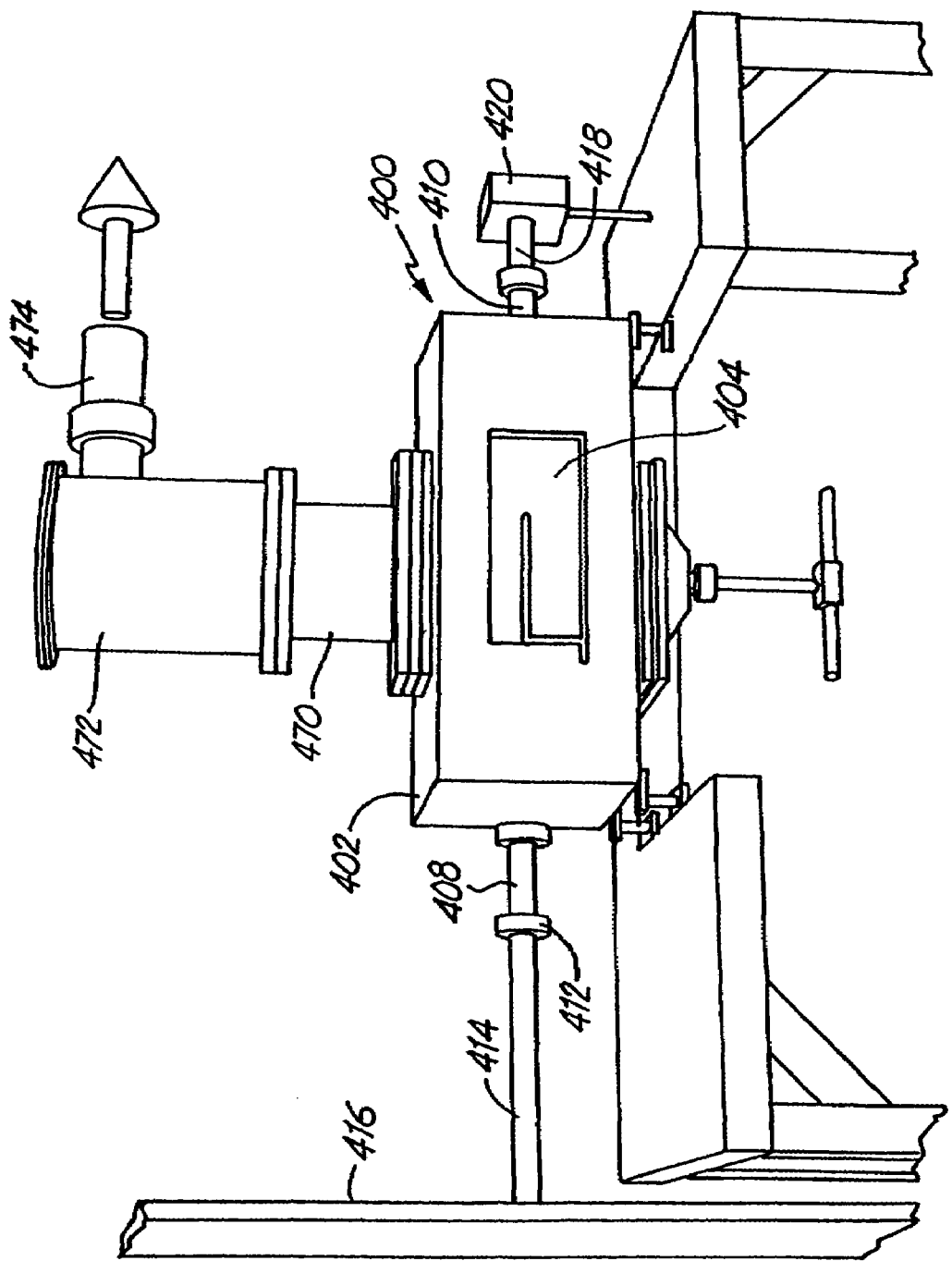

An alternative embodiment of a laser pyrolysis apparatus is shown in FIG. 6. Laser pyrolysis apparatus 400 includes a reaction chamber 402. The reaction chamber 402 has a shape of a rectangular parallelapiped. Reaction chamber 402 extends with its longest dimension along the laser beam. Reaction chamber 402 has a viewing window 404 at its side, such that the reaction zone can be observed during operation.

Reaction chamber 402 has tubular extensions 408, 410 that define an optical path through the reaction chamber. Tubular extension 408 is connected with a seal to a cylindrical lens 412. Tube 414 connects laser 416 or other optical source with lens 412. Similarly, Tubular extension 410 is connected with a seal to tube 418, which further leads to beam dump/light meter 420. Thus, the entire light path from laser 416 to beam dump 420 is enclosed.

Figure 7:
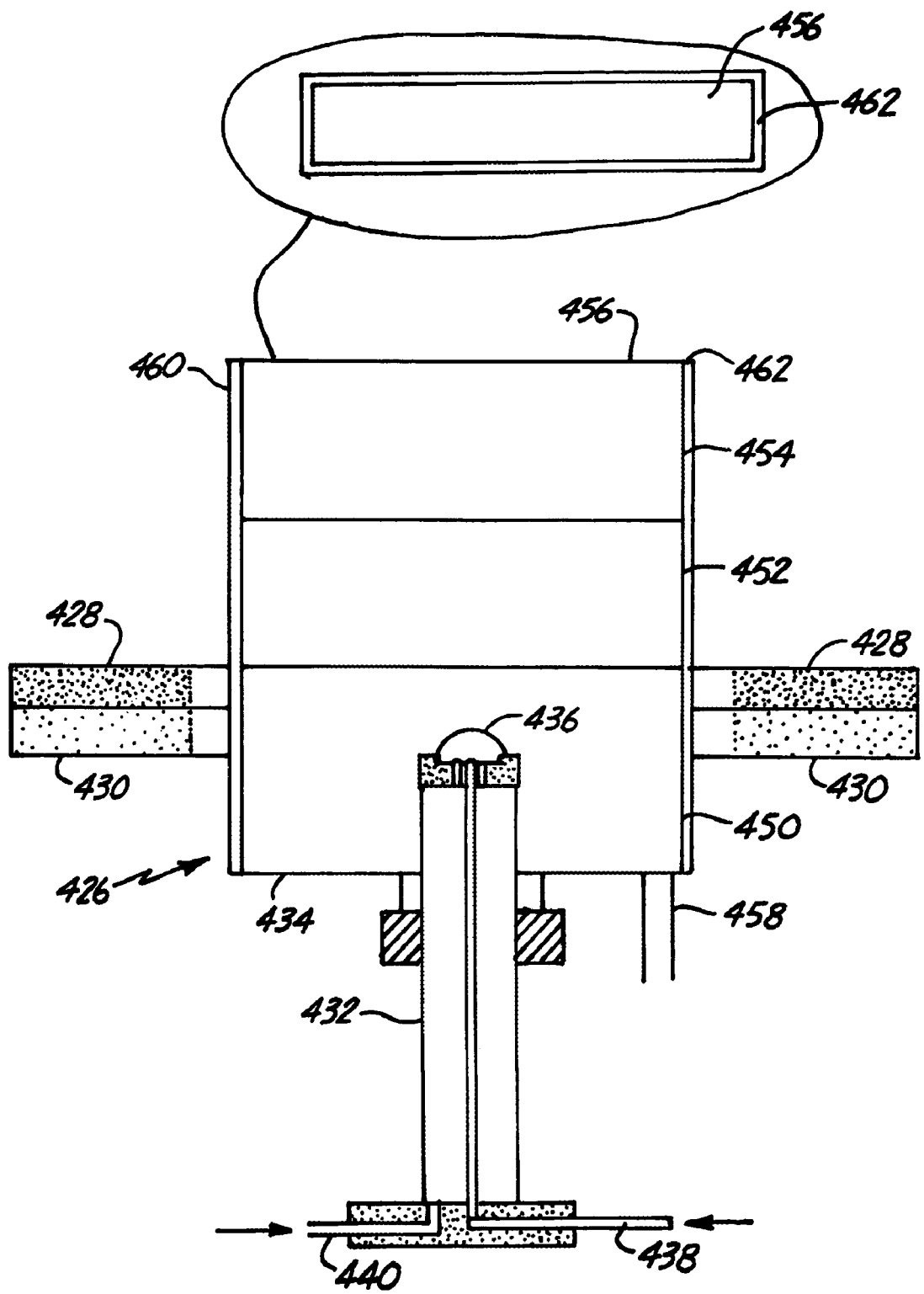

Inlet nozzle 426 connects with reaction chamber 402 at its lower surface 428. Inlet nozzle 426 includes a plate 430 that bolts into lower surface 428 to secure inlet nozzle 426. Referring to sectional views in FIGS. 7 and 8, inlet nozzle 426 includes an inner nozzle 432 and an outer nozzle 434. Inner nozzle 432 can have a twin orifice internal mix atomizer 436 at the top of the nozzle. Suitable gas atomizers are available from Spraying Systems, Wheaton, Ill. The twin orifice internal mix atomizer 436 has a fan shape to produce a thin sheet of aerosol and gaseous precursors. Liquid is fed to the atomizer through tube 438, and gases for introduction into the reaction chamber are fed to the atomizer through tube 440. Interaction of the gas with the liquid assists with droplet formation.

Outer nozzle 434 comprises a chamber section 450, a funnel section 452 and a delivery section 454. Chamber section 450 holds the atomizer of inner nozzle 432. Funnel section 452 directs the aerosol and gaseous precursors into delivery section 454. Delivery section 450 leads to an about 3 inch by 0.5 inch rectangular outlet 456, shown in the insert of FIG. 7. Outer nozzle 434 comprises a drain 458 to remove any liquid that collects in the outer nozzle. Outer nozzle 434 is covered by an outer wall 460 that forms a shielding gas opening 462 surrounding outlet 456. Inert gas is introduced through inlet 464. The nozzle in FIGS. 7 and 8 can be adapted for the delivery of aerosol and vapor precursors as discussed above with respect to FIGS. 3-5.

Referring to FIG. 6, exit nozzle 470 connects to apparatus 400 at the top surface of reaction chamber 402. Exit nozzle 470 leads to filter chamber 472. Filter chamber 472 connects with pipe 474, which leads to a pump. A cylindrical filter is mounted at the opening to pipe 474. Suitable cylindrical filters are described above.

Another alternative design of a laser pyrolysis apparatus has been described in U.S. Pat. No. 5,958,348 to Bi et al., entitled "Efficient Production of Particles by Chemical Reaction," incorporated herein by reference. This alternative design is intended to facilitate production of commercial quantities of particles by laser pyrolysis. Additional embodiments and other appropriate features for commercial capacity laser pyrolysis apparatuses are described in copending and commonly assigned U.S. patent application Ser. No. 09/362,631 to Mosso et al., entitled "Particle Production Apparatus," incorporated herein by reference.

In one embodiment of a commercial capacity laser pyrolysis apparatus, the reaction chamber and reactant inlet are elongated significantly along the light beam to provide for an increase in the throughput of reactants and products. The embodiments described above for the delivery of aerosol reactants can be adapted for the elongated reaction chamber design. Additional embodiments for the introduction of an aerosol with one or more aerosol generators into an elongated reaction chamber are described in U.S. Pat. No. 6,193,936 to Gardner et al., entitled "Reactant Delivery Apparatuses," incorporated herein by reference. A combination of vapor and aerosol precursors can be delivered into this reaction chamber by generalizing the approaches discussed above with respect to FIGS. 3-5. These improved reactors and corresponding nozzles can be adapted for light reactive deposition with vapor precursors, aerosol precursors and combinations thereof.

In general, the laser pyrolysis apparatus with the elongated reaction chamber and reactant inlet is designed to reduce contamination of the chamber walls, to increase the production capacity and to make efficient use of resources. To accomplish these objectives, the elongated reaction chamber provides for an increased throughput of reactants and products without a corresponding increase in the dead volume of the chamber. The dead volume of the chamber can become contaminated with unreacted compositions and/or reaction products. Furthermore, an appropriate flow of shielding gas confines the reactants and products within a flow stream through the reaction chamber. The high throughput of reactants makes efficient use of the laser energy.

Figure 9:
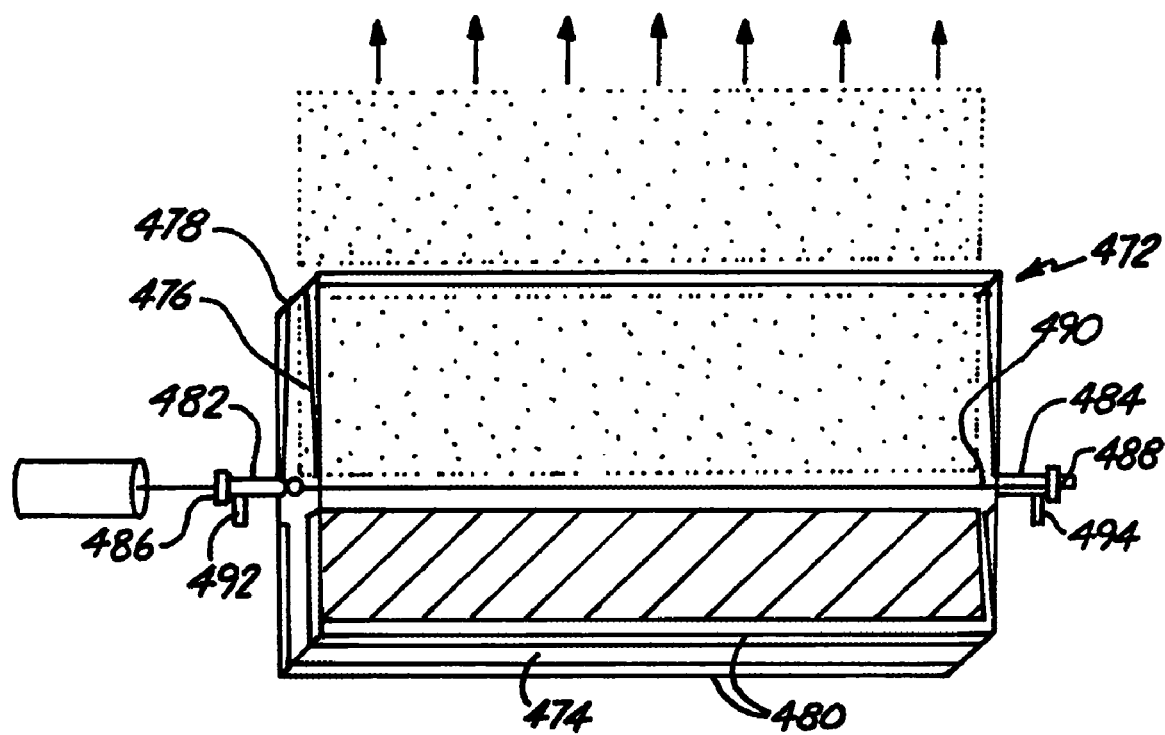

The design of the improved reaction chamber 472 is shown schematically in FIG. 9. A reactant inlet 474 leads to main chamber 476. Reactant inlet 474 conforms generally to the shape of main chamber 476. Main chamber 476 includes an outlet 478 along the reactant/product stream for removal of particulate products, any unreacted gases and inert gases. The configuration can be reversed with the reactants supplied from the top and product collected from the bottom, if desired. Shielding gas inlets 480 are located on both sides of reactant inlet 474. Shielding gas inlets are used to form a blanket of inert gases on the sides of the reactant stream to inhibit contact between the chamber walls and the reactants or products. The dimensions of elongated main chamber 476 and reactant inlet 474 can be designed for high efficiency particle production. Reasonable lengths for reactant inlet 474 for the production of ceramic nanoparticles, when used with an 1800 watt $CO_2$ laser, are from about 5 mm to about 1 meter.

Tubular sections 482, 484 extend from the main chamber 476. Tubular sections 482, 484 hold windows 486, 488 to define a light beam path 490 through the reaction chamber 472. Tubular sections 482, 484 can include inert gas inlets 492, 494 for the introduction of inert gas into tubular sections 482, 484.

The improved reaction system comprises a collection apparatus to remove the nanoparticles from the reactant stream. The collection system can be designed to collect particles in a batch mode with the collection of a large quantity of particles prior to terminating production. A filter or the like can be used to collect the particles in batch mode. Alternatively, the collection system can be designed to run in a continuous production mode by switching between different particle collectors within the collection apparatus or by providing for removal of particles without exposing the collection system to the ambient atmosphere. A suitable embodiment of a collection apparatus for continuous particle production is described in U.S. Pat. No. 6,270,732 to Gardner et al., entitled "Particle Collection Apparatus And Associated Methods," incorporated herein by reference.

Figure 10:
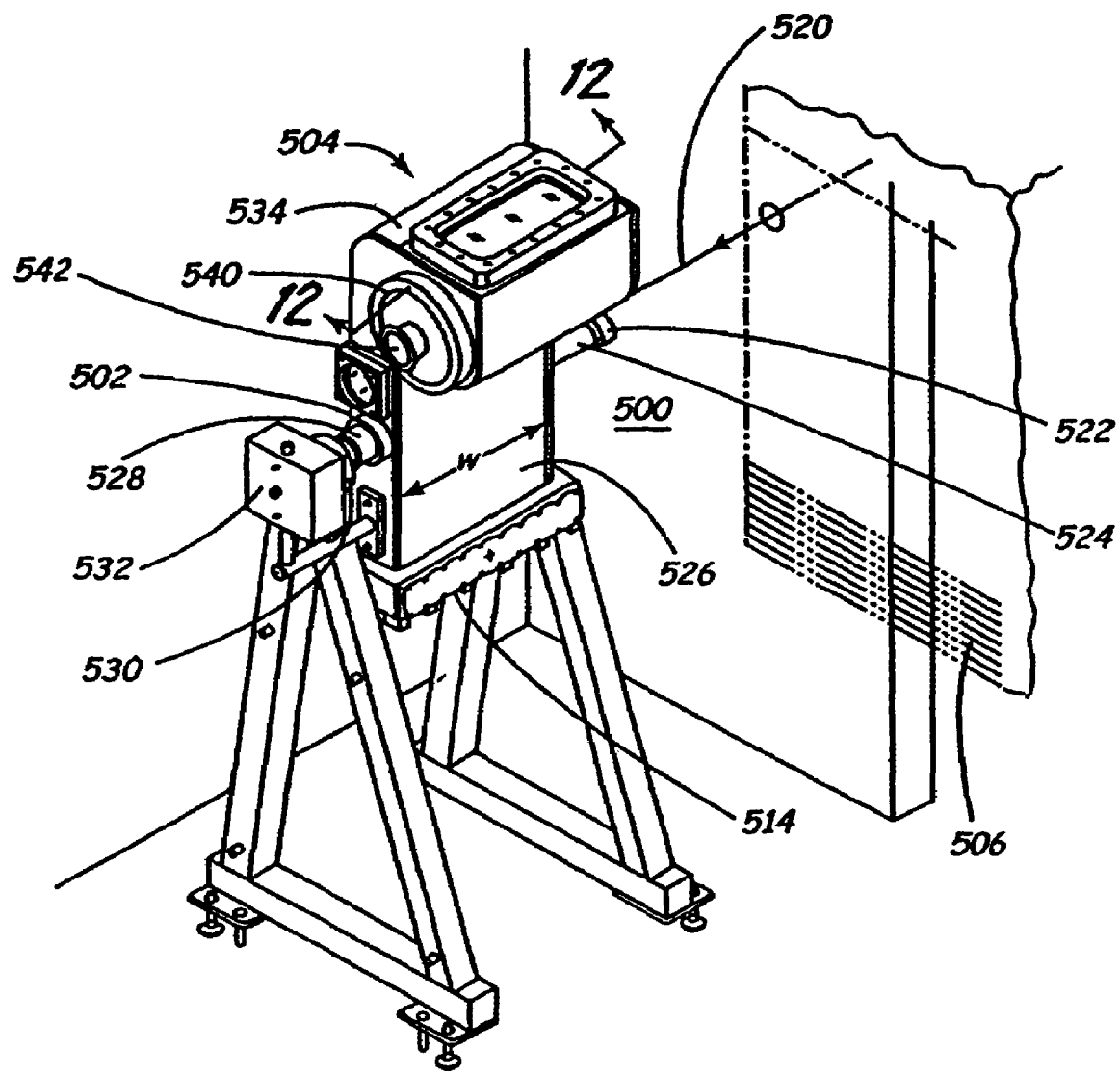
Figure 11:
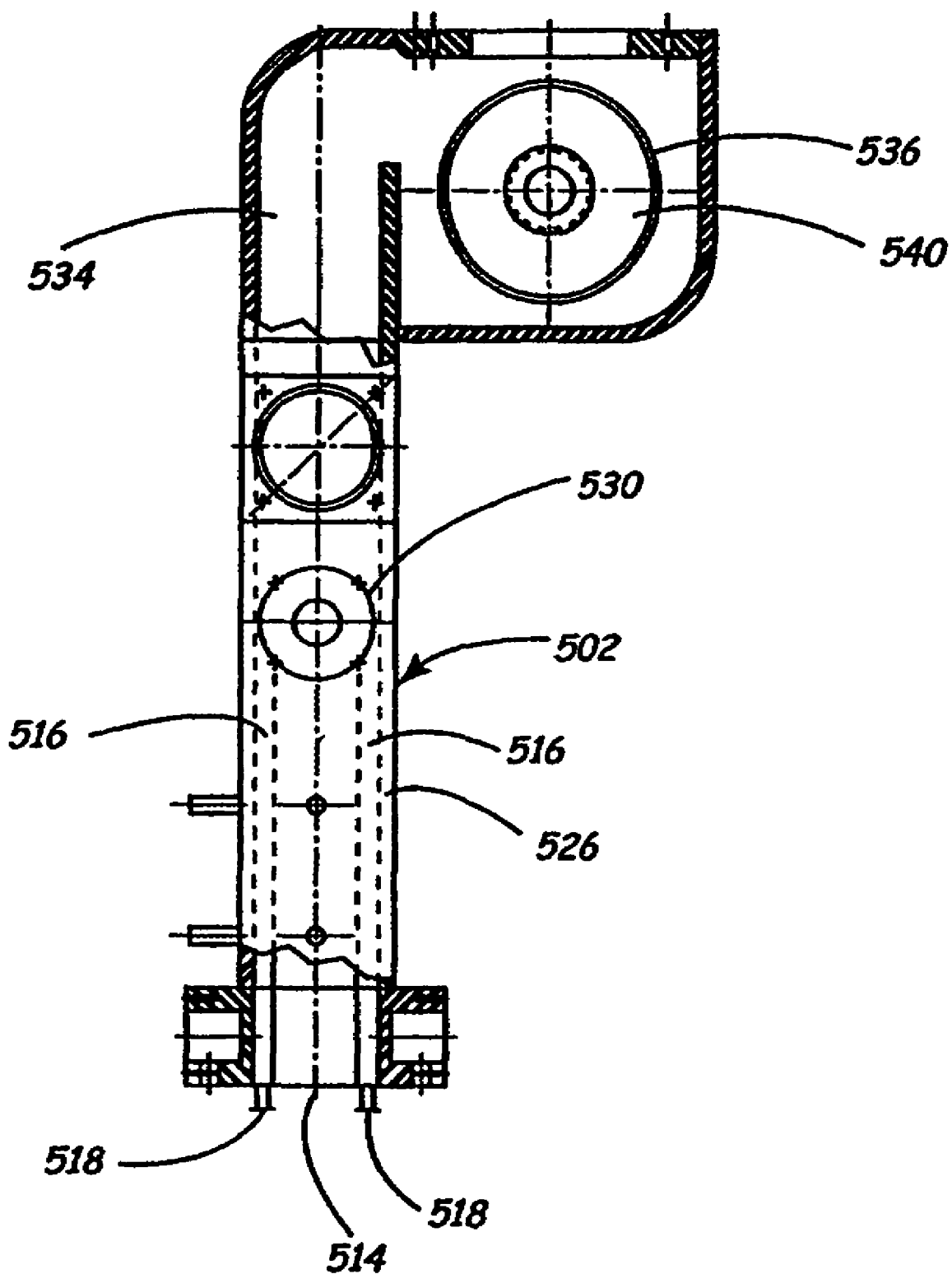
Figure 12:
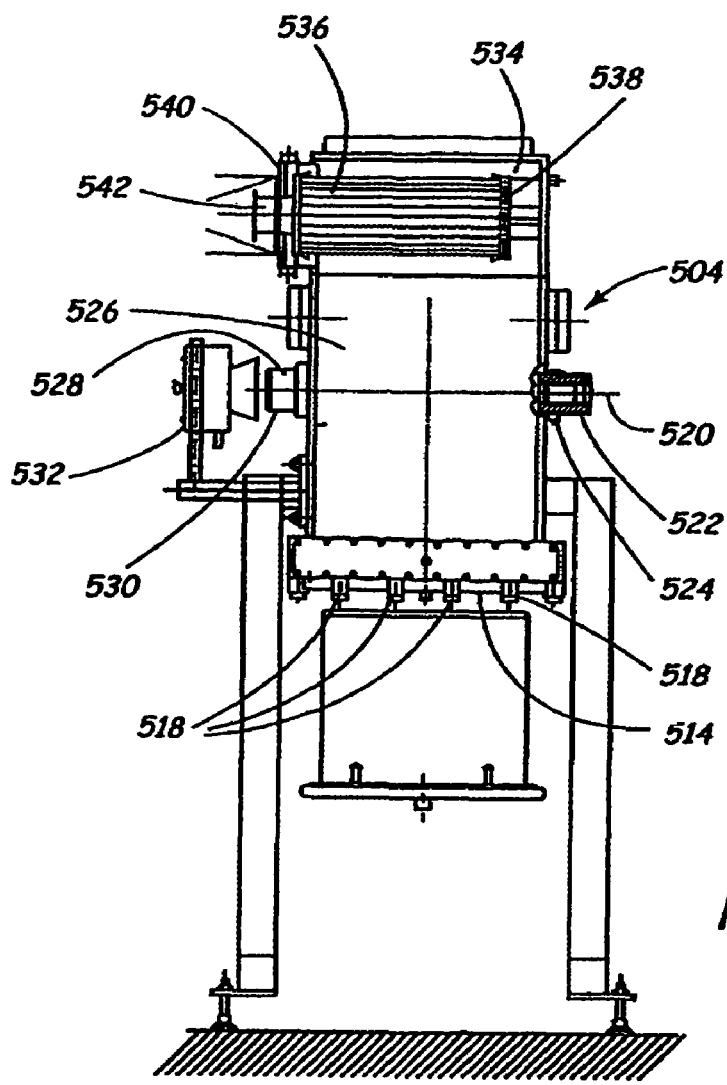

Referring to FIGS. 10-12 a specific embodiment of a laser pyrolysis reaction system 500 includes reaction chamber 502, a particle collection system 504, laser 506 and a reactant delivery system 508 (described below). Reaction chamber 502 comprises reactant inlet 514 at the bottom of reaction chamber 502 where reactant delivery system 508 connects with reaction chamber 502. In this embodiment, the reactants are delivered from the bottom of the reaction chamber while the products are collected from the top of the reaction chamber.

Shielding gas conduits 516 are located on the front and back of reactant inlet 514. Inert gas is delivered to shielding gas conduits 516 through ports 518. The shielding gas conduits direct shielding gas along the walls of reaction chamber 502 to inhibit association of reactant gases or products with the walls.

Figure 8:
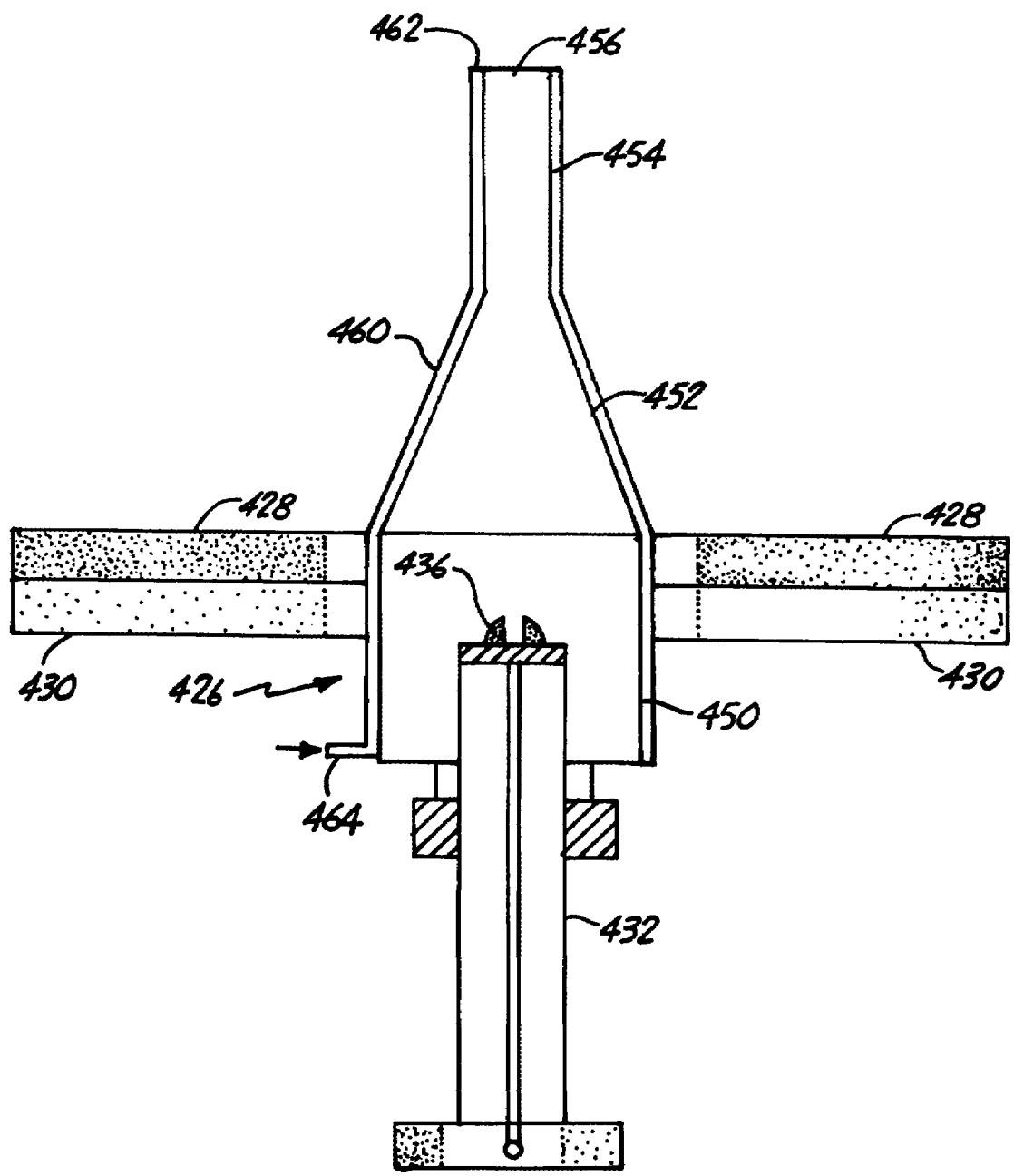

Reaction chamber 502 is elongated along one dimension denoted in FIG. 8 by "w". A laser beam path 520 enters the reaction chamber through a window 522 displaced along a tube 524 from the main chamber 526 and traverses the elongated direction of reaction chamber 502. The laser beam passes through tube 528 and exits window 530. In one particular embodiment, tubes 524 and 528 displace windows 522 and 530 about 11 inches from the main chamber. The laser beam terminates at beam dump 532. In operation, the laser beam intersects a reactant stream generated through reactant inlet 514.

The top of main chamber 526 opens into particle collection system 504. Particle collection system 504 includes outlet duct 534 connected to the top of main chamber 526 to receive the flow from main chamber 526. Outlet duct 534 carries the product particles out of the plane of the reactant stream to a cylindrical filter 536. Filter 536 has a cap 538 on one end. The other end of filter 536 is fastened to disc 540. Vent 542 is secured to the center of disc 540 to provide access to the center of filter 536. Vent 542 is attached by way of ducts to a pump. Thus, product particles are trapped on filter 536 by the flow from the reaction chamber 502 to the pump. Suitable pumps were described above. Suitable pumps include, for example, an air cleaner filter for a Saab 9000 automobile (Purilator part A44-67), which comprises wax impregnated paper with Plasticol or polyurethane end caps.

Figure 13:
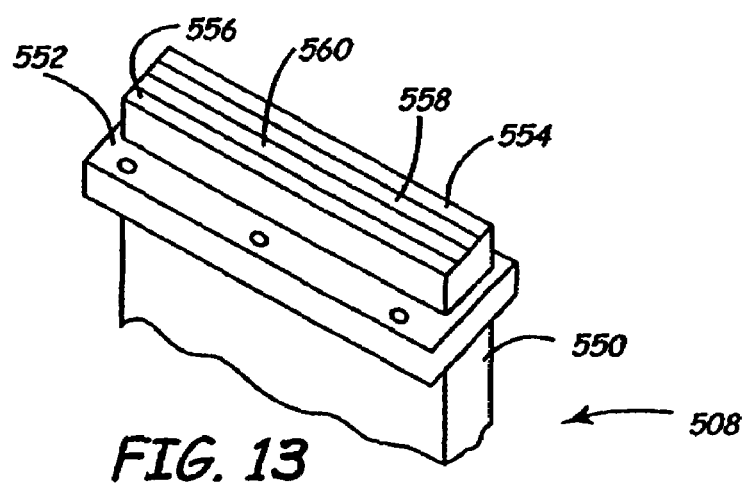

In a specific embodiment, reactant delivery system 508 comprises a reactant nozzle 550, as shown in FIG. 13. Reactant nozzle 550 can comprise an attachment plate 552. Reactant nozzle 550 attaches at reactant inlet 514 with attachment plate 552 bolting to the bottom of main chamber 526. In one embodiment, nozzle 550 has four channels that terminate at four slits 554, 556, 558, 560. Slits 558 and 560 can be used for the delivery of precursors and other desired components of the reactant stream. Slits 554, 556 can be used for the delivery of inert shielding gas. If a secondary reactant is spontaneously reactive with the vanadium precursor, it can be delivered also through slits 554, 556. One apparatus used for the production of oxide particles had dimensions for slits 554, 556, 558, 560 of 3 inches by 0.04 inches.

Coating Deposition

Light reactive deposition is a coating approach that uses an intense radiation source, e.g., a light source, to drive synthesis of desired compositions from a reactant stream. It has similarities with laser pyrolysis in that an intense radiation source drives the reaction. However, in light reactive deposition, the resulting compositions are directed to a substrate surface where a coating is formed. The characteristics of laser pyrolysis that lead to the production of highly uniform particles correspondingly can result in the production of coatings with high uniformity.

In light reactive deposition, the coating of the substrate can be performed in a coating chamber separate from the reaction chamber or the coating can be performed within the reaction chamber. In either of these configurations, the reactant delivery system can be configured similar to a reactant delivery system for a laser pyrolysis apparatus for the production of doped amorphous materials. Thus, the description of the production of doped amorphous particles by laser pyrolysis described above and in the examples below can be adapted for coating production using the approaches described in this section.

If the coating is performed in a coating chamber separate from the reaction chamber, the reaction chamber can be essentially the same as the reaction chamber for performing laser pyrolysis, although the throughput and the reactant stream size may be designed to be appropriate for the coating process. For these embodiments, the coating chamber and a conduit connecting the coating chamber with the reaction chamber replace the collection system of the laser pyrolysis system.

Figure 14:
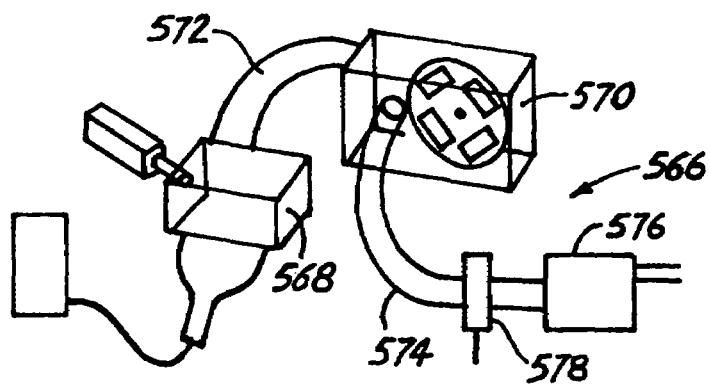

A coating apparatus with a separate reaction chamber and a coating chamber is shown schematically in FIG. 14. Referring to FIG. 14, the coating apparatus 566 comprises a reaction chamber 568, a coating chamber 570, a conduit 572 connecting the reaction apparatus with coating chamber 570, an exhaust conduit 574 leading from coating chamber 570 and a pump 576 connected to exhaust conduit 574. A valve 578 can be used to control the flow to pump 576. Valve 578 can be, for example, a manual needle valve or an automatic throttle valve. Valve 578 can be used to control the pumping rate and the corresponding chamber pressures.

Figure 15:
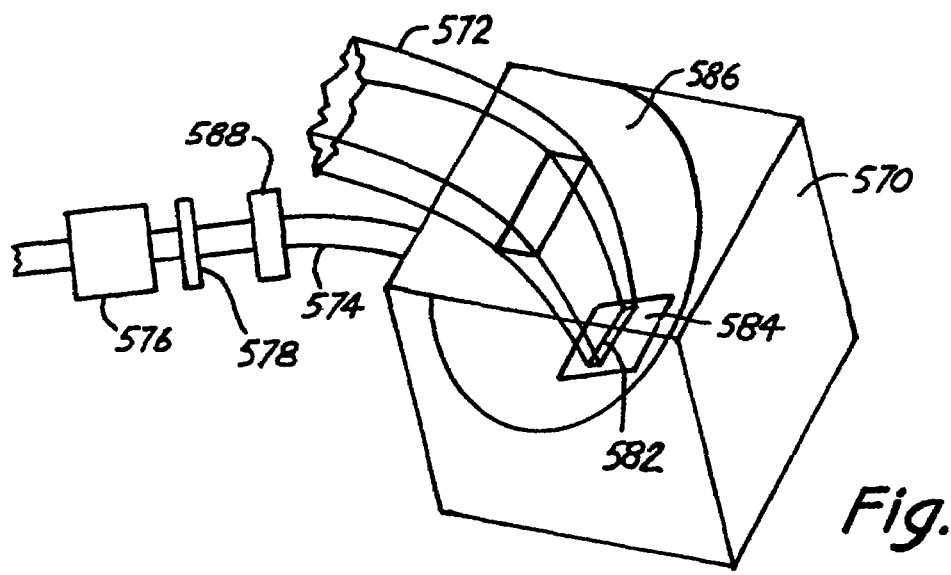

Referring to FIG. 15, conduit 572 from the particle production apparatus 568 leads to coating chamber 570. Conduit 572 terminates at opening 582 within chamber 570. In some embodiments, opening 572 is located near the surface of substrate 584 such that the momentum of the particle stream directs the particles directly onto the surface of substrate 584. Substrate 584 can be mounted on a stage or other platform 586 to position substrate 584 relative to opening 582. A collection system, filter, scrubber or the like 588 can be placed between the coating chamber 570 and pump 576 to remove particles that did not get coated onto the substrate surface.

Figure 16:
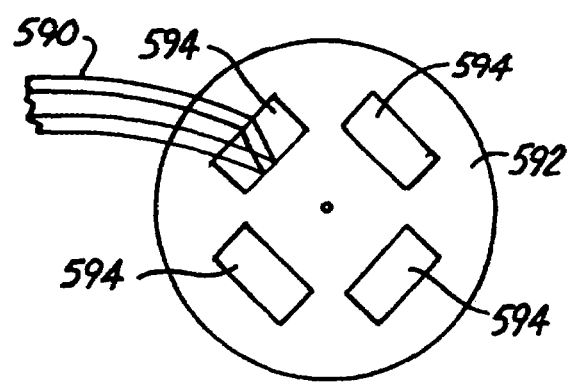

An embodiment of a stage to position a substrate relative to the conduit from the particle production apparatus is shown in FIG. 16. A particle nozzle 590 directs particles toward a rotating stage 592. As shown in FIG. 16, four substrates 594 are mounted on stage 592. More or fewer substrates can be mounted on a moveable stage with corresponding modifications to the stage and size of the chamber. Movement of stage 592 sweeps the particle stream across a substrate surface and positions particular substrate 594 within the path of nozzle 590. As shown in FIG. 16, a motor is used to rotate stage 592. Stage 592 can include thermal control features that provide for the control of the temperature of the substrates on stage 592. Alternative designs involve the linear movement of a stage or other motions. In other embodiments, the particle stream is unfocused such that an entire substrate or the desired portions thereof is simultaneously coated without moving the substrate relative to the product flow.

If the coating is performed within the reaction chamber, the substrate is mounted to receive product compositions flowing from the reaction zone. The compositions may not be fully solidified into solid particles, although quenching may be fast enough to form solid particles. Whether or not the compositions are solidified into solid particles, the particles can be highly uniform. In some embodiments, the substrate is mounted near the reaction zone.

Figure 17:
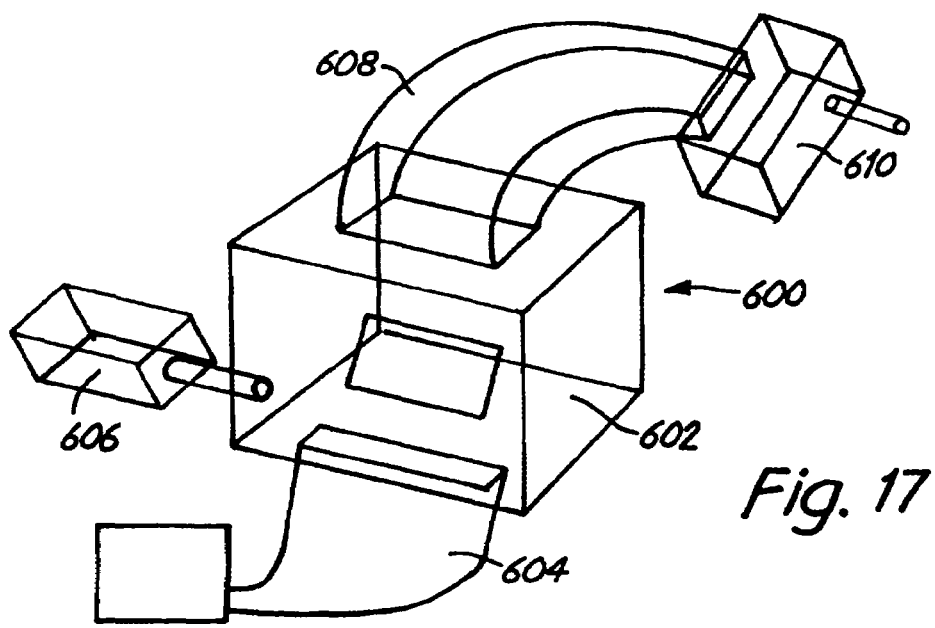

An apparatus 600 to perform substrate coating within the reaction chamber is shown schematically in FIG. 17. The reaction/coating chamber 602 is connected to a reactant supply system 604, a radiation source 606 and an exhaust 608. Exhaust 608 can be connected to a pump 610, although the pressure from the reactants themselves can maintain flow through the system.

Figure 18:
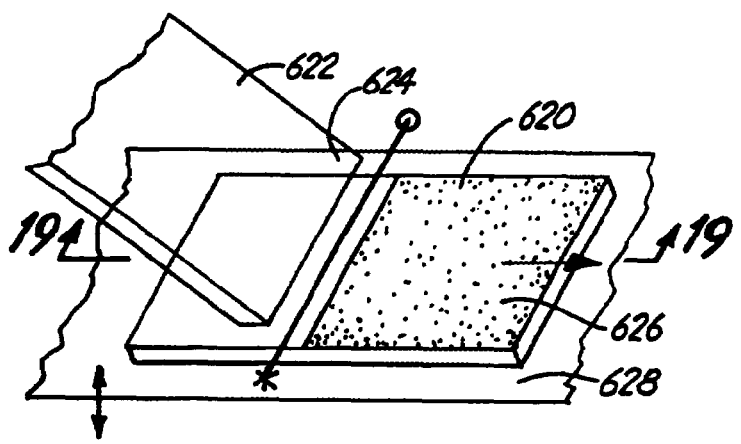
FIG. 18 is a perspective view of a reactant nozzle delivering reactants to a reaction zone positioned near a substrate.
Figure 19:
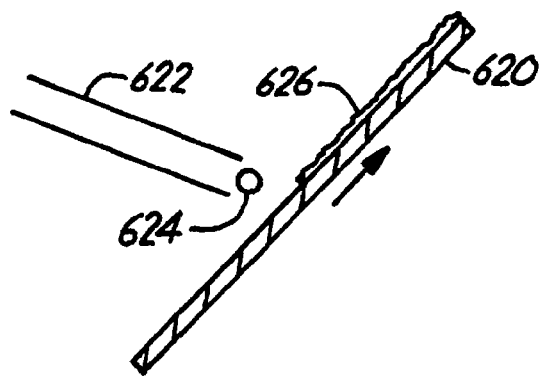
FIG. 19 is a sectional view of the apparatus of FIG. 18 taken along line 19-19.

Various configurations can be used to sweep the coating across the substrate surface as the product leaves the reaction zone. One embodiment is shown in FIGS. 18 and 19. A substrate 620 moves relative to a reactant nozzle 622, as indicated by the right directed arrow. The reactant nozzle and/or the substrate can move relative to the reaction chamber. Reactant nozzle 622 is located just above substrate 620. An optical path 624 is defined by suitable optical elements that direct a light beam along path 624. Optical path 624 is located between nozzle 622 and substrate 620 to define a reaction zone just above the surface of substrate 620. The hot particles tend to stick to the cooler substrate surface. A sectional view is shown in FIG. 19. A particle coating 626 is formed as the substrate is scanned past the reaction zone.

In general, substrate 620 can be carried on a conveyor 628. In some embodiments, the position of conveyor 628 can be adjusted to alter the distance from substrate 626 to the reaction zone. A change in the distance from substrate to the reaction zone correspondingly alters the temperature of the particles striking the substrate. The temperature of the particles striking the substrate generally alters the properties of the resulting coating and the conditions for subsequent processing, such as a subsequent heat processing consolidation of the coating. The distance between the substrate and the reaction zone can be adjusted empirically to produce desired coating properties. In addition, the stage/conveyor supporting the substrate can include thermal control features such that the temperature of the substrate can be adjusted to higher or lower temperatures, as desired.

Figure 20:
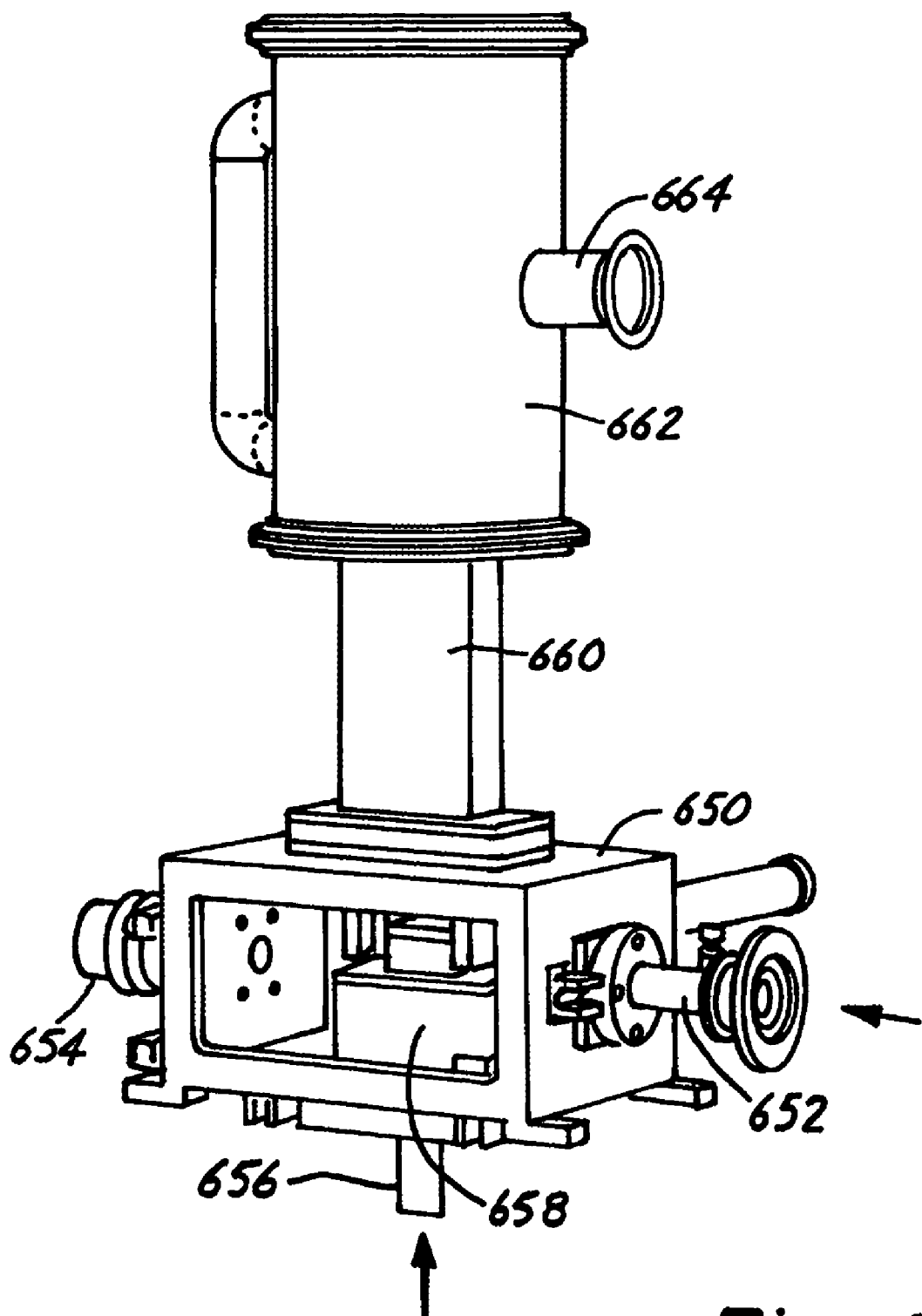
FIG. 20 is a perspective view of an embodiment of a light reactive deposition chamber.
Figure 21:
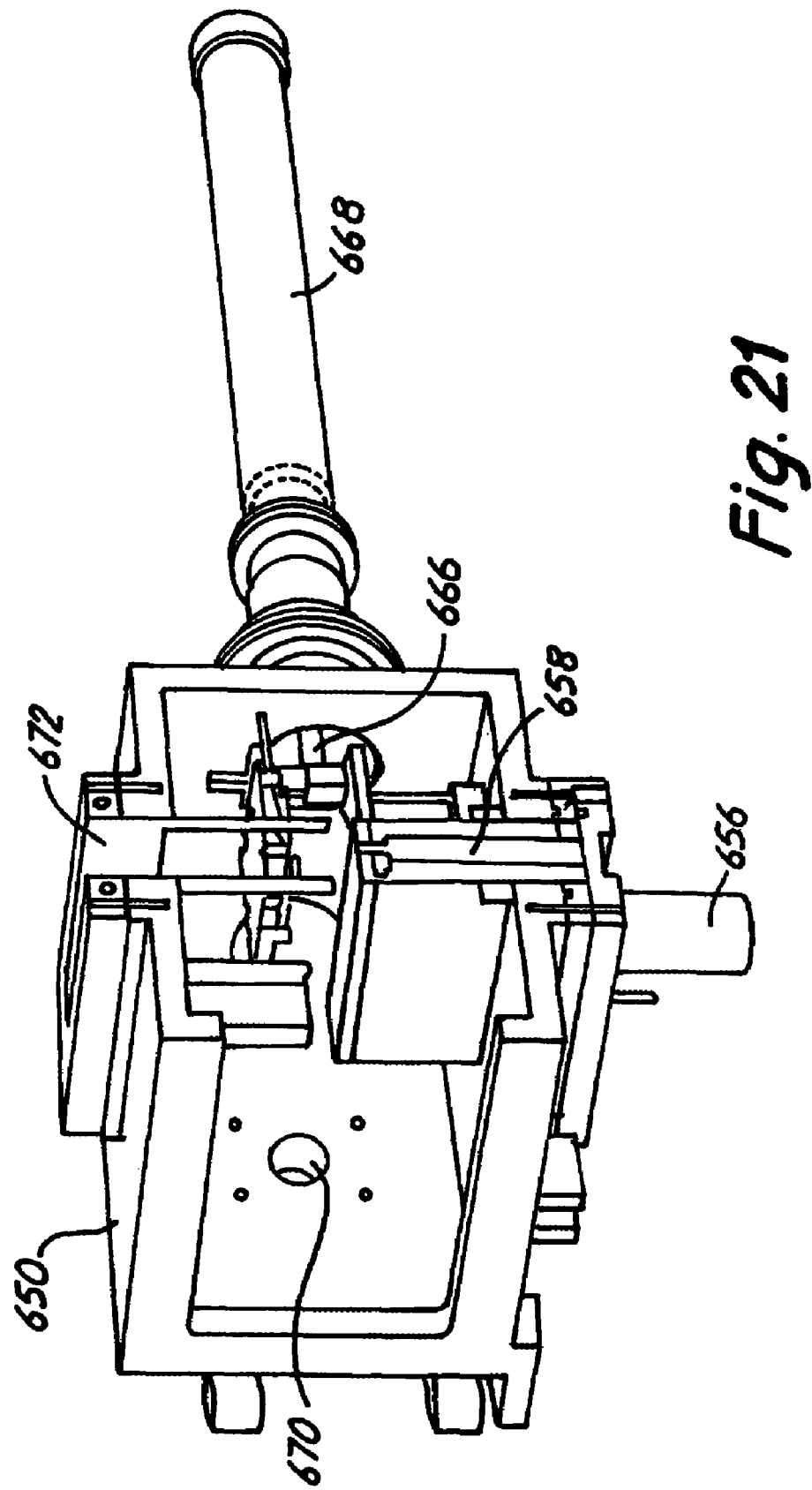
FIG. 21 is an expanded view of the reaction chamber of the light reactive deposition chamber of FIG. 20.
Figure 22:
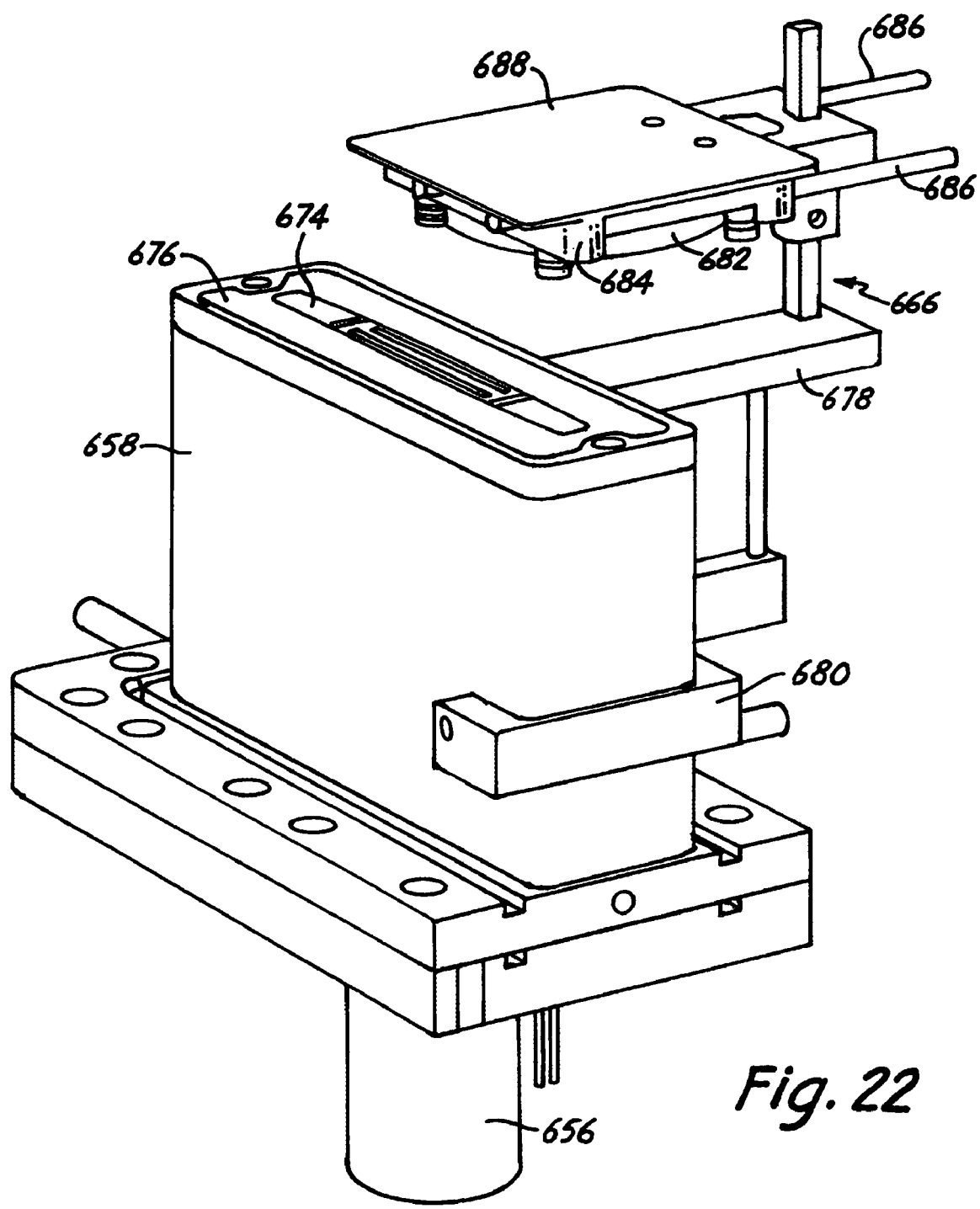
FIG. 22 is an expanded view of the substrate support of the reaction chamber of FIG. 21.

A particular embodiment of a light reactive deposition apparatus is shown in FIGS. 20-22. Referring to FIG. 20, process chamber 650 comprises a light tube 652 connected to a $CO_2$ laser (not shown) and a light tube 654 connected to a beam dump. An inlet conduit 656 connects with a precursor delivery system that delivers vapor reactants and carrier gases. Inlet conduit 656 leads to process nozzle 658. An exhaust tube 660 connects to process chamber 650 along the flow direction from process nozzle 658. Exhaust tube 660 leads to a particle filtration chamber 662. Particle filtration chamber 662 connects to a pump at pump connector 664.

An expanded view of process chamber 650 is shown in FIG. 21. A wafer carrier 666 supports a wafer above process nozzle 658. Wafer carrier 666 is connected with an arm 668, which translates the wafer carrier to move the wafer through the particle stream emanating from the reaction zone where the laser beam intersects the precursor stream from process nozzle 658. Arm 668 comprises a linear translator that is shielded with a tube. A laser entry port 670 is used to direct a laser beam between process nozzle 658 and the wafer. Unobstructed flow from process nozzle would proceed directly to exhaust nozzle 672, which leads to particle transport tube 660.

An expanded view of wafer carrier 666 and process nozzle 658 is shown in FIG. 22. The end of process nozzle 658 has an opening for precursor delivery 674 and a shielding gas opening 676 around precursor opening to confine the spread of precursor and product particles. Wafer carrier 666 comprises a support 678 that connects to process nozzle 658 with a bracket 680. A circular wafer 682 is held in a mount 684 such that wafer 682 slides within mount 684 along tracks 686 to move wafer 682 into the flow from the reaction zone. Backside shield 688 prevents uncontrolled deposition of particles on the back of wafer 682. Tracks 686 connect to arm 668.

For any of the coating configurations, the intersection of the flow with the substrate deflects the trajectory of the flow. Thus, it may be desirable to alter the position of the reaction chamber outlet to account for the change in direction of the flow due to the substrate. For example, it may be desirable to alter the chamber design to direct the reflected flow to the outlet and/or to change the position of the outlet accordingly.

The temperature of the substrate during the deposition process can be adjusted to achieve particular objectives. For example, the substrate can be cooled during the deposition process since a relatively cool substrate can attract the particles to its surface. However, in some embodiments, the substrate is heated, for example to about 500° C., during the deposition process. Particles stick better to a heated substrate. In addition, the particles tend to compact and fuse on a heated substrate such that a subsequent consolidation of the coating into a fused glass or other material is facilitated if the coating were formed initially on a heated substrate.

The formation of coatings by light reactive deposition, silicon glass deposition and optical devices in general are described further in copending and commonly assigned U.S. patent application Ser. No. 09/715,935 to Bi et al., entitled "Coating Formation By Reactive Deposition," incorporated herein by reference, and in copending and commonly assigned PCT application designating the U.S. serial number PCT/US01/32413 to Bi et al. filed on Oct. 16, 2001, entitled "Coating Formation By Reactive Deposition," incorporated herein by reference.

The well-defined reactant stream as a sheet of flow leading into the reaction zone tends to spread after the reaction zone due to heat from the reaction. If the substrate is swept through the reaction zone near the reaction zone, the spreading of the flow may not be significant. In some embodiments, it may be desirable to sweep the substrate through the flow farther away from the reaction zone such that the flow has spread significantly and the entire substrate or desired portion thereof can be coated simultaneously without moving the substrate. The appropriate distance to obtain a uniform coating of particles depends on the substrate size and the reaction conditions. A typical distance of about 15 centimeters would be suitable for a wafer with a 4-inch diameter.

In embodiments in which the entire substrate surface is simultaneously coated, when the composition of the product particle flow is changed in time during the deposition process, the composition of the particles changes through the thickness of the coating. If the composition is changed continuously, a continuous composition gradient through the layer results. For optical materials, generally a continuous composition gradient layer comprising a continuous composition change from a first composition to a second composition has a thickness of no more than about 300 microns, in other embodiments no more than about 150 microns, in further embodiments, in the range(s) from about 500 nm to about 100 microns and in still other embodiments in the range(s) from about 1 micron to about 50 microns. A person of ordinary skill in the art will recognize that other ranges and subranges within the explicit ranges are contemplated and are encompassed within the present disclosure.

Alternatively, the composition can be changed incrementally or discretely to produce layers with varying composition, which can involve a gradual change in composition between two compositions or discrete layers with discrete composition differences. The resulting transition material has a step-wise change in composition from a first composition to a second composition. Generally, the first composition and second composition are the compositions of the adjacent layers (or adjacent compositions on the same layer) such that the transition material provides a gradual transition in composition between the two adjacent layers (or adjacent compositions). While an optical transition material can have two layers, the transition material generally comprises at least three layers, in other embodiments at least 4 layers and in further embodiments in the range(s) from 5 layers to 100 layers. A person of ordinary skill in the art will recognize that additional range(s) within these specific ranges are contemplated and are within the present disclosure. The total thickness generally is similar to the continuous gradient layers described in the previous paragraph. Each layer within the step-wise transition material generally has a thickness less than about 100 microns, in other embodiments less than about 25 microns, in further embodiments in the range(s) from about 500 nm to about 20 microns and in additional embodiments in the range(s) from about 1 micron to about 10 microns. The layers within the step-wise transition material may or may not have approximately equal thickness. Similarly, the step-wise change in composition may or may not take equivalent steps between layers of the transition material.

Before or after deposition of all of the desired layers, the coating can be heat processed to transform the coating from a layer of discrete particles into a continuous layer, as described further below. The consolidated coatings can be used for optical materials or for other functions. To form devices, generally particular compositions are localized at particular locations within the structure.

For the production of discrete optical devices or other structures on a substrate surface, the composition of the optical material generally can be different at different locations within the optical structure. To introduce the composition variation, the deposition process itself can be manipulated to produce specific structures. Alternatively, various patterning approaches can be used following the deposition. Patterning following deposition of one or more coating layers is described further below.

Using the deposition approaches described herein, the composition of product particles deposited on the substrate can be changed during the deposition process to deposit particles with a particular composition at selected locations on the substrate to vary the resulting composition of the optical material along the x-y plane. For example, if the product particle compositions are changed while sweeping the substrate through the product particle stream, stripes or grids can be formed on the substrate surface with different particle compositions in different stripes or grid locations. Using light reactive deposition, the product composition can be varied by adjusting the reactants that react to form the product particle or by varying the reaction conditions. The reaction conditions can affect the resulting composition and/or properties of product particles. For example, the reaction chamber pressure, flow rates, radiation intensity, radiation energy/wavelength, concentration of inert diluent gas in the reaction stream, temperature of the reactant flow can affect the composition and other properties of the product particles.

In some embodiments, the reactant flow can comprise vapor and/or aerosol reactants, which can be varied to alter the composition of the products. In particular, dopant/additive concentrations can be changed by varying the composition and/or quantity of dopant/additive elements in the flow. It can be advantageous to deliver the host precursors, such as silicon precursors, boron precursors and/or phosphorous precursors, as vapor reactants since very high purity vapor precursors are available while dopant/additive precursors are delivered as an aerosol since many desirable dopant/additive elements are not easily delivered as vapor precursors. The delivery of vapor precursors and aerosol precursors are described further above.

While product particle composition changes can be introduced by changing the reactant flow composition or the reaction conditions while sweeping a substrate through the product stream, it may be desirable, especially when more significant compositional changes are imposed to stop the deposition between the different deposition steps involving the different compositions. For example, to coat one portion of a substrate with a first composition and the remaining portions with another composition, the substrate can be swept through the product stream to deposit the first composition to a specified point at which the deposition is terminated. The substrate is then translated the remaining distance without any coating being performed. The composition of the product is then changed, by changing the reactant flow or reaction conditions, and the substrate is swept, after a short period of time for the product flow to stabilize, in the opposite direction to coat the second composition in a complementary pattern to the first composition. A small gap can be left between the coatings of the first composition and the second composition to reduce the presence of a boundary zone with a mixed composition. The small gap can fill in during the consolidation step to form a smooth surface with a relatively sharp boundary between the two materials.

The deposition process can be generalized for the deposition of more than two compositions and/or more elaborate patterns on the substrate. In more elaborate processes, a shutter can be used to block deposition while the product flow is stabilized and/or while the substrate is being positioned. A precision controlled stage/conveyor can precisely position and sweep the substrate for the deposition of a particular composition. The shutter can be rapidly opened and closed to control the deposition. Gaps may or may not be used to slightly space the different location of the compositions within the pattern.

In other embodiments, a discrete mask is used to control the deposition of particles. A discrete mask can provide an efficient and precise approach for the patterning of particles. With chemical vapor deposition and physical vapor deposition, a layer of material is built up from an atomic or molecular level, which involves binding of the mask at an atomic or molecular level to prevent migration of the material being deposited under the mask to blocked regions. Thus, the coated masks are a coating on the surface without an independent, self-supporting structure corresponding to the mask, and the coated mask is chemically or physically bonded to the surface with atomic level contact along the coated mask. In contrast, with particle deposition as described herein, the particles generally can be at least macromolecular in size with diameters of about 3 nanometers (nm) or more such that a mask with a flat surface placed against another flat surface provides sufficient contact to prevent significant particle migration past the mask. While coated masks can be effectively used in light reactive deposition, physical masks provide an efficient alternative to coated masks for patterning a surface. The discrete masks have an intact self-supporting structure that is not bonded to the surface such that the mask can be removed intact from the surface that is coated. Therefore, the discrete mask approach herein is different from previous masking approaches adapted from photolithography for vapor deposition approaches.

In these embodiments, the formation of the particle coating correspondingly involves directing a product particle stream at the substrate shielded with the discrete mask. The discrete mask has a surface, generally a planar surface, with openings at selected locations. The discrete mask blocks the surface except at the openings such that particles can deposit on the surface through the openings. Thus, the mask provides for patterning compositions on the surface by the selected placement of the openings. In some embodiments, suitable discrete masks comprise a mask with a slit that is narrower than the product particle flow such that the deposition process can be very precisely controlled. Movement of the slit can form a desired, precisely controlled pattern with one or more compositions. After use of a discrete mask, it can be removed and reused.

In some embodiments, a plurality of masks can be used to deposit particles along a single layer. For example, following deposition of a pattern through a first mask, a second complementary mask can be used to deposit material over at least a portion of the surface left uncovered during deposition with the first mask. Further complementary masks can be used to form complex patterns while completing a single layer or portion thereof with a coating having varying chemical composition over the layer.

Thus, using light reactive deposition, a range of effective approaches are available to vary the chemical composition of optical materials within layers and in different layers to form three-dimensional optical structures with selected compositions are selected locations within the material. The patterning of compositions of optical materials during the deposition process is described further in copending and commonly assigned U.S. patent application Ser. No. 10/027, 906 to Bi et al., entitled "Three Dimensional Engineering of Optical Structures," incorporated herein by reference.

As described in detail above, laser pyrolysis apparatuses and corresponding light reactive deposition apparatuses have been designed for the production of commercial quantities of nanoscale powders and powder arrays. Alternatively or in addition, the invention provides that the rate of production and/or deposition of the particles can be varied substantially, depending on a number of factors (e.g., the starting materials being utilized, the desired reaction product, the reaction conditions, the deposition efficiency, and the like, and suitable combinations thereof). Thus, in one embodiment, the rate of particle production can vary in the range(s) from about 5 grams per hour of reaction product to about 10 kilograms per hour of desired reaction product. Specifically, using apparatuses described herein, coating can be accomplished at particle production rates of up to at least about 10 kilograms per hour (kg/hr), in other embodiments at least about 1 kg/hr, in further embodiments with lower production rates at least about 25 grams per hour (g/hr) and in additional embodiments at least about 5 g/hr. A person of ordinary skill in the art will recognize that production rates intermediate between these explicit production rates are contemplated and are within the present disclosure. Exemplary rates of particle production (in units of grams produced per hour) include not less than about 5, 10, 50, 100, 250, 500, 1000, 2500, 5000, or 10000.

Not all of the particles generated are deposited on the substrate. In general the deposition efficiency depends on the relative speed of the substrate through the product stream with the particles, for embodiments based on moving the substrate through a sheet of product particles. At moderate relative rates of substrate motion, coating efficiencies of not less than about 15 to about 20 percent have been achieved, i.e. about 15 to about 20 percent of the produced particles are deposited on the substrate surface. Routine optimization can increase this deposition efficiency further. At slower relative motion of the substrate through the product particle stream, deposition efficiencies of at least about 40% have been achieved. In some embodiments, the rates of particle production are such that at least about 5 grams per hour, or alternatively or in addition, at least about 25 grams per hour, of reaction product are deposited on the substrate. In general, with the achievable particle production rates and deposition efficiencies, deposition rates can be obtained of at least about 5 g/hr, in other embodiments at least about 25 g/hr, in further embodiments at least from about 100 g/hr to about 5 kg/hr and in still other embodiment from about 250 g/hr to about 2.5 kg/hr. A person of ordinary skill in the art will recognize that deposition rates between these explicit rates are contemplated and are within the present disclosure. Exemplary rates of particle deposition (in units of grams deposited per hour) include not less than about 5, 10, 25, 50, 100, 250, 500, 1000, 2500, or 5000.

Alternatively or in addition, the invention provides that the rate of the movement of the substrate and the particle flow relative to each other can vary substantially, depending on the desired specifications for the coated substrate. Thus, in one embodiment, the rate can be measured on an absolute scale, and can vary in the range(s) from about 0.001 inches per second to about 12 inches per second, or even more. Further, in another embodiment, the rate can be measured on a scale relative to the substrate being coated, and can vary in the range(s) from about 1 substrate per minute to about 1 substrate per second.

For suitable wafer/substrate sizes, at least a substantial portion of the substrate surface can be coated with a sufficient thickness to form a consolidated material at a rate of 2 microns per minute, in other embodiments, at least about 5 microns per minute, in some embodiments at least about 20 microns per minute, and in further embodiments at least about 100 microns per minute, in which the thickness refers to a powder array sufficiently thick to form a consolidated material at the specified thickness. A person or ordinary skill in the art will recognize that additional ranges within these explicit ranges are contemplated and are within the present disclosure.

For appropriate embodiments using a sheet of product particles, the rate of substrate motion generally is a function of the selected deposition rate and the desired coating thickness as limited by the ability to move the substrate at the desired rate while obtaining desired coating uniformity. Due to the high deposition rates achievable with light reactive deposition, extremely fast coating rates are easily achievable. These coating rates by LRD are dramatically faster than rates that are achievable by competing methods. In particular, at particle production rates of about 10 kg/hr, an eight-inch wafer can be coated with a thickness of about 10 microns of powder in approximately one second even at a deposition efficiency of only about 2.5 percent, assuming a powder density of about 10% of the bulk density. A person of ordinary skill in the art can calculate with simple geometric principles any one of the following variables based on one or more of the other variables from the group of a coating rate, the deposition rate, the desired thickness and the density of powder on the substrate.

In particular, apparatus designs based on an actuator arm moving a substrate through the product particle stream within a reaction chamber, as described herein, can straightforwardly move a substrate at rates to coat an entire eight-inch wafer in about 1 second or less. Generally, in embodiments of particular interest that take advantage of the rapid rates achievable, substrates are coated at rates of at least about 0.1 centimeters per second (cm/s), in additional embodiments at least about 0.5 cm/s, in other embodiments at least about 1 cm/s, in further embodiments from about 2 cm/s to about 30 cm/s, and in other embodiments from about 5 cm/s to about 30 cm/s. A person of ordinary skill in the art will recognize that coating rates intermediate between these explicit rates are contemplated and are within the present disclosure.

Particle and Particle Coating Properties

Laser pyrolysis/light reactive deposition is particularly suitable for the formation of highly uniform particles, especially nanoscale particles. The particles can be collected for further processing, or the particles can be directly deposited onto a substrate to form a particle coating. Small particle size, spherical morphology and particle uniformity can contribute overall to the uniformity of the resulting coating, for example, with respect to composition as well as the smoothness of the surface and interfaces between materials. In particular, the lack of particles significantly larger than the average leads to a more uniform coating.

A collection of particles of interest generally has an average diameter for the primary particles in the range(s) of less than about 1000 nm, in most embodiments in the range(s) less than about 500 nm, in other embodiments in the range(s) from about 2 nm to about 100 nm, in some embodiments from about 2 nm to about 95 nm, in further embodiments from about 5 nm to about 75 nm, and still other embodiments from about 5 nm to about 50 nm. A person of ordinary skill in the art will recognize that other average diameter ranges within these specific ranges are also contemplated and are within the present disclosure. Particle diameters generally are evaluated by transmission electron microscopy. Diameter measurements on particles with asymmetries are based on an average of length measurements along the principle axes of the particle. In general, a collection of particles, as described herein, has substantially primary particles that are not fused, although they can be attracted by electrostatic forces, as described below. Powder arrays, which maintain characteristics of the primary particles, are described further above and below.

The primary particles usually have a roughly spherical gross appearance. Upon closer examination, crystalline particles generally have facets corresponding to the underlying crystal lattice. Nevertheless, crystalline primary particles tend to exhibit growth in laser pyrolysis that is roughly equal in the three physical dimensions to give a gross spherical appearance. Amorphous particles generally have an even more spherical aspect. In some embodiments, 95 percent of the primary particles, and in some embodiments 99 percent, have ratios of the dimension along the major axis to the dimension along the minor axis less than about 2.

A variety of chemical particles, generally solid particles, can be produced by the methods described herein. Solid particles generally are deposited as powders. For some applications, it is desirable to have very uniform particles. Processes using focused radiation are particularly suitable for the formation of highly uniform particles, especially nanoscale particles. In laser pyrolysis, the collector generally is placed a sufficient distance from the reaction zone such that the particles are well quenched when they reach the collector. If the reaction conditions are controlled appropriately, the primary particles are quenched such that they are formed as independent primary particles with no hard fusing, i.e., non-dispersable fusing, to other primary particles.

Because of their small size, the primary particles tend to form loose agglomerates, following collection, due to van der Waals and other electromagnetic forces between nearby particles. These agglomerates can be dispersed to a significant degree or essentially completely, if desired. Even though the particles form loose agglomerates, the nanometer scale of the primary particles is clearly observable in transmission electron micrographs of the particles. The particles generally have a surface area corresponding to particles on a nanometer scale as observed in the micrographs. Furthermore, the particles can manifest unique properties due to their small size and large surface area per weight of material. For example, vanadium oxide nanoparticles can exhibit surprisingly high energy densities in lithium batteries, as described in U.S. Pat. No. 5,952,125 to Bi et al., entitled "Batteries With Electroactive Nanoparticles," incorporated herein by reference.

The primary particles can have a high degree of uniformity in size. Laser pyrolysis, as described above, generally results in particles having a very narrow range of particle diameters. Furthermore, heat processing under suitably mild conditions does not alter the very narrow range of particle diameters. With aerosol delivery of reactants for laser pyrolysis, the distribution of particle diameters is particularly sensitive to the reaction conditions. Nevertheless, if the reaction conditions are properly controlled, a very narrow distribution of particle diameters can be obtained with an aerosol delivery system. As determined from examination of transmission electron micrographs, the primary particles generally have a distribution in sizes such that in the range(s) of at least about 95 percent, and in some embodiments 99 percent, of the primary particles have a diameter greater than about 40 percent of the average diameter and less than about 225 percent of the average diameter. In alternative or additional embodiments, the primary particles have a distribution of diameters such that in the range(s) of at least about 95 percent, and in further embodiments 99 percent, of the primary particles have a diameter greater than about 45 percent of the average diameter and less than about 200 percent of the average diameter. A person of ordinary skill in the art will recognize that other ranges within these explicit ranges are contemplated and are within the present disclosure.

Furthermore, in some embodiments no primary particles have an average diameter in the range(s) of greater than about 5 times the average diameter and in further embodiments 4 times the average diameter, and in additional embodiments 3 times the average diameter. A person of ordinary skill in the art will recognize that other ranges of distribution cut-offs within these explicit ranges are contemplated and are within the present disclosure. In other words, the particle size distribution effectively does not have a tail indicative of a small number of particles with significantly larger sizes relative to the average size. This cut-off in the particle size distribution is a result of the small reaction zone and corresponding rapid quench of the particles. An effective cut off in the tail of the size distribution indicates that there are less than about 1 particle in $10^6$ have a diameter greater than a specified cut off value above the average diameter. Narrow size distributions, lack of a tail in the distributions and the roughly spherical morphology can be exploited in a variety of applications.

In addition, the nanoparticles generally have a very high purity level. Furthermore, crystalline nanoparticles produced by laser pyrolysis can have a high degree of crystallinity. Certain impurities on the surface of the particles may be removed by heating the particles to temperatures below their sintering temperatures to achieve not only high crystalline purity but high purity overall.

When collecting the particles directly onto a substrate surface, the distance from the substrate to the reaction zone and the temperature of the substrate can be adjusted to control the character of the deposit on the substrate surface. The particles on the surface form a particle array. The particle array can be in the form of independent primary particles randomly stacked on the surface. The array of primary particles may only be held together by electromagnetic forces between adjacent and nearby particles. In some embodiments, it may be desirable to form a particle array with some degree of hard fusing between primary particles. Fusing between primary particles can be achieved by placing the substrate closer to the reaction zone such that the particles are not fully quenched when they strike the substrate surface and/or by heating the substrate. Even if the primary particles are hard fused, the resulting particle array maintains character due to the nanoscale, i.e., submicron scale, of the primary particles. In particular, primary particles may be visible in scanning electron micrographs. In addition, channels between the fused particles will reflect the nanoscale of the surrounding fused particles, e.g., by having nanoscale diameter channels extending into the powder array. Thus, the nanoscale character of the primary particles is built into the resulting powder array formed from the nanoscale primary particles.

While nanoscale particles can in principle pack densely on a surface due to their small size, the particles tend to coat a surface as a loose array due to electrostatic forces between the particles. The relative or apparent density of the powder array can depend on the particle size, particle composition and the deposition conditions, which may affect particle fusing as well as the forces between the particles and with the surface. The relative density is evaluated relative to the fully densified material of the same composition. In general, the relative density for the powder array formed from nanoscale particles is in the range(s) of less than about 0.6, in other embodiments in the range(s) from about 0.02 to about 0.55 and in further embodiments in the range(s) from about 0.05 to about 0.4. A person of ordinary skill in the art will recognize that additional ranges within these specific ranges are contemplated and are within the present disclosure.

To obtain particular objectives, the features of a coating can be varied with respect to composition of layers of the powders as well as location of materials on the substrate. Generally, to form an optical device the uniform optical material can be localized to a particular location on the substrate. In addition, multiple layers of particles can be deposited in a controlled fashion to form layers with different compositions and/or optical properties. Similarly, the coating can be made a uniform thickness, or different portions of the substrate can be coated with different thicknesses of particles. Different coating thicknesses can be applied such as by varying the sweep speed of the substrate relative to the particle nozzle, by making multiple sweeps of portions of the substrate that receive a thicker particle coating or by patterning the layer, for example, with a mask. Approaches for the selective deposition of particles are described above.

Thus, layers of materials, as described herein, may comprise particular layers that do not have the same planar extent as other layers. Thus, some layers may cover the entire substrate surface or a large fraction thereof while other layers cover a smaller fraction of the substrate surface. In this way, the layers can form one or more localized devices. At any particular point along the planar substrate, a sectional view through the structures may reveal a different number of identifiable layers than at other point along the surface. Generally, for optical applications, the particle coatings have a thickness in the range(s) of less than about 500 microns, in other embodiments, in the range less than about 250 microns, in additional embodiments in the range(s) from about 50 nanometers to about 100 microns and in further embodiments in the range(s) from about 100 nanometers to about 50 microns. A person of ordinary skill in the art will recognize that additional range(s) within these explicit ranges and subranges are contemplated and are encompassed within the present disclosure.

Doping of Powder Arrays

While the materials can be doped during deposition by appropriately introducing dopants/additives into the reactant stream for particle production, alternatively or additionally, the powder array can be doped following formation of the powder array. Due to the nanoscale of the primary particles incorporated into the powder array, the powder array has a large surface area that facilitates incorporation of the dopant/additive into the host material during subsequent consolidation. The dopant/additive can be applied to the powder array within the reaction chamber or following removal from the reaction/coating chamber. If the dopant/additive is applied to the powder array following removal of the coated substrate from the reaction chamber, the dopant/additive can be applied to powder array directly or using electro-migration deposition. In these doping approaches, the powder array can be partly consolidated prior to initiating the doping process to stabilize the array, generally without removing all of the nanostructured character of the array.

Generally, the dopant/additive is applied as a composition comprising the desired dopant/additive. Any remaining elements in the dopant/additive compositions generally would volatilize during the consolidation process. For example, metal/metalloid nitrates when consolidated can involve the incorporation of the metal/metalloid element into the host as a dopant/additive and the removal of nitrogen oxides to remove the counter-ions of the dopant/additive composition. The dopant/additive composition can be applied to the powder array as a solution, an aerosol, and/or as a powder. In general, the use of a solution can facilitate the even spread of the dopant/additive element through the powder array by the flow of the solution over and into the powder array. The concentration of a solution can be selected to contribute to more even distribution of the dopant/additive at desired dopant/additive levels through the use of a volume of liquid that appropriately wets the powder array. Surfactants and/or choice of solvent can be used to reduce surface tension and facilitate even spread of the dopants/additives. The solvent can be evaporated prior to or during the consolidation of the powder array. Any surfactants can be selected to volatize during the consolidation step.

The reactant delivery system can be used to apply a dopant/additive to a powder array within a reaction chamber. In particular, the dopant/additive can be applied within the coating apparatus by spraying the dopant/additive composition through the reactant inlet such that the dopant/additive composition is applied to all or selected portions of the substrate. The dopant/additive composition can be applied, for example, as an aerosol using an aerosol delivery system. The radiation beam can be either turned off during spraying of the dopant/additive composition or turned to a very low power to evaporate a portion of the solvent without reacting the dopant/additive composition. The reactant delivery systems described above can be adapted for the delivery of the unreacted dopant/additive composition. The coating process can be used to apply an approximately even coating onto the powder array, e.g., by sweeping the substrate through a dopant/additive stream at a constant rate.

Alternatively, the dopant/additive can be applied to the powder array following removal of the powder array from the reaction/coating chamber. The dopant/additive can be applied, generally as a composition, as a liquid, aerosol and/or a powder, to the powder array, for example, by spraying, brushing, dipping or the like. As with solutions applied within the reaction chamber, the concentration and other properties of the solution can be selected to obtain even distribution of the dopant/additive within the consolidated material. Dip coating of the powder array can be a convenient approach for obtaining uniform distribution of dopant/additive over the powder array.

Rather than allowing natural migration of the dopant/additive composition over and through the powder array, an electric field can be used to drive ions of the dopant/additive elements into the host matrix. Specifically, dopants/additives can be introduced into material using electrophoretic or electro-migration deposition. In this approach, an electric field is used to drive dopant/additive ions into the host matrix of the powder array. A solution containing the host ions is contacted with the powder array. Generally, an electrode is placed adjacent the substrate opposite the powder array while a counter electrode is placed within the solution. More than one electrode of each type can be used, if desired. If the dopant/additive ions are cations, the anode is placed in the solution and the cathode is placed adjacent the substrate. The cations are driven toward the cathode. Since the powder array is located between the cathode and the solution, the ions are driven into the powder array.

Figure 23:
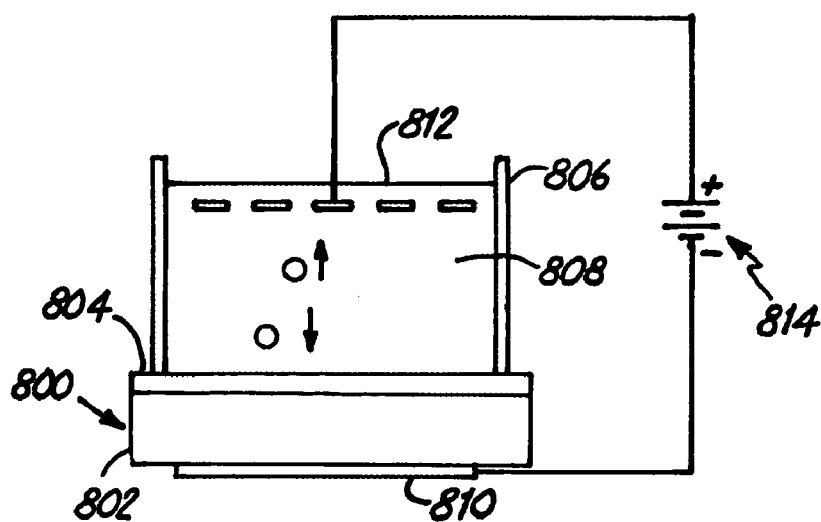
FIG. 23 is a sectional side view of an apparatus for introducing dopants/additives by electro-migration deposition.

An embodiment of an apparatus for performing electro-migration deposition of dopant/additive ions into a powder array is shown in FIG. 23. Coated substrate 800 includes substrate 802 and powder array 804. Barriers 806 are used to confine dopant/additive solution 808 in contact with powder array 804. First electrode 810 is placed adjacent substrate 802 while second electrode 812 is placed within solution 808. Electrodes 810 and 812 are connected to an appropriate power source 814, such as a battery or an adjustable power supply connected to line voltage, to apply the electric current/field between the electrodes.

Parameters affecting the electro-migration process include, for example, current density, solution concentration, and doping time. The current can be applied in constant field or in pulses. These parameters can be adjusted to select the deposition rate, dopant/additive concentration within the powder array, dopant/additive depth profile, and uniformity of the doping. Due to the nanostructuring of the powder array, less clustering of the dopants/additives can be expected following the electro-migration deposition. In addition, multiple dopants/additives can be simultaneously or sequentially introduced into the powder array by electro-migration deposition. Multiple dopants/additives can be simultaneously introduced by including multiple dopant/additive ions within the solution with concentrations appropriately selected to yield desired dopant/additive levels. Similarly, multiple dopants/additives can be introduced sequentially by changing solutions following deposition of a first dopant/additive.

Figure 24:
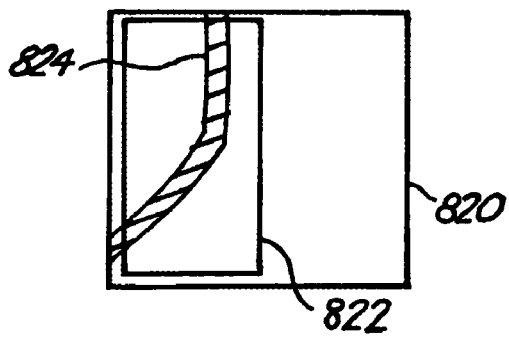
FIG. 24 is a top view of a device configured for electro-migration deposition over a portion of a substrate.

The dopant/additive can be introduced into a selected portion of the powder array by selectively contacting the solution with only a portion of the powder array using the solution barriers. Alternatively or additionally, a portion of the powder array can be covered with a mask, such as conventional resist used in electronic processing, to block migration of the dopants/additives into the masked regions. Referring to an example in FIG. 24, coated substrate 820 is in contact with barrier 822 confining a dopant/additive solution to a portion of the coated substrate. Furthermore, a portion of coated substrate 820 is covered with a mask 824. In this embodiment, the powder array is doped in un-masked portions in contact with the dopant/additive solution. Masking generally is selected to form desired devices following consolidation of the layers into a uniform material. Multiple dopants/additives can be sequentially applied to the same and/or different, although optionally overlapping, portions of a coated substrate by altering the masking between electro-migration deposition of the different dopants/additives.

In further embodiments, a composition comprising the desired dopant/additive is reacted separately in the reaction chamber for coating onto a powder array. Thus, a separate layer of dopant/additive powder can be deposited on top of a host powder. As a particular example, if the host powder is a metal/metalloid oxide, a dopant/additive powder of a dopant/additive metal/metalloid oxide can be formed as a separate powder array on top of the host powder array. Upon consolidation, the materials fuse into a uniform composition that can have approximately uniform distribution of dopant/additive through the material. The amount of dopant/additive powder can be selected to yield the desired dopant/additive levels. The coating processes can be repeated to form layers of host powder array (H) and dopant/additive powder array (D) in desired proportions—HDHDHD . . . or alternatively HDHDH . . . , with dopant/additive layers always surrounded by host layers. Of course, in forming a single host or dopant/additive layer in some embodiments, multiple coating passes can be used in the coating apparatus with each pass involving a sweep of a substrate through the reactant/product stream. The number of alternating layers can be selected to yield the desired total thickness and dopant/additive distribution. In particular, thinner host layers and corresponding dopant/additive layers may result in a more uniform distribution of dopant/additive within the final consolidated material. In general, the alternating layers comprise at least one host layer and one dopant/additive layer and in some embodiments less than about 50 host layers and less than about 50 dopant/additive layers and in further embodiment in the range(s) from 3 host layers and 2 dopant/additive layers to less than about 25 host layers and less than about 25 dopant/additive layers. A person of ordinary skill in the art will recognize that other ranges within these explicit ranges are contemplated and are within the present disclosure.

In general, the various doping approaches can be combined for the introduction of one or more than one dopant/additive element into a powder array and the ultimate consolidated material. In particular, a method for introducing dopants/additives during formation of a powder array and methods for introducing dopants/additives following deposition of a powder array are described above. For example, a particular dopant/additive can be introduced using a plurality of techniques to achieve desired dopant/additive levels and/or dopant/additive distributions within the consolidated material. In addition, for the deposition of a plurality of dopants/additives, each dopant/additive can be deposited using one or more of the techniques described above, for convenience of processing and/or to achieve desired properties of the resulting consolidated materials.

Consolidation to Form Optical Materials

Heat treatment can sinter the particles and lead to compaction, i.e., densification, of the powders to form the desired material, such as an optical material. This sintering of the particles is generally referred to as consolidation. The densified material is generally a uniform material, i.e., it is generally not a porous network, although there can be random imperfections in the uniformity of the material. To consolidate, i.e., density, the optical materials, the materials can be heated to a temperature above the melting point for crystalline materials or the flow temperature for amorphous materials, e.g., above the glass transition temperature and possibly above the softening point below which a glass is self-supporting, to consolidate the coating into a densified material. Consolidation can be used to form amorphous, crystalline or polycrystalline phases in layers. In general, consolidation can be performed before or after patterning of a layer. A preliminary heat treatment can be applied with the reactor flame to reduce dopant/additive migration during the consolidation process and to partly densify the material. Using the techniques described herein, doped glasses can be formulated into planar optical devices.

Generally, the heating is performed under conditions to lower the viscosity of the material to promote flow. To form the viscous liquid, crystalline particles are heated above their melting point and amorphous particles are heated above their glass transition temperature. Because of the high viscosity, the material generally does not flow significantly on the substrate surface, although small gaps may fill in. Processing at higher temperatures to reduce the viscosity of the melt can result in undesirable melting of the substrate, migration of compositions between layers or in flow from a selected area of the substrate. The heating and quenching times can be adjusted to change the properties of the consolidated coatings, such as density. While the final consolidated material may be uniform, the density of the material may vary slightly depending on the processing conditions. In addition, heat treatment can remove undesirable impurities and/or change the stoichiometry and crystal structure of the material.

Following deposition of the powder layer, the precursors can be shut off such that the reactant stream only comprises a fuel and an oxygen source that reacts to form gaseous/vapor products without particles. The flame resulting from the reaction of the fuel and oxygen source can be used to heat the coated substrate without depositing any additional materials on the substrate. Such a heating step is observed to reduce dopant/additive migration upon full consolidation of a doped silica glass. A flame heating step can be perform between coating steps for several layers or after deposition of several layer, in which each coating layer may or may not have the same composition as other layers. Generally, after a desired number of layers or quantity of material is deposited, a final consolidating heat treatment is performed to fully consolidate the material. In forming a coating with a uniform composition, one or more layers of particles with the same composition can be deposited. All of the layers can be deposited prior to any consolidation or partial consolidation, e.g., with a flame, or complete or partial consolidation can be performed after each layer or subset of layers formed with particles having the same composition. After final consolidation, a layer formed with particles of a uniform composition can have some variation in dopant/additive concentrations through the thickness of the material due to migration of dopants/additives during the consolidation process.

Suitable processing temperatures and times generally depend on the composition of the particles. Small particles on the nanometer scale generally can be processed at lower temperatures and/or for shorter times relative to powders with larger particles due to lower melting points for the nanoparticles in comparison with bulk material. However, it may be desirable to use a comparable melting temperature to obtain greater surface smoothness from improved melting of the nanoparticles.

For the processing of silicon oxide nanoparticles, the particle coatings can be heated to a temperature from about 800° C. to 1700° C., although with silicon substrates the upper limit is about 1350° C. Higher temperatures can be reached with appropriate ceramic substrates. Dopants/additives in the silicon oxide particles can lower the appropriate consolidation temperatures. Thus, the dopant/additive can be selected to flow into a uniform optical material at a lower temperature. Suitable dopants/additives to lower the flow temperature when placed into silicon oxide ($SiO_2$) include, for example, boron, phosphorous, germanium, fluorine, germanium, aluminum, and combinations thereof. The amount and composition of one or more dopants/additives can be selected to yield a desired flow temperature for consolidation and index-of-refraction of the consolidated optical material.

Heat treatments can be performed in a suitable oven. It may be desirable to control the atmosphere in the oven with respect to pressure and/or the composition of the gases. Suitable ovens comprise, for example, an induction furnace or a tube furnace with gas flowing through the tube. The heat treatment can be performed following removal of the coated substrates from the coating chamber. In alternative embodiments, the heat treatment is integrated into the coating process such that the processing steps can be performed sequentially in the apparatus in an automated fashion.

For many applications, it is desirable to apply multiple particle coatings with different compositions. In general, these multiple particle coatings can be arranged adjacent to each other across the x-y plane of the substrate being coated (e.g., perpendicular to the direction of motion of the substrate relative to the product stream), or stacked one on top of the other across the z plane of the substrate being coated, or in any suitable combination of adjacent domains and stacked layers. Each coating can be applied to a desired thickness.

For optical applications in some embodiments, silicon oxide and doped silicon oxide can be deposited adjacent each other and/or in alternating layers. Similarly, distinct layers of silicon oxide with different dopants/additives can be deposited in alternating layers. Specifically, two layers with different compositions can be deposited with one on top of the other, and or additionally or alternatively, with one next to the other, such as layer A and layer B formed as AB. In other embodiments, more than two layers each with different compositions can be deposited, such as layer A, layer B and layer C deposited as three sequential (e.g., stacked one on top of the other, or adjacent to the other, or adjacent and stacked) layers ABC. Similarly, alternating sequences of layers with different compositions can be formed, such as ABABAB . . . or ABCABCABC . . . . Other combinations of layers can be formed as desired.

Individual uniform layers, each of a particular composition, generally have after consolidation an average thickness in the range(s) of less than 100 microns, in many embodiments in the range(s) from about 0.1 micron to about 50 microns, in other embodiments in the range(s) from about 0.2 microns to about 20 microns. A person of skill in the art will recognize that ranges within these specific ranges are contemplated and are within the scope of the present disclosure. Each uniform layer formed from particles with the same composition can be formed from one or more passes through a product flow in a light reactive deposition apparatus. Thickness is measured perpendicular to the projection plane in which the structure has a maximum surface area.

The material with multiple particle coatings can be heat treated after the deposition of each layer or following the deposition of multiple layers or some combination of the two approaches. The optimal processing order generally would depend on the melting point of the materials. Generally, however, it is desirable to heat treat and consolidate a plurality of layers simultaneously. Specifically, consolidating multiple layers simultaneously can reduce the time and complexity of the manufacturing process and, thus, reduce manufacturing costs. If the heating temperatures are picked at reasonable values, the melted materials remain sufficiently viscous that the layers do not merge undesirable amounts at the interface. Slight merging of the layers generally does not affect performance unacceptable amounts. By changing reaction conditions, such as precursor flow or total gas flow, particles can be deposited with changing particle size in the z-direction within a single layer or between layers. Thus, smaller particles can be deposited on top of larger particles. Since the smaller particles generally soften at lower temperatures, the consolidation of the upper layer can be less likely to damage the lower layers during the consolidation step. To form patterned structures following deposition, patterning approaches, such as lithography and photolithography, along with etching, such as chemical etching, dry etching or radiation-based etching, can be used to form desired patterns in one or more layers. This patterning generally is performed on a structure prior to deposition of additional material. Patterning can be performed on particle layers or consolidated layers.

Optical Structures

As noted above, the particles and consolidated materials have various applications including, for example, optical applications. In particular, the uniform materials formed after consolidation can be used in forming optical devices, such as fiber preforms and planar optical structures. The improved materials described herein can advantageously be incorporated into a variety of desirable optical devices, which can be incorporated into integrated optical and electro-optical structures. In particular, some dopants/additives introduce desirable functional properties while other dopants/additives improve processing for the formation of structures with a plurality of layers and/or other features. The approaches described above can be used to guide the deposition of structures with selected compositions and/or dopants/additives localized within selected portions of the structures.

Figure 25:
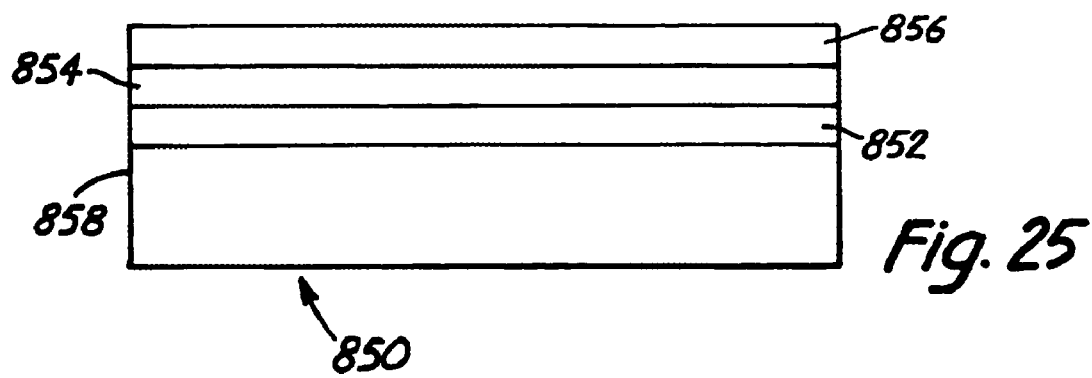
FIG. 25 is a side view of a structure with optical layers.

As an example of potential processing improvements, layered structures generally are formed with layers further away from the substrate having lower flow temperatures such that consolidation of upper layers do not remelt lower layers or, if consolidated together, do not lower the viscosity of lower layers excessively such that the materials flow more than desired. Having a greater ability to vary material compositions with respect to the host and any dopants/additives provides a corresponding greater ability to select a desired flow temperature for the processing of a layered structure. As a particular example, a layered structure is shown in FIG. 25. Optical structure 850 has optical layers 852, 854, 856 on substrate 858. Top layer 856 can include a fluorine dopant/additive to lower the flow temperature of the material. Fluorine dopants/additives are described further above. Layer 854, and possibly layer 852, can optionally also include a fluorine dopant/additive if other host and/or dopant/additive compositions are appropriately changed to adjust for processing temperatures. In addition, when forming monolithic structures built upon a substrate, different materials are generally applied in layers adjacent each other. Different materials have different coefficients of thermal expansion. During processing, the structures are generally heated and cooled to consolidate the materials. The host and dopant/additive compositions can similarly be selected to have compatible coefficients of thermal expansion to reduce stresses and any corresponding optical distortions.

Figure 26:
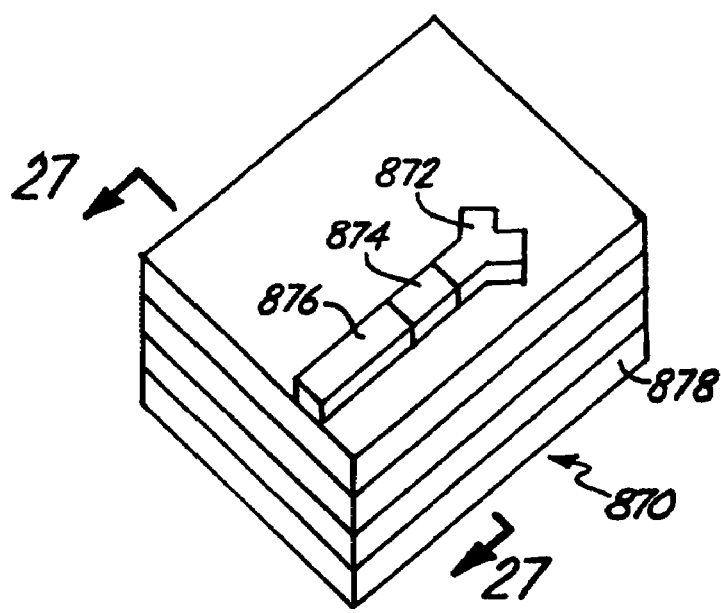
FIG. 26 is a perspective view of an optical circuit.
Figure 27:
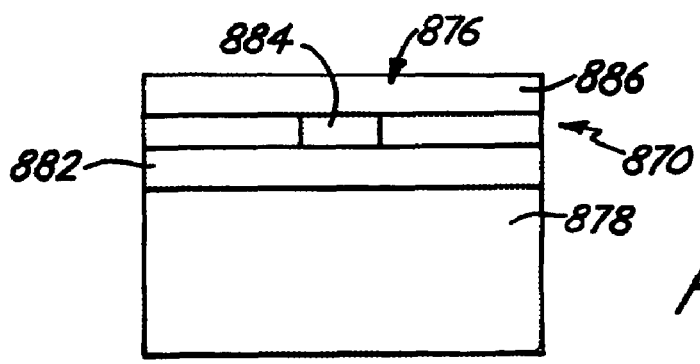
FIG. 27 is a sectional view of the optical circuit of FIG. 26 taken along line 27-27.

In general, light paths through optical fibers and planar optical devices take the form of waveguides that are a higher index-of-refraction material surrounded by a lower index-of-refraction cladding. As a representative example, an optical circuit on a substrate is shown schematically in FIGS. 26 and 27. As shown in FIG. 26, optical circuit 870 includes optical devices 872, 874, 876 on substrate 878. A sectional view including optical device 876 is shown in FIG. 27. Optical device 876 includes an undercladding optical material 882, a core optical material 884 and an overcladding optical material 886. In general, core optical material 884 can be different from undercladding optical material 882 and overcladding optical material 886 in any optical property, such as index-of-refraction, which may be the result of, for example, a compositional difference, a density difference, or a crystal structure difference. Undercladding optical material 882 may or may not be different from overcladding optical material 886 in composition and/or optical properties. Overcladding material 886 generally is located along two layers, a layer shared with the core optical material and an overlying layer.

Substrate 878 can be formed from silicon. Common substrates are round wafers, although substrates that are square or other shapes can be used. For the formation of preforms, it may be desirable to shape the substrate highly elongated in one dimension. The aspect ratio may range from about 1:5 to about 1:50, or in other embodiments from about 1:10 to about 1:25. A person of ordinary skill in the art will recognize that ranges and subranges within these explicit ranges are contemplated and are within the present disclosure. Similarly, for preforms it may be desirable to have coatings with dimensions that change as further coatings are added such that the final structure does not have a rectangular shape to facilitate pulling of the fiber from the preform.

Optical devices of interest comprise, for example, optical waveguide devices, such as optical couplers, splitters, arrayed waveguide grating (AWG) and the like. Waveguides manufactured on a substrate surface are referred to as planar waveguides. Planar waveguides are useful in the production of integrated optical circuits for optical communication and other opto-electronics applications. Other optical devices of interest comprise, for example, three dimensional optical memory device, Bragg grating, optical attenuator, optical splitter/coupler, optical filter, optical switch, laser, modulator, interconnect, optical isolator, optical add-drop multiplexer (OADM), optical amplifier, optical polarizer, optical circulator, phase shifter, optical mirror/reflector, optical phase-retarder, and optical detector.

Rare earth doped glasses are particularly suitable for use in the formation of optical amplifiers. The amplifier material is excited by a pump light signal transversely coupled to the optical material. The pump light can be tuned to excite the rare earth doped materials. An optical input passing through the optical material at a lower frequency than the pump signal is then amplified by stimulated emission. Thus, energy from the pump light is used to amplify the input light signal. $Cr^{+4}$ ions can also be used to form optical amplifiers. In addition, rare-earth ions can be used to improve pump efficiency as a pump sensitizer or to provide another pumping band for a rare-earth emitter. For example $Yb^{+3}$ can be a sensitizer for $Er^{+3}$, and $Ho^{+3}$ can provide a pump band for a $Tm^{+3}$ emitter.

Figure 28:
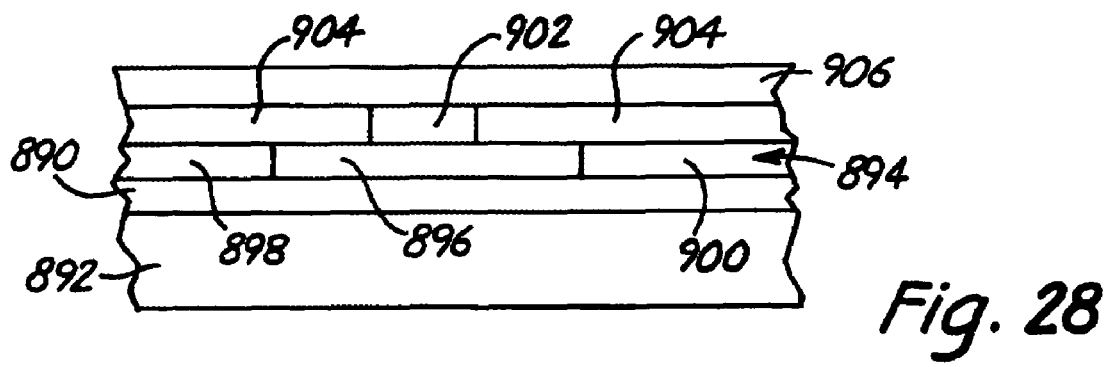
FIG. 28 is a side view of an optical amplifier.

A representative amplifier structure is shown in sectional FIG. 28. An under-cladding layer 890 is located on substrate 892. Core layer 894 includes an amplifier material 896 between waveguides 898, 900 along an optical pathway. Pump waveguide 902 is optically connected to amplifier material 896. Pump waveguide 902 is surrounded by cladding 904 in the same layer and connects to a pump light source. Over-cladding 906 can be placed over pump waveguide 902.

Improved ability to form complex optical compositions with selected hosts and dopants/additives can be used to introduce multiple functionalities to one or more materials within an optical structure. For example, amplification, UV/visible sensitivity and/or paramagnetic properties can be introduced. Amplification properties have been described above. UV/visible sensitivity can be introduced with, for example, $Ce^{+3}$, $Tb^{-3}$, $Eu^{+2}$, $Sn^{+2}$ and/or $Ge^{+4}$ dopants/additives. In particular, the index-of-refraction of UV/visible sensitive materials changes in a lasting way following exposure of the material to high-energy light, e.g., blue light or ultraviolet light. These changes in index-of-refraction can be used to form optical devices, such as waveguides and gratings, with a periodic index change introduced using an interference pattern of UV/visible light. Paramagnetic effects can be introduced with, for example, $Ce^{+3}$, $Tb^{+3}$, $Gd^{+3}$, $Yb^{+3}$ and/or $Dy^{+3}$ dopants/additives. Paramagnetic materials have an enhanced Faraday effect. The Faraday effect can be used for altering polarization of light, thereby affecting the transmission and reflection properties of the material. Specifically, the Faraday effect involves a rotation of plane-polarized light. This provides for the unidirectional propagation of light within a core waveguide. The magnitude of the Verdet constant and therefore the Faraday effect can be increased by enhancing the paramagnetism. An enhanced Faraday effect can be used to construct smaller optical devices, such as optical rotators and Faraday isolators Layered structures for optical fiber preforms and planar optical structures, including integrated planar optical structures, are described further in copending and commonly assigned PCT application designating the U.S. PCT/01/45762 to Bryan et al., entitled "Multilayered Optical Structures," incorporated herein by reference and copending and commonly assigned U.S. patent application Ser. No. 10/027,906 to Bi et al., entitled "Three Dimensional Engineering Of Optical Structures," incorporated herein by reference.

EXAMPLES

Example 1

Erbium Doped Silica Glass

This example describes the coating of a silicon substrate with a silica glass including alumina and sodium oxide glass formers and an erbium dopant using light reactive deposition and consolidation.

Particle coating was performed using light reactive deposition in which wafer coating was performed within the reaction chamber by sweeping the substrate through a product particle stream. The wafer was a silicon wafer with a thermal oxide under-cladding. The apparatus used to coat a substrate/wafer in the reaction stream is comparable to the apparatus shown in FIGS. 20-22 with an aerosol precursor delivery system similar the system shown schematically in FIG. 5. The coating was performed with a static coating configuration. An oxygen/ethylene flame was started first. Then, the aerosol flow was started. When a stable process flame was observed, the wafer was translated into the coating position about 17 inches above the laser beam. At this distance, the product particle flow has spread such that the entire surface is simultaneously coated approximately uniformly. The wafer was left in the flow for about 20 minutes.

A solution was formed combining 66 grams (g) tetra-ethoxysilane ($Si(OC_2H_5)_4$ or TEOS, 99.9% pure), 25.6 g aluminum nitrate ($Al(NO_3)_3 \cdot 9H_2O$, >98% pure), 9.5 g sodium nitrate ($NaNO_3$, 99% pure), and 1.9 g erbium nitrate ($Er(NO_3)_3 \cdot 5H_2O$, 99.99% pure) in a isopropyl alcohol (530 g, 99.5% pure)/water (250 g) solvent mixture. An aerosol of the solution was carried into the reaction chamber along with argon, ethylene and molecular oxygen gasses. Argon gas was mixed with the reactant stream as a diluent/inert gas to moderate the reaction. $C_2H_4$ gas was used as a laser absorbing gas. $O_2$ was used as an oxygen source.

The reaction conditions for the production of the powder array coatings are described in Table 1. Flame temperature was measured using three thermo-couples located in the flow about 1 inch above the laser beam.

TABLE 1

| | |
|---|---|
| Pressure (Torr) | 180 |
| Ethylene (slm) | 0.75 |
| Oxygen (slm) | 3.7 |
| Argon Dilution Gas (slm) | 6 |
| Precursor Flow (ml/min) | 20 |
| Laser Power - Input (watts) | 815 |
| Flame Temperature (° C.) | 1100 | slm = standard liters per minute

Following completion of the coating run, the wafers have a coating across the surface of the wafer. The chemical composition of the coating was measured using Energy Dispersive X-Ray Analysis (EDXA, Oxford Instruments Model 7021) attached to a Hitachi S-3000H scanning electron microscope, which was used for microscopy. The EDXA scans were acquired at 500× magnification using a 20 kV accelerating voltage and a W filament operating at about 85 mA current. The interaction volume was estimated to have a diameter of approximately 2 microns. EDXA scans were taken on the coated surface. The powder array had the following compositions as measured by EDXA: O—49.1 weight percent (wt %), Si—31.7 wt %, Na—9.9 wt %, Al—5.1 wt %, Er 2.4 wt %, and impurity (C, H, N etc.) total 2.2 wt %.

The coated wafers were heated in a muffle furnace (Neytech, Model Centurion Qex). The wafers were first heated at 650° C. in an oxygen atmosphere to remove carbon contaminants and then at 975° C. in a helium atmosphere to complete consolidation of the glass. Along with the heating and cooling conditions, the heat processing is summarized in Table 2.

TABLE 2

| Heating Segment | Gas | Gas Flow (sccm) | Ramp Rate (C/min) | Target Temp | Hold Time (hours:mins) |
|---|---|---|---|---|---|
| 1 | $O_2$ | 250 | 50 | 650 | — |
| 2 | $O_2$ | 250 | — | 650 | 0:10 |
| 3 | He | 250 | 10 | 975 | — |
| 4 | He | 250 | — | 975 | 1 |
| 5 | He | 250 | −100 | 100 | — | sccm - standard cubic centimeters per minute

After being removed from the oven, the wafers had a clear glass on their surface. The consolidated glass had a thickness from about 4 microns to about 6 microns. The consolidated glass was found to have the following compositions by EDXA analysis: O—50.2 wt %, Si—34.1 wt %, Na—10.5 wt %, Al—3.7 wt %, Er—1.5 wt %, and total impurities 0.1 wt %.

Figure 29:
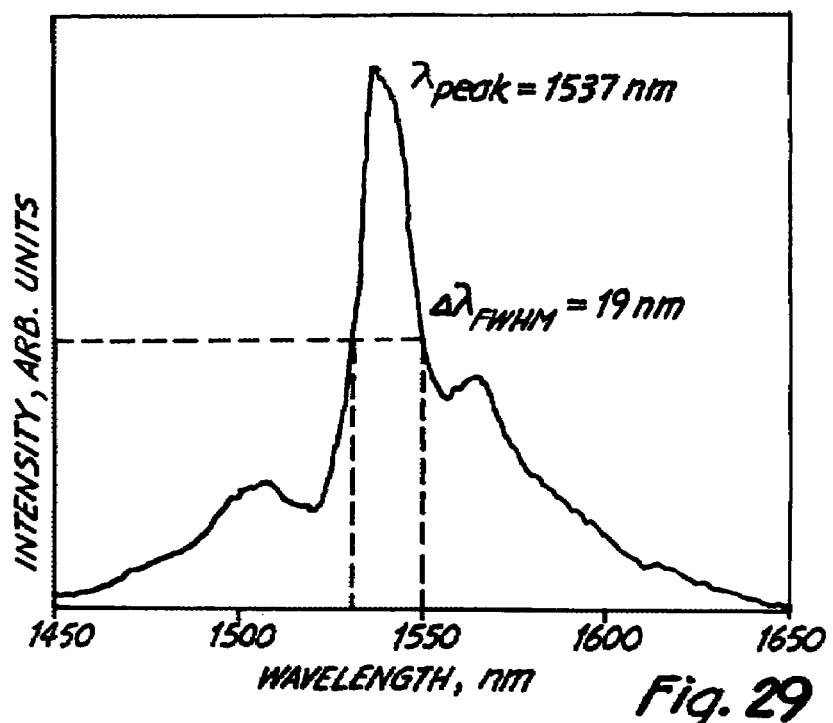
FIG. 29 is a photoluminescence spectrum of an embodiment of an erbium doped silica glass formed by light reactive deposition.
Figure 30:
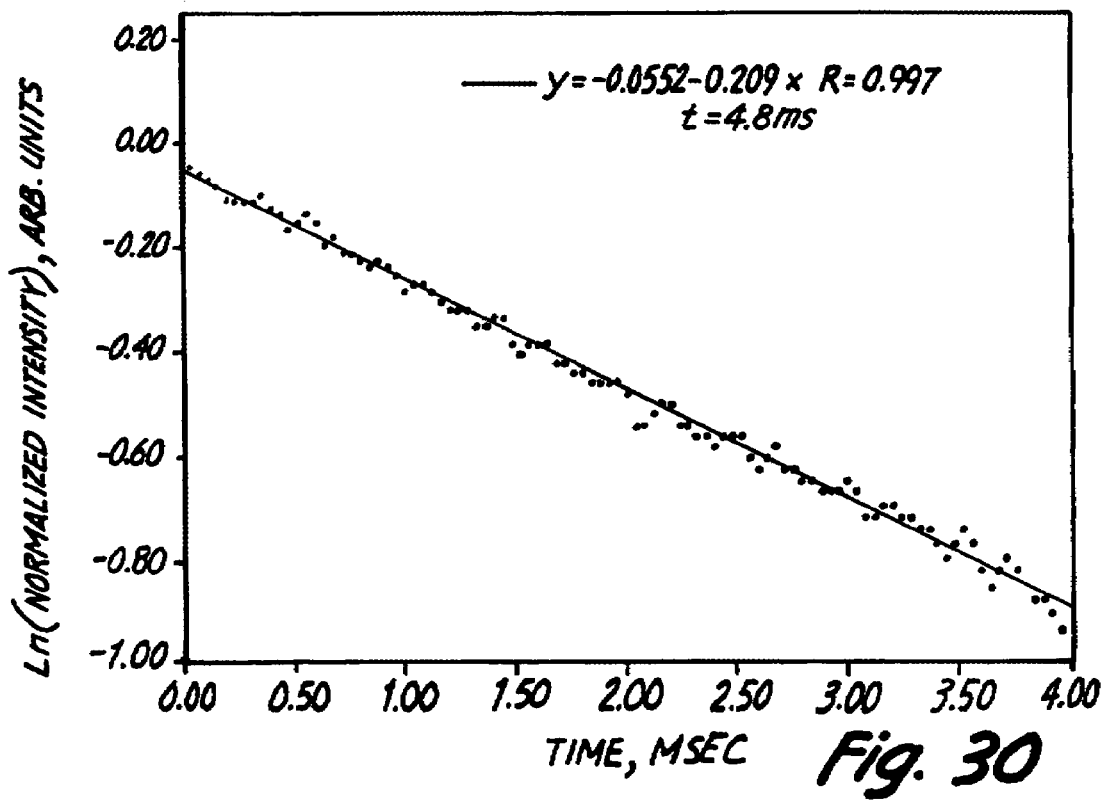
FIG. 30 is a plot of the photoluminescence decay shown as the ln of the normalized intensity as a function of time corresponding with the sample used to generate the spectrum in FIG. 29.

Erbium spectroscopy was performed using a 980 nm laser diode (SDL 8630), a TRIAX-320 monochromator (Jobin-Yvon), and a two-color, TE-cooled Si/InGaAs detector (Jobin-Yvon, DSS-SIGA020A). The pump beam was focused onto the glass surface, and a collecting lens was used to focus the fluorescence into the detector. Photoluminescence (PL) measurements were taken using a 0.2 mm slit size, and peak values were used to normalize the data for comparison and determination of the full width at half maximum (FWHM). The PL spectrum is shown in FIG. 29. Erbium excited state lifetime measurements were performed by setting the monochromator to the PL peak, increasing the slit size to 2 mm, and operating the laser diode at 300 mW with a 50 msec pulse at 1 Hz. A Tektronix TDS220 digital oscilloscope was used to measure the fluorescence decay. A plot of the logorithm of the fluorescence decay normalized to the incident intensity as a function of time is shown in FIG. 30. The lifetime value of 4.8 ms was obtained from the slope of the line in FIG. 30. Measurement repeatability was verified on several samples with measurements taking place over a span of weeks.

Example 2

Heating Coated Wafer in a Chlorine Environment

This example describes the coating of a silicon substrate with a silica glass including alumina and sodium oxide glass formers and an erbium dopant using light reactive deposition, heat treatment in a mixture of oxygen and chlorine and consolidation.

Particle coating was performed using light reactive deposition in which wafer coating was performed within the reaction chamber by sweeping the substrate through a product particle stream. The wafer was a silicon wafer with a thermal oxide under-cladding. The apparatus used to coat a substrate/wafer in the reaction stream is comparable to the apparatus shown in FIGS. 20-22 with an aerosol precursor delivery system similar the system shown schematically in FIG. 5. The coating was performed with a static coating configuration. An oxygen/ethylene flame was started first. Then, the aerosol flow was started. When a stable process flame was observed, the wafer was translated into the coating position about 17 inches above the laser beam. At this distance, the product particle flow has spread such that the entire surface is simultaneously coated approximately uniformly. The wafer was left in the flow for about 20 minutes.

A solution was formed combining 74 grams (g) tetraethoxysilane ($Si(OC_2H_5)_4$ or TEOS, 99.9% pure), 29.9 g aluminum nitrate ($Al(NO_3)_3 \cdot 9H_2O$, >98% pure), 5.2 g sodium nitrate $NaNO_3$, 99% pure), and 1.6 g erbium nitrate ($Er(NO_3)_3 \cdot 5H_2O$, 99.99% pure) in a isopropyl alcohol (524 g, 99.5% pure)/water (250 g) solvent mixture. An aerosol of the solution was carried into the reaction chamber along with argon, ethylene and molecular oxygen gasses. Argon gas was mixed with the reactant stream as a diluent/inert gas to moderate the reaction. $C_2H_4$ gas was used as a laser absorbing gas. $O_2$ was used as an oxygen source.

The reaction conditions for the production of the powder array coatings are described in Table 3. Flame temperature was measured using three thermo-couples located in the flow about 1 inch above the laser beam.

TABLE 3

| | |
|---|---|
| Pressure (Torr) | 180 |
| Ethylene (slm) | 0.75 |
| Oxygen (slm) | 2.5 |
| Argon Dilution Gas (slm) | 6 |
| Precursor Flow (ml/min) | 20 |

TABLE 3-continued

| | |
|---|---|
| Laser Power - Input (watts) | 815 |
| Flame Temperature (° C.) | 735 | slm = standard liters per minute

Following completion of the coating run, the wafers have a coating across the surface of the wafer. The chemical composition of the coating was measured using Energy Dispersive X-Ray Analysis (EDXA, Oxford Instruments Model 7021) attached to a Hitachi S-3000H scanning electron microscope, which was used for microscopy. The EDXA scans were acquired at 500× magnification using a 20 kV accelerating voltage and a W filament operating at about 85 mA current. The interaction volume was estimated to have a diameter of approximately 2 microns. EDXA scans were taken on the coated surface. The powder array had the following compositions as measured by EDXA: O—51.6 wt %, Si—35.4 wt %, Na—4.2 wt %, Al—5.8 wt %, Er 1.9 wt %, and impurity (C, H, N etc.) total 1.0 wt %.

The coated wafers were heated in a tube furnace (Lindburg, Model Blue M). The wafers were first heated at 450° C. in an oxygen-chlorine ($O_2+Cl_2$) atmosphere to remove carbon and hydrogen (OH) contaminants, second at 450° C. in a nitrogen purge and then at 975° C. in a helium atmosphere to complete consolidation of the glass. If the heat treatment was stopped prior to the final consolidation, the coating had a chlorine content from 3-5 wt %. Along with the heating and cooling conditions, the heat processing is summarized in Table 2.

TABLE 4

| Heating Segment | Gas | Gas Flow (sccm) | Ramp Rate (C/min) | Target Temp | Hold Time (hours:mins) |
|---|---|---|---|---|---|
| 1 | $O_2$ | 200 | 30 | 450 | — |
| 2 | $O_2 + Cl_2$ | 200 | — | 450 | 0:30 |
| 3 | $N_2$ | purge | — | 450 | 0:30 |
| 4 | He | 200 | 54 | 1100 | — |
| 5 | He | 200 | — | 1100 | 3:00 |
| 6 | He | 200 | Furnace cool | 25 | x |

After being removed from the oven, the wafers had a clear glass on their surface. The consolidated glass had a thickness from about 4 microns to about 6 microns. The consolidated glass was found to have the following compositions by EDXA analysis: O—52.8 wt %, Si—35.6 wt %, Na—3.7 wt %, Al—6.2 wt %, Er—1.7 wt %, and total impurities 0.0 wt %.

Figure 31:
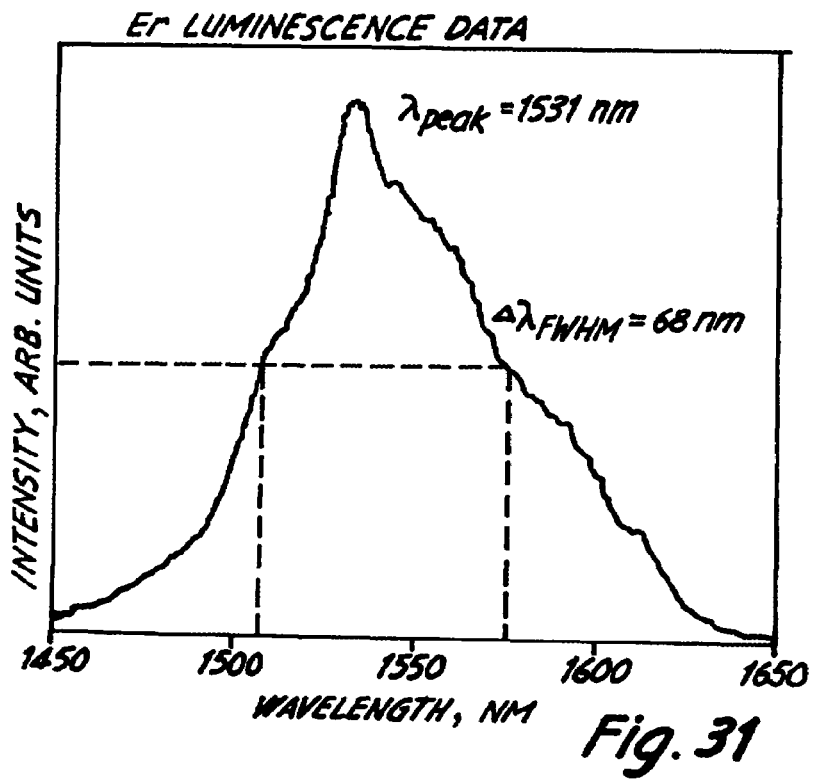
FIG. 31 is a photoluminescence spectrum of another embodiment of an erbium doped silica glass formed by light reactive deposition.
Figure 32:
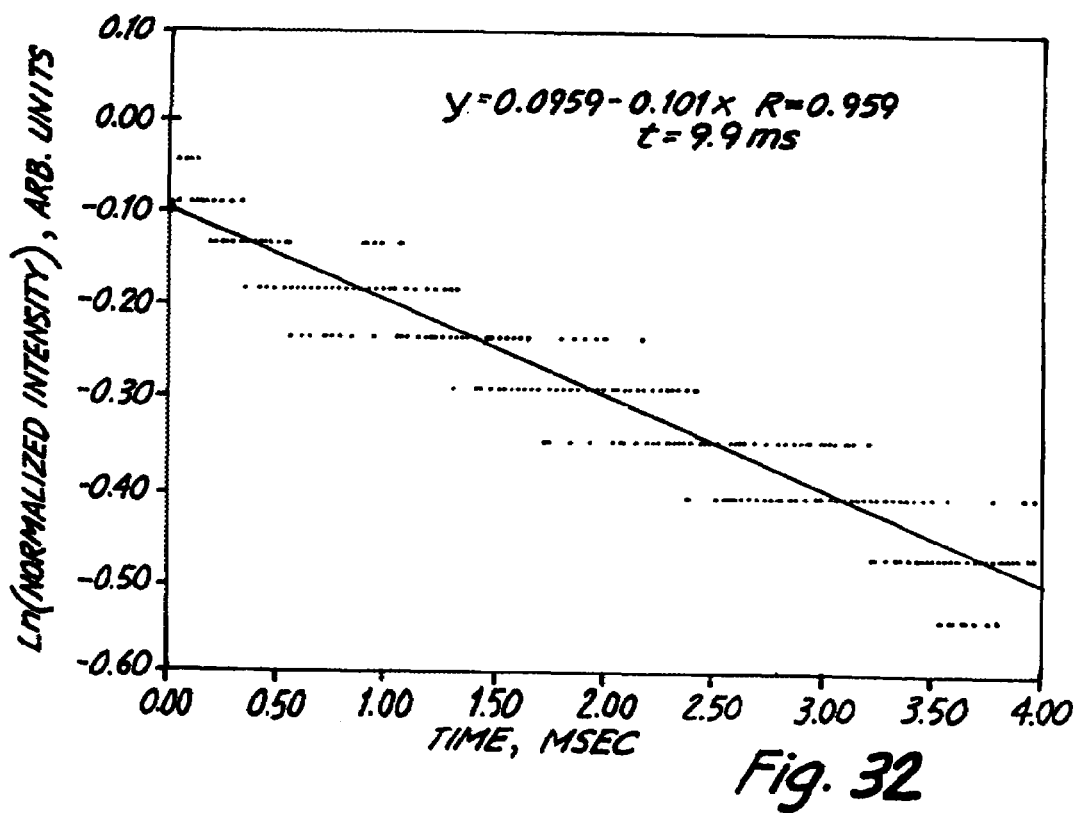
FIG. 32 is a plot of the photoluminescence decay shown as the ln of the normalized intensity as a function of time corresponding with the sample used to generate the spectrum in FIG. 31.

Erbium spectroscopy was performed using a 980 nm laser diode (SDL 8630), a TRIAX-320 monochromator (Jobin-Yvon), and a two-color, TE-cooled Si/InGaAs detector (Jobin-Yvon, DSS-SIGA020A). The pump beam was focused onto the glass surface, and a collecting lens was used to focus the fluorescence into the detector. Photoluminescence (PL) measurements were taken using a 0.2 mm slit size, and peak values were used to normalize the data for comparison and determination of the full width at half maximum (FWHM). The PL spectrum is shown in FIG. 31. Erbium excited state lifetime measurements were performed by setting the monochromator to the PL peak, increasing the slit size to 2 mm, and operating the laser diode at 300 mW with a 50 msec pulse at 1 Hz. A Tektronix TDS220 digital oscilloscope was used to measure the fluorescence decay. A plot of the logorithm of the fluorescence decay normalized to the incident intensity as a function of time is shown in FIG. 32. The lifetime value of 9.9 ms was obtained from the slope of the line in FIG. 32.

Example 3

Inclusion of Chlorine Containing Precursors

This example describes the coating of a silicon substrate with a silica glass including alumina and sodium oxide glass formers and an erbium dopant using light reactive deposition, heat treatment in an oxygen atmosphere and consolidation in an inert atmosphere. The precursors used in this example included chloride ions. Eight different reaction conditions are described.

Particle coating was performed using light reactive deposition in which wafer coating was performed within the reaction chamber by sweeping the substrate through a product particle stream. The wafer was a silicon wafer with a thermal oxide under-cladding. The apparatus used to coat a substrate/wafer in the reaction stream is comparable to the apparatus shown in FIGS. 20-22 with an aerosol precursor delivery system similar the system shown schematically in FIG. 5. The coating was performed with a static coating configuration. An oxygen/ethylene flame was started first. Then, the aerosol flow was started. When a stable process flame was observed, the wafer was translated into the coating position about 17 inches above the laser beam. At this distance, the product particle flow has spread such that the entire surface is simultaneously coated approximately uniformly. The wafer was left in the flow for about 30 minutes.

Eight different precursors solutions were used with each including tetraethoxysilane ($Si(OC_2H_5)_4$ or TEOS, 99.9% pure), aluminum nitrate ($Al(NO_3)_3 \cdot 9H_2O$, >98% pure), aluminum chloride ($AlCl_3$), sodium chloride (NaCl), and erbium chloride ($ErCl_3 \cdot 6H_2O$) in a isopropyl alcohol/water solvent mixture. The amounts of each reactant in the eight solutions are presented in Table 5.

TABLE 5

| Sample | TEOS, g | Aluminum nitrate, g | Aluminum Chloride, g | Erbium chloride, g | NaCl, g | water, g | IPA, g |
|---|---|---|---|---|---|---|---|
| 1 | 71.1 | 9.5 | 2.6 | 1.4 | 6.9 | 251 | 526 |
| 2 | 71.2 | 9.5 | 2.6 | 1.5 | 7.0 | 253 | 531 |
| 3 | 71.3 | 18.3 | 5.0 | 1.5 | 5.1 | 252 | 528 |
| 4 | 71.2 | 18.2 | 5.1 | 1.5 | 5.1 | 254 | 527 |
| 5 | 71.6 | 24.7 | 6.8 | 1.5 | 3.7 | 252 | 526 |
| 6 | 70.7 | 24.7 | 6.8 | 1.5 | 3.6 | 250 | 527 |
| 7 | 71.5 | 27.4 | 7.6 | 1.5 | 3.0 | 255 | 528 |
| 8 | 70.9 | 27.2 | 7.5 | 1.5 | 3.0 | 254 | 528 |

An aerosol of the solution was carried into the reaction chamber along with argon, ethylene and molecular oxygen gasses. Argon gas was mixed with the reactant stream as a diluent/inert gas to moderate the reaction. $C_2H_4$ gas was used as a laser absorbing gas. $O_2$ was used as an oxygen source.

The reaction conditions for the production of the powder array coatings are described in Table 6. Flame temperature was measured using three thermo-couples located in the flow about 1 inch above the laser beam.

TABLE 6

| | Sample | | | | | | | |
|---|---|---|---|---|---|---|---|---|
| | 1 | 2 | 3 | 4 | 5 | 6 | 7 | 8 |
| Pressure (Torr) | 180 | 180 | 180 | 180 | 180 | 180 | 180 | 180 |
| Ethylene (slm) | 0.75 | 0.75 | 0.75 | 0.8 | 0.75 | 0.8 | 0.75 | 0.75 |
| Oxygen (slm) | 2.5 | 2.5 | 2.5 | 2.5 | 2.5 | 2.5 | 2.5 | 2.5 |
| Argon Dilution Gas (slm) | 6.0 | 6.0 | 6.0 | 6.0 | 6.0 | 6.0 | 6.0 | 6.0 |
| Precursor Flow (ml/min) | 8.5 | 8.5 | 5.8 | 5.8 | 5.8 | 5.8 | 5.8 | 5.8 |
| Laser Power - Input (watts) | 815 | 815 | 815 | 815 | 815 | 815 | 815 | 815 |
| Flame Temperature (° C.) | 750 | 785 | 792 | 824 | 851 | 874 | 854 | 887 | slm = standard liters per minute

Following completion of the coating run, the wafers have a coating across the surface of the wafer. The chemical composition of the coating was measured using Energy Dispersive X-Ray Analysis (EDXA, Oxford Instruments Model 7021) attached to a Hitachi S-3000H scanning electron microscope, which was used for microscopy. The EDXA scans were acquired at 500× magnification using a 20 kV accelerating voltage and a W filament operating at about 85 mA current. The interaction volume was estimated to have a diameter of approximately 2 microns. EDXA scans were taken on the coated surface. The powder array for the eight embodiments in Tables 5 and 6 as measured by EDXA are shown in Table 7.

TABLE 7

| EDXA results | O, wt % | Na, et % | Al, wt % | Si, wt % | Cl, wt % | Er, wt % | C, wt % |
|---|---|---|---|---|---|---|---|
| 1 | 38.4% | 11.4% | 3.2% | 27.9% | 17.0% | 2.1% | |
| 2 | 38.2% | 11.5% | 3.1% | 27.5% | 17.6% | 2.2% | |
| 3 | 44.7% | 7.3% | 7.1% | 30.0% | 8.6% | 2.4% | |
| 4 | 44.4% | 7.4% | 6.6% | 30.4% | 8.9% | 2.3% | |
| 5 | 47.3% | 4.7% | 9.6% | 31.3% | 4.7% | 2.5% | |
| 6 | 47.5% | 4.5% | 9.5% | 31.4% | 4.4% | 2.6% | |
| 7 | 42.9% | 3.3% | 11.9% | 36.3% | 4.4% | 1.2% | |
| 8 | 48.5% | 3.9% | 10.1% | 31.5% | 3.6% | 2.4% | |

The coated wafers were heated in a muffle furnace (Neytech, Model Centurion Qex). The wafers were first heated at 450° C. in an oxygen atmosphere to remove carbon contaminants and then at a $T_{max}$ in a helium atmosphere to complete consolidation of the glass. $T_{max}$ was 1100° C. for samples 1, 3, 5 and 7 and 1200° C. for samples 2, 4, 6 and 8. Along with the hearing and cooling conditions, the heat processing is summarized in Table 8.

TABLE 8

| Heating Segment | Gas | Gas Flow (sccm) | Ramp Rate (C/min) | Target Temp | Hold Time (hours:min) |
|---|---|---|---|---|---|
| 1 | $O_2$ | 200 | 100 | 450 | — |
| 2 | $O_2$ | 200 | — | 450 | 0:15 |
| 3 | He | 200 | 10 | $T_{max}$ | — |
| 4 | He | 200 | — | $T_{max}$ | 2 |
| 5 | He | 200 | Furnace Cool | 25 | — |

After being removed from the oven, the wafers had a clear glass on their surface. The consolidated glasses had thicknesses from about 4 microns to about 6 microns. The consolidated glasses were found by EDXA analysis to have compositions as indicated in Table 9.

TABLE 9

| EDXA results | O, wt % | Na, et % | Al, wt % | Si, wt % | Cl, wt % | Er, wt % | C, wt % |
|---|---|---|---|---|---|---|---|
| 1 | 51.2% | 9.4% | 2.5% | 34.7% | | 2.0% | |
| 2 | 51.3% | 6.7% | 3.2% | 36.5% | | 2.0% | |
| 3 | 50.4% | 7.1% | 7.5% | 33.0% | | 2.0% | |
| 4 | 49.9% | 5.0% | 5.6% | 33.5% | | 1.6% | 4.4% |
| 5 | 44.8% | 4.7% | 11.0% | 36.7% | | | |
| 6 | 45.0% | 4.2% | 10.8% | 36.8% | | 2.0% | 1.5% |
| 7 | 46.7% | 3.3% | 11.3% | 37.0% | | | |
| 8 | 45.0% | 3.5% | 11.8% | 37.0% | | 1.6% | 1.2% |

Figure 33:
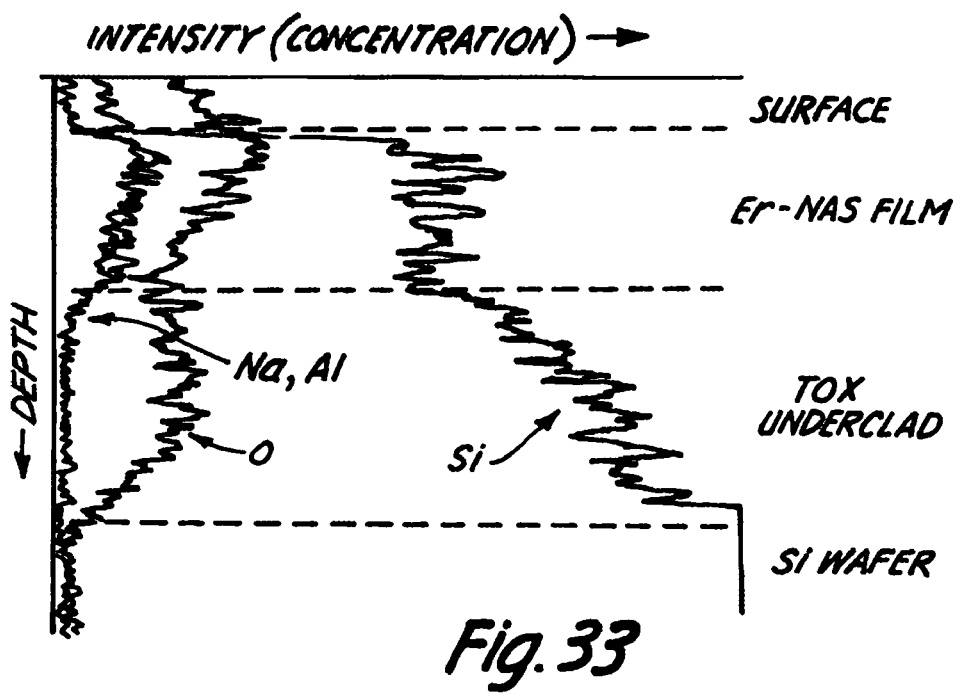
FIG. 33 is a representative plot of composition as a function of depth within a erbium doped silica glass.
Figure 34:
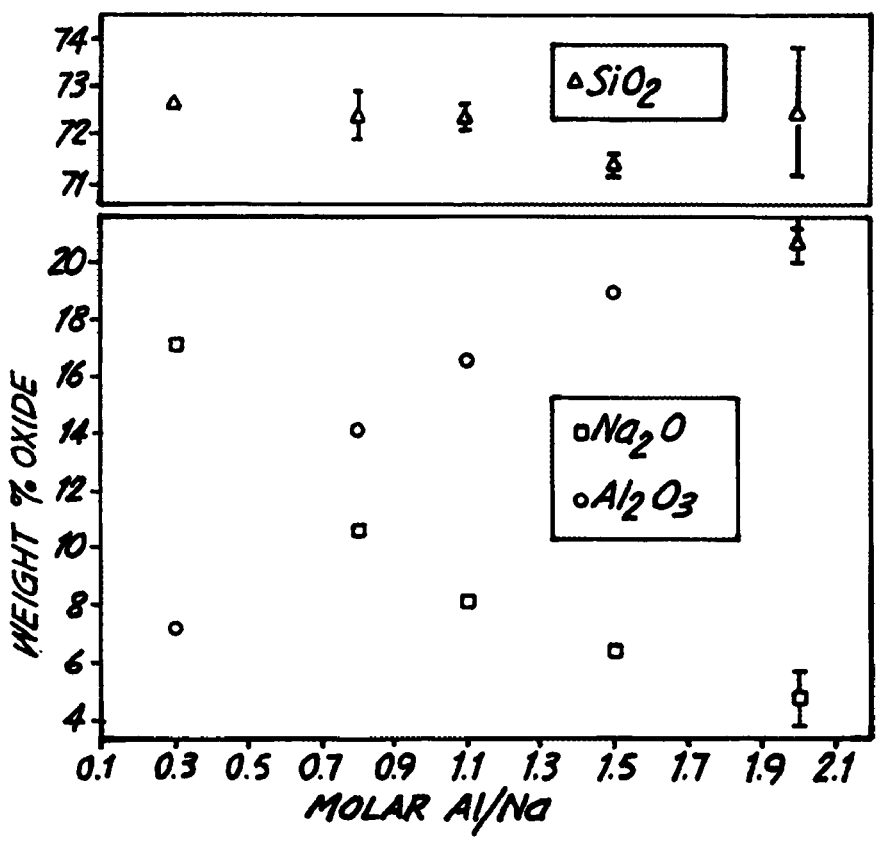
FIG. 34 is a plot of the weight percent of sodium oxide and aluminum oxide in a silica glass as a function of the molar ratio of Al and Na in a solution used to form an aerosol in a reactant stream for light reactive deposition.

A representative composition profile through the material is shown in FIG. 33. Na and Al were well confined to the core since the signal drops to zero intensity within 1 micron of the core—under-cladding interface. Based on the results in Table 9, it can be seen that the levels of sodium and aluminum in the glass can be selected based on the relative amounts of sodium and aluminum ions in the solution delivered into the light reactive deposition chamber. A plot in general of the amount of sodium and aluminum in the glass as a function of the molar ratio of aluminum and sodium in the aerosol solution is shown in FIG. 34.

Example 4

Powder Synthesis Without Ethylene

This example describes the coating of a silicon substrate with a silica glass including alumina and sodium oxide glass formers and an erbium dopant using light reactive deposition and consolidation. No ethylene was included in the reactant stream for this example.

Particle coating was performed using light reactive deposition in which wafer coating was performed within the reaction chamber by sweeping the substrate through a product particle stream. The wafer was a silicon wafer with a thermal oxide under-cladding. The apparatus used to coat a substrate/wafer in the reaction stream is comparable to the apparatus shown in FIGS. 20-22 with an aerosol precursor delivery system similar the system shown schematically in FIG. 5. The coating was performed with a static coating configuration. First, an oxygen-ethylene flame was started. Once a stable oxygen/ethylene flame was obtained, liquid precursor was introduced. $O_2$ flow was raised to obtain a stable process flame. Then, $C_2H_4$ flow was gradually decreased to 0 and the $O_2$ flow was reduced to a final value for the run. When a stable process flame was observed, the wafer was translated into the coating position about 17 inches above the laser beam. At this distance, the product particle flow has spread such that the entire surface is simultaneously coated approximately uniformly. The wafer was left in the flow for about 20 minutes. In these runs, the flame velocity seemed lower than runs with ethylene present. This resulted in less sensitivity to oxygen flow variations and in a more stable flame.

A solution was formed combining 64 grams (g) tetraethoxysilane ($Si(OC_2H_5)_4$ or TEOS, 99.9% pure), 28.6 g aluminum nitrate ($Al(NO_3)_3 \cdot 9H_2O$, >98% pure), 3.6 g sodium nitrate ($NaNO_3$, 99% pure), and 1.5 g erbium nitrate ($Er(NO_3)_3 \cdot 5H_2O$, 99.99% pure) in a isopropyl alcohol (535 g, 99.5% pure)/water (250 g) solvent mixture. An aerosol of the solution was carried into the reaction chamber along with argon and molecular oxygen gasses. Argon gas was mixed with the reactant stream as a diluent/inert gas to moderate the reaction. Isopropyl alcohol functioned as a laser absorbing gas. $O_2$ was used as an oxygen source.

The reaction conditions for the production of the powder array coatings are described in Table 10. Flame temperature was measured using three thermo-couples located in the flow about 1 inch above the laser beam.

TABLE 10

| Pressure (Torr) | 180 |
| Oxygen (slm) | 1.5 |
| Argon Dilution Gas (slm) | 6 |
| Precursor Flow (ml/min) | 5 |

TABLE 10-continued

| | |
|---|---|
| Laser Power - Input (watts) | 818 |
| Laser Power - Output (watts) | 780 |
| Flame Temperature (° C.) | 730 | slm = standard liters per minute

Following completion of the coating run, the wafers have a coating across the surface of the wafer. The chemical composition of the coating was measured using Energy Dispersive X-Ray Analysis (EDXA, Oxford Instruments Model 7021) attached to a Hitachi S-3000H scanning electron microscope, which was used for microscopy. The EDXA scans were acquired at 500× magnification using a 20 kV accelerating voltage and a W filament operating at about 85 mA current. The interaction volume was estimated to have a diameter of approximately 2 microns. EDXA scans were taken on the coated surface. The powder array had the following compositions as measured by EDXA: O—51.3 weight percent (wt %), Si—36.0 wt %, Na—3.1 wt %, Al—6.0 wt %, Er 2.0 wt %, and carbon 1.6 wt %.

The coated wafers were heated in a muffle furnace (Neytech, Model Centurion Qex). The wafers were first heated at 450° C. in an oxygen atmosphere to remove carbon contaminants and then at 1100° C. in a helium atmosphere to complete consolidation of the glass. Along with the heating and cooling conditions, the heat processing is summarized in Table 11.

TABLE 11

| Heating Segment | Gas | Gas Flow (sccm) | Ramp Rate (C/min) | Target Temp | Hold Time (hours:min) |
|---|---|---|---|---|---|
| 1 | $O_2$ | 200 | 100 | 450 | — |
| 2 | $O_2$ | 200 | — | 450 | 0:15 |
| 3 | He | 200 | 10 | 1100 | — |
| 4 | He | 200 | — | 1100 | 4:00 |
| 5 | He | 200 | 100 | 50 | — |

After being removed from the oven, the wafers had a clear glass on their surface. The consolidated glass had a thickness from about 4 microns to about 6 microns. The consolidated glass was found to have the following compositions by EDXA analysis: O—51.5 wt %, Si—34.9 wt %, Na—3.5 wt %, Al—6.1 wt %, Er—1.8 wt %, and carbon 2.2 wt %.

Example 5

Erbium Doped La—Al—Si Oxide Powder Array

This example describes the coating of a silicon substrate with a silica glass including alumina and lanthanum additives and an erbium dopant using light reactive deposition and consolidation. No ethylene was included in the reactant stream for this example.

Particle coating was performed using light reactive deposition in which wafer coating was performed within the reaction chamber by sweeping the substrate through a product particle stream. The wafer was a silicon wafer with a thermal oxide under-cladding. The apparatus used to coat a substrate/wafer in the reaction stream is comparable to the apparatus shown in FIGS. 20-22 with an aerosol precursor delivery system similar the system shown schematically in FIG. 5. The coating was performed with a static coating configuration. An oxygen/ethylene flame was started first. Then, the aerosol flow was started. When a stable process flame was observed, the wafer was translated into the coating position about 17 inches above the laser beam. At this distance, the product particle flow has spread such that the entire surface is simultaneously coated approximately uniformly. The wafer was left in the flow for about 20 minutes.

A solution was formed combining 107 grams (g) tetraethoxysilane ($Si(OC_2H_5)_4$ or TEOS, 99.9% pure), 46.3 g aluminum nitrate ($Al(NO_3)_3.9H_2O$, >98% pure), 32.1 g lanthanum nitrate ($La(NO_3)_3.6H_2O$, 99% pure), and 3.1 g erbium nitrate ($Er(NO_3)_3.5H_2O$, 99.9% pure) in 1323 g isopropyl alcohol (($CH_3)_2CHOH$, >99.5% pure). An aerosol of the solution was carried into the reaction chamber along with argon, ethylene and molecular oxygen gasses. Argon gas was mixed with the reactant stream as a diluent/inert gas to moderate the reaction. Ethylene ($C_2H_4$) was used as a laser absorbing gas. $O_2$ was used as an oxygen source.

The reaction conditions for the production of the powder array coatings are described in Table 12. Flame temperature was measured using three thermo-couples located in the flow about 1 inch above the laser beam.

TABLE 12

| | |
|---|---|
| Pressure (Torr) | 180 |
| Oxygen (slm) | 4.4 |
| Ethylene (slm) | 0.75 |
| Argon Dilution Gas (slm) | 6 |
| Precursor Flow (ml/min) | 13 |
| Laser Power - Input (watts) | 818 |
| Laser Power - Output (watts) | 470 |
| Flame Temperature (° C.) | 970 | slm = standard liters per minute

Following completion of the coating run, the wafers have a coating across the surface of the wafer. The chemical composition of the coating was measured using. The powder array had the following compositions as measured by ICP: O—40.9 weight percent (wt %), Si—25.7 wt %, La—21.8 wt %, Al—9.2 wt %, Er 2.3 wt %, and carbon 0.2 wt %. This particular composition was difficult to consolidate.

Example 6

Erbium Doping at a Lower Flame Temperature

This example describes the coating of a silicon substrate with a silica glass including alumina and sodium oxide glass formers and an erbium dopant using light reactive deposition and consolidation at a lower flame temperature.

Particle coating was performed using light reactive deposition in which wafer coating was performed within the reaction chamber by sweeping the substrate through a product particle stream. The wafer was a silicon wafer with a thermal oxide under-cladding. The apparatus used to coat a substrate/wafer in the reaction stream is comparable to the apparatus shown in FIGS. 20-22 with an aerosol precursor delivery system similar the system shown schematically in FIG. 5. The coating was performed with a static coating configuration. An oxygen/ethylene flame was started first. Then, the aerosol flow was started. When a stable process flame was observed, the wafer was translated into the coating position about 17 inches above the laser beam. At this distance, the product particle flow has spread such that the entire surface is simultaneously coated approximately uniformly. The wafer was left in the flow for about 20 minutes.

A solution was formed combining 55 grams (g) tetra-ethoxysilane ($Si(OC_2H_5)_4$ or TEOS, 99.9% pure), 22.5 g aluminum nitrate ($Al(NO_3)_3 \cdot 9H_2O$, >98% pure), 4.0 g sodium nitrate ($NaNO_3$, 99% pure), and 1.5 g erbium nitrate ($Er(NO_3)_3 \cdot 5H_2O$, 99.99% pure) in a isopropyl alcohol (396 g, 99.5% pure)/water (185 g) solvent mixture. An aerosol of the solution was carried into the reaction chamber along with argon, ethylene and molecular oxygen gasses. Argon gas was mixed with the reactant stream as a diluent/inert gas to moderate the reaction. Ethylene ($C_2H_4$) was used as a laser absorbing gas. $O_2$ was used as an oxygen source.

The reaction conditions for the production of the powder array coatings are described in Table 12. Flame temperature was measured using three thermo-couples located in the flow about 1 inch above the laser beam.

TABLE 12

| | |
|---|---|
| Pressure (Torr) | 180 |
| Oxygen (slm) | 2.8 |
| Ethylene (slm) | 0.75 |
| Argon Dilution Gas (slm) | 6 |
| Precursor Flow (ml/min) | 6.5 |
| Laser Power - Input (watts) | 816 |
| Laser Power - Output (watts) | 716 |
| Flame Temperature (° C.) | 692 | slm = standard liters per minute

Following completion of the coating run, the wafers have a coating across the surface of the wafer. The chemical composition of the coating was measured using. The powder array had the following compositions as measured by ICP: O—51.4 weight percent (wt %), Si—34.0 wt %, Na—4.8 wt %, Al—6.6 wt %, Er 3.1 wt %, and impurities 0.0 wt %.

The coated wafers were heated in a muffle furnace (Neytech, Model Centurion Qex). The wafers were first heated at 450° C. in an oxygen atmosphere to remove carbon contaminants and then at 1100° C. in a helium atmosphere to complete consolidation of the glass. Along with the heating and cooling conditions, the heat processing is summarized in Table 13.

TABLE 13

| Heating Segment | Gas | Gas Flow (sccm) | Ramp Rate (C/min) | Target Temp | Hold Time (hours:mins) |
|---|---|---|---|---|---|
| 1 | $O_2$ | 200 | 100 | 450 | — |
| 2 | $O_2$ | 200 | — | 450 | 0:30 |
| 3 | He | 200 | 100 | 1100 | — |
| 4 | He | 200 | — | 1100 | 1:00 |
| 5 | He | 200 | −50 | 50 | — | sccm - standard cubic centimeters per minute

After being removed from the oven, the wafers had a clear glass on their surface. The consolidated glass had a thickness from about 4 microns to about 6 microns. The consolidated glass was found to have the following compositions by EDXA analysis: O—50.0 wt %, Si—34.4 wt %, Na—5.6 wt %, Al—6.8 wt %, Er—2.3 wt %, and total impurities 0.0 wt %.

Figure 35:
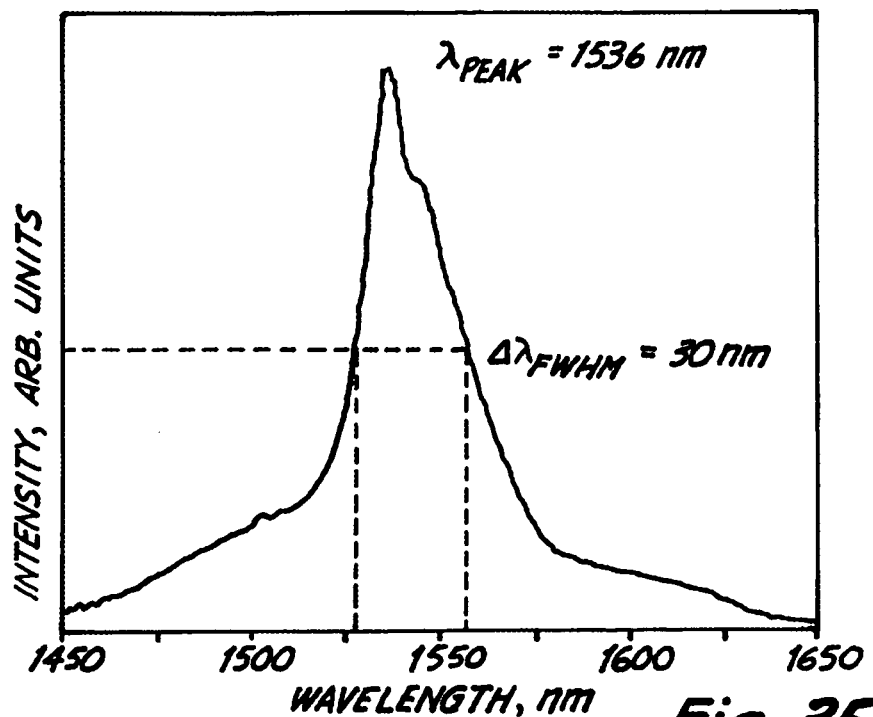
FIG. 35 is a photoluminescence spectrum of a further embodiment of an erbium doped silica glass formed by light reactive deposition.
Figure 36:
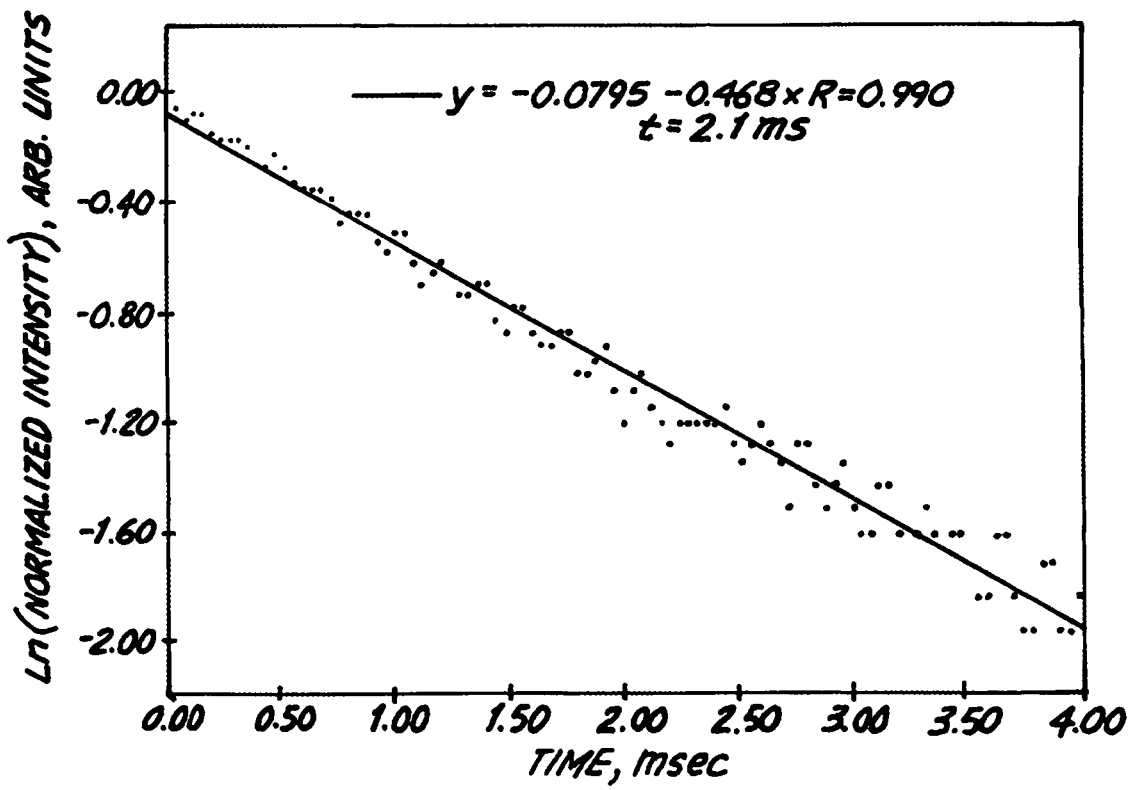
FIG. 36 is a plot of the photoluminescence decay shown as the ln of the normalized intensity as a function of time corresponding with the sample used to generate the spectrum in FIG. 35.

Erbium spectroscopy was performed using a 980 nm laser diode (SDL 8630), a TRIAX-320 monochromator (Jobin-Yvon), and a two-color, TE-cooled Si/InGaAs detector (Jobin-Yvon, DSS-SIGA020A). The pump beam was focused onto the glass surface, and a collecting lens was used to focus the fluorescence into the detector. Photoluminescence (PL) measurements were taken using a 0.2 mm slit size, and peak values were used to normalize the data for comparison and determination of the full width at half maximum (FWHM). The PL spectrum is shown in FIG. 35. Erbium excited state lifetime measurements were performed by setting the monochromator to the PL peak, increasing the slit size to 2 mm, and operating the laser diode at 300 mW with a 50 msec pulse at 1 Hz. A Tektronix TDS220 digital oscilloscope was used to measure the fluorescence decay. A plot of the logarithm of the fluorescence decay normalized to the incident intensity as a function of time is shown in FIG. 36. The lifetime value of 2.1 ms was obtained from the slope of the line in FIG. 36.

As utilized herein, the term "in the range(s)" or "between" comprises the range defined by the values listed after the term "in the range(s)" or "between", as well as any and all subranges contained within such range, where each such subrange is defined as having as a first endpoint any value in such range, and as a second endpoint any value in such range that is greater than the first endpoint and that is in such range.

The embodiments described above are intended to be illustrative and not limiting. Additional embodiments are within the claims below. Although the present invention has been described with reference to specific embodiments, workers skilled in the art will recognize that changes may be made in form and detail without departing from the spirit and scope of the invention. In addition, the terms including, comprising and having as used herein are intended to have broad non-limiting scope.

What is claimed is:

1. A collection of particles comprising a composition selected from the group consisting of $LiNbO_3$ and $LiTaO_3$, the collection of particles having an average diameter no more than about 500 nm.

2. The collection of particles of claim 1 wherein effectively no primary particles have a diameter greater than about 5 times the average diameter.

3. The collection of particles of claim 1 wherein the primary particles comprise a distribution of particle diameters wherein at least about 95 percent of the primary particles have a diameter greater than about 45 percent of the average diameter and less than about 200 percent of the average diameter.

4. A collection of particles comprising a metal/metalloid composition selected from the group consisting of a metal/metalloid arsinide, a metal/metalloid calcinate, a metal/metalloid telluride, a metal/metalloid phosphide and a metal/metalloid selenide, the collection of particles having an average diameter from about 3 nm to about 500 nm.

5. The collection of particles of claim 4 wherein the collection of particles comprises amorphous particles.

6. The collection of particles of claim 4 wherein the collection of particles comprises crystalline particles.

7. The collection of particles of claim 4 wherein the primary particles have an average diameter no more than about 100 nm.

8. The collection of particles of claim 4 wherein effectively no primary particles have a diameter greater than about 5 times the average diameter.

9. The collection of particles of claim 4 wherein the primary particles comprise a distribution of particle diameters wherein at least about 95 percent of the primary particles have a diameter greater than about 45 percent of the average diameter and less than about 200 percent of the average diameter.

10. A collection of particles comprising a first metal/metalloid, a transition metal different from the first metal/metalloid and a fluorine dopant/additive thereof, the collection of particles having an average primary particle diameter of no more than about 500 nm.

11. The collection of particles of claim 10 wherein effectively no primary particles have a diameter greater than about 5 times the average diameter.

12. The collection of particles of claim 10 wherein the primary particles comprise a distribution of particle diameters wherein at least about 95 percent of the primary particles have a diameter greater than about 45 percent of the average diameter and less than about 200 percent of the average diameter.

13. A collection of particles comprising a glass forming host composition, a first dopant/additive that introduces an absorption at a first wavelength of the electromagnetic spectrum and an emission at a second wavelength larger than the first wavelength and a second dopant/additive that creates a lasting change in index-of-refraction of the particles as a result of exposure to a third wavelength of electromagnetic radiation, the particles having an average primary particle diameter of no more than about 500 nm.

14. The collection of particles of claim 13 wherein the first dopant/additive comprises a rare earth metal.

15. The collection of particles of claim 13 wherein the second dopant/additive comprises Ge.

16. The collection of particles of claim 13 wherein effectively no primary particles have a diameter greater than about 5 times the average diameter.

17. The collection of particles of claim 13 wherein the primary particles comprise a distribution of particle diameters wherein at least about 95 percent of the primary particles have a diameter greater than about 45 percent of the average diameter and less than about 200 percent of the average diameter.

18. A collection of particles comprising a glass forming host composition, a first dopant/additive that introduces an absorption at a first wavelength of the electromagnetic spectrum and an emission at a second wavelength larger than the first wavelength, and a second dopant/additive that introduces paramagnetism to the particles.

19. The collection of particles of claim 18 wherein the second dopant/additive comprises Ce or Tb.

20. The collection of particles of claim 18 wherein effectively no primary particles have a diameter greater than about 5 times the average diameter.

21. The collection of particles of claim 18 wherein the primary particles comprise a distribution of particle diameters wherein at least about 95 percent of the primary particles have a diameter greater than about 45 percent of the average diameter and less than about 200 percent of the average diameter.

22. A collection of particles comprising an oxide composition, the oxide composition comprising silicon, an alkali metal or alkali earth metal and a third metal/metalloid element, the collection of particles having an average particle diameter less than about 500 nm.

23. The collection of particle of claim 22 wherein the alkali metal or alkali earth metal comprises sodium or calcium.

24. The collection of particle of claim 22 wherein the third metal/metalloid element comprises aluminum.

25. The collection of particles of claim 22 wherein effectively no primary particles have a diameter greater than about 5 times the average diameter.

26. The collection of particles of claim 22 wherein the primary particles comprise a distribution of particle diameters wherein at least about 95 percent of the primary particles have a diameter greater than about 45 percent of the average diameter and less than about 200 percent of the average diameter.

27. A preform comprising a powder array having an average primary particle diameter of no more than about 500 nm, the powder array comprising a composition selected from the group consisting of a non-rare earth metal/metalloid host composition and a rare earth metal dopant/additive; $B_2O_3$; $TeO_2$; $GeO_2$ and a metal/metalloid dopant/additive; $LiNbO_3$; $LiTaO_3$; a metal/metalloid arsinide; a metal/metalloid telluride; a metal/metalloid calcinate; a metal/metalloid phosphide; a metal/metalloid selenide; a first metal/metalloid, a transition metal different from the first metal/metalloid and a fluorine, chlorine, carbon or nitrogen dopant/additive; a host composition, a first dopant/additive that introduces an absorption at a first wavelength of the electromagnetic spectrum and an emission at a second wavelength higher than the first wavelength and a dopant/additive that creates a lasting change in index-of-refraction of the particles as a result of exposure to a third wavelength; an oxide composition comprising silicon, an alkali metal or alkali earth metal and a third metal/metalloid element; and a host composition, a first dopant/additive that introduces an absorption at a first wavelength of the electromagnetic spectrum and an emission at a second wavelength larger than the first wavelength and a second dopant/additive that introduces paramagnetism to the particles.

28. The preform of claim 27 wherein effectively no primary particles have a diameter greater than about 5 times the average diameter.

29. The preform of claim 27 wherein the primary particles have a distribution of particle diameters with at least about 95 percent of the primary particles have a diameter greater than about 45 percent of the average diameter and less than about 200 percent of the average diameter.

30. The preform of claim 27 wherein the powder array has an average primary particle diameter of no more than about 250 nm.

31. The preform of claim 27 wherein the powder array has an average primary particle diameter of no more than about 100 nm.

32. The preform of claim 27 wherein the powder array comprises a network of channels formed from fused primary particles.

33. An optical device comprising at least one layer of glass and an over-cladding over the at least one layer of glass wherein the over-cladding comprises glass comprising a fluorine dopant/additive.

34. The collection of particles of claim 10 wherein the collection of particles comprises silicon oxide.

35. The collection of particles of claim 13 wherein the glass forming host composition comprises silicon oxide.

36. The collection of particles of claim 18 wherein the glass forming host composition comprises silicon oxide.

37. An optical device of claim 33 wherein the at least one layer of glass comprises silicon oxide and wherein the glass of the over-cladding comprises silicon oxide.

* * * * *